(12) United States Patent
Badia et al.

(10) Patent No.: US 12,428,501 B2
(45) Date of Patent: Sep. 30, 2025

(54) METHOD FOR PRODUCING REMOVABLE PRESSURE-SENSITIVE ADHESIVES (PSAs) USING BIO-BASED STARTING MATERIALS

(71) Applicants: The University of the Basque Country, Leioa (ES); Basque Center For Macromolecular Design and Engineering, Polymat Fundazioa, Donostia—San Sebastián (ES)

(72) Inventors: Adrian Badia, Leioa (ES); Jose Ramon Leiza, Leioa (ES); Maria Jesus Barandiaran, Leioa (ES)

(73) Assignees: The University of the Basque Country (ES); Basque Center For Macromolecular Design and Engineering, Polymat Fundazio (ES)

( * ) Notice: Subject to any disclaimer, the term of this patent is extended or adjusted under 35 U.S.C. 154(b) by 296 days.

(21) Appl. No.: 18/009,842

(22) PCT Filed: Aug. 25, 2020

(86) PCT No.: PCT/EP2020/073723
§ 371 (c)(1),
(2) Date: Dec. 12, 2022

(87) PCT Pub. No.: WO2021/249660
PCT Pub. Date: Dec. 16, 2021

(65) Prior Publication Data
US 2023/0227588 A1    Jul. 20, 2023

(30) Foreign Application Priority Data
Jun. 10, 2020  (WO) ................ PCT/EP2020/066038

(51) Int. Cl.
*C08F 2/24* (2006.01)
*C08F 265/06* (2006.01)
(Continued)

(52) U.S. Cl.
CPC ............. *C08F 2/24* (2013.01); *C08F 265/06* (2013.01); *C09J 7/385* (2018.01); *C09J 133/10* (2013.01);
(Continued)

(58) Field of Classification Search
CPC .. C08F 2/24; C08F 265/06; C08F 2/38; C08F 220/1808; C08F 220/06; C08F 220/1811;
(Continued)

(56) References Cited

U.S. PATENT DOCUMENTS

| 6,107,382 A * | 8/2000 | Williams | .......... C08F 220/1804 |
| | | | 524/832 |
| 2014/0248490 A1* | 9/2014 | Morimoto | ............... C08L 71/02 |
| | | | 524/106 |
| 2016/0083629 A1* | 3/2016 | Wang | .................... C09J 133/08 |
| | | | 522/74 |

FOREIGN PATENT DOCUMENTS

WO    WO2019/113780 A1 *  6/2019

OTHER PUBLICATIONS

Badia et al., "High Biobased Content Latexes for Development of Sustainable Pressure Sensitive Adhesives," Ind. Eng. Chem. Res., 2018, 57, 14509-14516; ACS Publications © 2018 American Chemical Society; published Oct. 4, 2018 (Year: 2018).*

(Continued)

*Primary Examiner* — Cynthia L Schaller
(74) *Attorney, Agent, or Firm* — Edward E. Sowers; Brannon Sowers & Cracraft PC

(57) ABSTRACT

The present invention refers to a method for producing preferably water-based polymeric compositions, preferably dispersions (i.e. latices), which are particularly useful as or in adhesives, especially pressure-sensitive adhesives (PSAs), particularly pressure-sensitive adhesives removable under neutral or basic (i.e. alkaline) conditions, as well as to the polymeric compositions thus produced and to their (Continued)

various applications, including the copolymers comprised by these polymeric compositions.

28 Claims, 15 Drawing Sheets

(51) Int. Cl.
*C09J 7/38* (2018.01)
*C09J 133/10* (2006.01)
(52) U.S. Cl.
CPC .... *C09J 2301/302* (2020.08); *C09J 2301/502* (2020.08)
(58) Field of Classification Search
CPC ... C08F 220/282; C08F 222/102; C09J 7/385; C09J 133/10; C09J 2301/302; C09J 2301/502; C09J 151/003
See application file for complete search history.

(56) References Cited

OTHER PUBLICATIONS

Badia et al., "Removable Biobased Waterborne Pressure-Sensitive Adhesives Containing Mixtures of Isosorbide Methacrylate Monomers," Biomacromolecules 220, 21, 4522-4531, ACS Publications © 2020 American Chemical Society, published May 22, 2020 (Year: 2020).*
Badia Adrian et al; "Removable biobased waterborne pressure-sensitive adhesives containing mixtures of sosorbide methacrylate monomers"; Biomacromolecules, vol. 21, No. 11, pp. 4522-4531; May 22, 2020.
Badia Adrian et al; "High biobased content latexes for development of sustainable pressure sensitive adhesives"; Industrial & Engineering Chemistry Research, vol. 57, No. 43, pp. 14509-14516; Oct. 4, 2018.

* cited by examiner

METHOD FOR PRODUCING REMOVABLE PRESSURE-SENSITIVE ADHESIVES (PSAs) USING BIO-BASED STARTING MATERIALS

CROSS-REFERENCES TO RELATED APPLICATIONS

This application is a National Stage filing of International Application PCT/EP 2020/073723 filed Aug. 25, 2020, entitled "Method for producing removable pressure-sensitive adhesives (PSAs) using biobased starting materials" claiming priority to PCT/EP 2020/066038 filed Jun. 10, 2020. The subject application claims priority to PCT/EP 2020/073723 and PCT/EP 2020/066038 and incorporates all by reference herein, in their entirety.

FIELD OF THE INVENTION

The present invention refers to the technical field of polymeric compositions, especially polymeric compositions to be used in or as adhesives, particularly pressure-sensitive adhesives.

Especially, the present invention relates to a method for producing a preferably water-based (i.e. waterborne) polymeric composition, especially in the form of a preferably water-based (i.e. waterborne) dispersion (i.e. emulsion or latex), particularly to be used as or in an adhesive, especially a pressure-sensitive adhesive (=PSA), particularly a pressure-sensitive adhesive removable under neutral or basic (alkaline) conditions (i.e. in contact with water [i.e. water in liquid state] under neutral or basic/alkaline conditions), as well as to the polymeric composition thus produced and to its various uses, usages and applications.

Furthermore, the present invention is also directed to an adhesive, especially a pressure-sensitive adhesive, especially a pressure-sensitive adhesive removable under neutral or basic (alkaline) conditions (i.e. in contact with water under neutral or basic/alkaline conditions), especially a preferably water-based (i.e. waterborne) dispersion (i.e. emulsion or latex), comprising the inventive polymeric composition and/or being obtainable using the inventive polymeric composition, as well as to its various uses, usages and applications.

Moreover, the present invention is also directed to a graft copolymer, especially a random graft copolymer, obtainable from the polymeric composition.

Finally, the present invention also refers to a random copolymer and/or a water-based (waterborne) copolymeric composition, especially in the form of a preferably water-based (waterborne) dispersion (i.e. emulsion or latex), comprising said copolymer, obtainable by the first stage (a) of the inventive method, as well as to its various uses, usages and applications.

BACKGROUND OF THE INVENTION

Due to growing environmental concerns, recycling processes are becoming increasingly important. Especially, recycling of materials is particularly effective when different kinds of materials are separated and individually recycled. In this context, it is especially important to also remove, particularly without leaving residues, labels, coatings, tapes etc. from respective surfaces (e.g. from bottles, boxes, bags, packagings, wrappings etc.) made e.g. of stainless steel, glass or plastics such as polypropylene (PP), polyethylene (PE), polyethyleneterephthalate (PET) etc.

Therefore, adhesives used to attach or adhere these labels, coatings, tapes etc. to the respective surfaces should be removable, especially completely removable, under certain conditions or on demand, especially using an economic and environmental-friendly method, while otherwise or at any other time adhering securely. In this context, it would be especially advantageous when such adhesive would be removable under neutral or basic (i.e. alkaline) conditions, particularly in contact with or under action of water-based solutions, since the materials to be recycled are usually cleaned in neutral or basic (i.e. alkaline) water-based solutions anyway. Furthermore, such adhesives should be easily applicable and should adhere quickly, particularly without the use of extreme conditions.

In general, adhesives can be designed for either permanent or removable application. Permanent adhesives form a permanent bond with the surface of the adherend and can only be removed when breaking up (i.e. degrading) the adhesive. Removable adhesives temporarily bond to a surface and can then, ideally, be easily removed without leaving residues on the surface of the adherend. Furthermore, adhesives can also be categorized by their method of adhesion, i.e. generally there are two different types: reactive and non-reactive adhesives, which categorization refers as to whether the adhesive chemically reacts in order to adhere to a surface or not.

In this context, especially in the packaging and labeling industry, non-reactive adhesives are widely used, in particular so-called pressure-sensitive adhesives (=PSAs) are omnipresent and have proven to be highly effective. Pressure-sensitive adhesives are viscoelastic materials which can adhere strongly to solid surfaces upon application of a light contact pressure and in short contact times, i.e. generally no water, solvent or heat is needed to activate the adhesive (i.e. instantaneous adhesion to a surface can be achieved without activation), and which provide sufficient internal strength in order not to break up before the bond between the adhesive and the surface ruptures.

Waterborne PSA formulations are especially popular in commercial applications because, among other things, they do not contain any VOCs or other noxious fumes. Thus, pressure-sensitive adhesives as instantaneous adhesion materials form part of our daily life, especially with respect to consuming goods such as labels, tapes, note pads and even coatings in paper derivative products, as well as bottles of stainless steel, glass, PP, PE or PET and even with respect to human skin. Pressure-sensitive adhesives, especially waterborne pressure-sensitive adhesives, are particularly popular because they are time-effective, easy to apply and cost-effective while simultaneously being long-lasting and versatile.

Different approaches have been published to obtain adhesives, especially pressure-sensitive adhesives, which possess a certain degree of degradability or removability under very specific conditions.

Particularly, in US 2013/0143991 A1 pressure-sensitive adhesives containing N-vinylcaprolactam homopolymers (NVC), N-vinylpyrrolidone copolymers (NVP) and mixtures thereof are provided for their application in skin bandages. However, these pressure-sensitive adhesives have to comprise relatively high amounts (i.e. between 20 and 60 wt.-%) of such water-soluble polymers to enable a certain removability when exposed to water; above all, these adhesives have to comprise even higher amounts (i.e. between 33 and 80 wt-%) of a plasticizer to be able to be used as pressure-sensitive adhesives at all. Thus, the range of possible applications of these adhesives is very limited and, in addition, these adhesives are not always sufficiently degradable or removable under all required conditions.

Also, in U.S. Pat. Nos. 5,395,907 A and 5,508,367 A pressure-sensitive adhesives comprised of a copolymer of a water-soluble base monomer and a water-soluble macromer are provided. However, also these pressure-sensitive adhesives require high amounts of water soluble monomers and are obtained only in the presence of solvents (i.e. VOCs such as ethyl acetate or isopropyl alcohol). Also relatively high amounts of a specific macromer of a defined formula are required on behalf of a relatively complex synthesis for producing such pressure-sensitive adhesives.

Moreover, also other approaches have been tried to produce adhesives with a certain degree of degradability or removability. In this context, a commonly employed chemical strategy is the use of water/alkali-soluble tackifiers imparting tackiness; tackifiers are usually low molecular mass polymers mainly composed of ethoxylated alkyl phenols and linear glycols or (meth)acrylate copolymers containing elevated amounts of carboxyl groups. These water/alkali-soluble tackifying resins may be added to respective adhesive formulations, thus making them removable, to a certain degree, under water (e.g. cold or hot) and/or under alkaline conditions. However, a main disadvantage of such approach is the fact that usually relatively large amounts (e.g. between 50 and 70 wt.-%) of these water/alkali-soluble tackifiers are needed and, under high humidity conditions, these tackifiers tend to migrate from the adhesive to or into the adjacent substrate. In addition, once the tackifiers are solubilized, the non-water soluble adhesives represent a non-degradable contamination issue. Among the different kinds of these water/alkali-soluble tackifying resins, a synthetic hygroscopic family based on polyethyloxazoline has been commercialized under the tradename of Aquazole®. When between 50 and 70 wt-% of this type of tackifying resin is incorporated in adhesive formulations for paper applications, a certain degree of removability has been claimed (cf. US 2009/01767115 A1).

Another alternative approach to alkaline soluble resins (tackifiers) is the use of water-soluble protective colloids, such as e.g. polyvinylalcohols, polyvinylmethylethers, polyethyleneamines, polyethyleneimines, polyvinylpyrrolidones, polyacrylamide derivatives, hydroxyethyl cellulose or carboxymethyl cellulose derivatives, in respective adhesive formulations (cf. e.g. U.S. Pat. No. 3,657,396 A or 5,834,538 A). These colloids act as stabilizers during the emulsion polymerization process, using different quantities depending upon the desired ratio of performance, on the one hand, and water sensitivity, on the other hand. As an example, polyvinylmethylether has been used in the range of from 0.5 to 95 wt-% or, alternatively, carboxymethyl cellulose in the range of from 0.1 to 30 wt-%. It is worth mentioning that cellulose derivatives have been mostly employed on skin adhesive applications because of their chemical affinity as well as their biocompatibility. For other applications and universal usage, these colloids are less appropriate. Above all, colloids tend to reduce performance of the resulting adhesives.

Thus, in the prior art, there do not exist high-performance polymeric compositions which are appropriate for use as or in pressure-sensitive adhesives and which are degradable or removable under pre-defined, especially moderate or mild conditions, especially under neutral or basic (alkaline) conditions (i.e. in contact with water under neutral or basic/alkaline conditions), and which provide, at the same time, good or even improved performance properties, particularly adhesivity and adhesiveness as well as cohesiveness, especially for a multitude of different usages and applications and/or for universal use. Furthermore, most prior art approaches provide pressure-sensitive adhesives which are merely synthetic or are based on a very low or insignificant bio-based content.

OBJECTS OF THE PRESENT INVENTION

What is needed are thus pressure-sensitive adhesives (=PSAs) which are removable under (pre)defined, especially mild or moderate conditions, particularly under neutral or basic (alkaline) conditions (i.e. in contact with water under neutral or basic/alkaline conditions), and which at the same time possess high-performance adhesive properties, particularly high-performance PSA properties, such as e.g. adhesivity, especially for a multitude of different usages and applications and/or especially for universal usage. The expression "removable under neutral or basic (alkaline) conditions", as used in the present invention, particularly refers to the removability of the inventive adhesives in contact with water (i.e. water in the liquid state) under neutral or basic (=alkaline) conditions.

Therefore, it is an object of the present invention to provide a method for producing a preferably water-based (waterborne) polymeric composition, especially a preferably water-based (waterborne) polymeric composition which can be used as or in an adhesive, especially a pressure-sensitive adhesive, wherein the aforementioned disadvantages and/or drawbacks of the prior art should be at least partially avoided or even at least essentially overcome.

Particularly, it is another object of the present invention to provide a method for producing a preferably water-based (waterborne) polymeric composition which may especially be used as or in an adhesive, especially a pressure-sensitive adhesive, particularly a pressure-sensitive adhesive removable under neutral or basic (alkaline) conditions (i.e. in contact with water under neutral or basic/alkaline conditions), and which is preferably in the form of a water-based (waterborne) dispersion (i.e. emulsion or latex).

Especially, in view of the prior art described hereinbefore, another problem underlying the present invention is especially to provide a preferably water-based (waterborne) polymeric composition, especially a preferably water-based (waterborne) polymeric composition which can be used as or in an adhesive, especially a pressure-sensitive adhesive, particularly a pressure-sensitive adhesive removable under neutral or basic (alkaline) conditions (i.e. in contact with water under neutral or basic/alkaline conditions), preferably in the form of a water-based (waterborne) dispersion (i.e. emulsion or latex), which polymeric composition is to at least partially avoid or to at least essentially overcome the aforementioned disadvantages and/or drawbacks of the prior art.

Especially, yet another particular problem addressed by the present invention is that of providing a preferably water-based (waterborne) polymeric composition, preferably in the form of a water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition, especially when used in or as an adhesive, provides efficient and long-lasting adhesion and is, at the same time, removable when subjected to a treatment under defined and particularly neutral or basic (alkaline) conditions (i.e. in contact with water under neutral or basic/alkaline conditions).

Furthermore, it is still another object of the present invention to provide a respective method for producing a preferably water-based (waterborne) polymeric composition, preferably in the form of a water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition and its respective method of production shall be compatible with environmental requirements and constraints, especially avoiding the use of deleterious and/or toxic ingredients or materials (such as e.g. volatile organic compounds VOCs etc.) and/or not leading to highly polluted wastes. Also a high bio-based content is desirable (i.e. use of bio-based raw or starting materials).

Moreover, it is yet another object of the present invention to provide a method for producing a preferably water-based (waterborne) polymeric composition, preferably in the form of a water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition shall be economic and cost-efficient in its production and shall be easy to be used and/or to be applied.

Especially, it is yet another object of the present invention to provide and/or to develop a novel preferably water-based (waterborne) polymeric composition, preferably in the form of a water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which is especially appropriate for use as or in pressure-sensitive adhesives removable under defined neutral or basic (alkaline) conditions and shows improved properties, especially improved adhesion, while at the same time being environmentally compatible, economic and cost-efficient in its production as well as easy to use and to apply.

Further, it is also still another object of the present invention to provide a random copolymer comprising free carboxylic acid groups or, in an alkaline medium, carboxylate groups on the outside of the copolymeric particles, and when being incorporated into a polymeric composition (i.e. polymeric network), especially via grafting, leading to removability of such polymer under defined and particularly neutral or basic (alkaline) conditions (i.e. in contact with water under neutral or basic/alkaline conditions), which random copolymer is particularly appropriate to be incorporated into a polymeric composition, especially a polymeric composition which can be used as or in an adhesive, especially a pressure-sensitive adhesive, preferably a pressure-sensitive adhesive removable under neutral or basic (alkaline) conditions, and/or which random copolymer is, one the one hand, particularly appropriate to be used as a seed and/or as an emulsifier and/or as a stabilizer in a copolymerization method and which random copolymer is, on the other hand, particularly appropriate for providing a polymeric composition with free carboxylic acid groups, particularly leading, when being incorporated into a polymeric composition (i.e. polymeric network), to removability under defined neutral or basic (alkaline) conditions.

Finally, it is yet another object of the present invention to provide an adhesive, especially a pressure-sensitive adhesive, especially removable under neutral or basic (alkaline) conditions (i.e. in contact with water under neutral or basic/alkaline conditions), particularly in the form of a water-based (waterborne) or solvent-based (solventborne) composition (particularly in the form of a water-based composition), preferably in the form of a dispersion (i.e. emulsion or latex), which adhesive shows improved properties, especially improved adhesion, while, at the same time, being removable under neutral or basic (alkaline) conditions and/or while simultaneously being environmentally compatible, economic and cost-efficient in its production as well as easy to be used and to be applied. Above all, also a high bio-based content is desirable (i.e. use of bio-based raw or starting materials).

SUMMARY OF THE INVENTION

The present invention, according to a first aspect of the present disclosure refers to a method for producing a polymeric composition according to the description that follows; further and especially advantageous embodiments of the inventive method are the subject-matter of the method claims provided.

Furthermore, a second aspect of the present disclosure relates to a preferably water-based (waterborne) polymeric composition disclosed; further and especially advantageous embodiments of the inventive preferably water-based (waterborne) polymeric composition are similarly disclosed.

Further, a third aspect of the present disclosure relates to the use of the inventive preferably water-based (waterborne) polymeric composition.

Moreover a fourth aspect of the present disclosure relates to an adhesive comprising an inventive preferably water-based (waterborne) polymeric composition and especially advantageous embodiments of the inventive adhesive.

Moreover, a fifth aspect of the present disclosure relates the use of an inventive adhesive.

Further, a sixth aspect of the present disclosure relates to an inventive graft copolymer, as defined herein and especially advantageous embodiments of the inventive graft copolymer are similarly provided.

Moreover, a seventh aspect of the present disclosure also relates to an inventive random copolymer and/or a copolymeric composition, and especially advantageous embodiments of the inventive random copolymer.

Finally, an eighth aspect of the present disclosure also relates to the use of an inventive random copolymer and/or an inventive copolymeric composition, and especially advantageous embodiments thereof.

Before the present invention will be described more in detail hereinafter, the following general remarks are given:

It will be appreciated and it goes without saying that, in the following, features, embodiments, configurations or the like which are described or cited hereinafter for just one aspect of the present invention or for the purpose of avoiding repetitions do, of course, also apply correspondingly and mutatis mutandis in relation to all other aspects of the present invention.

Moreover, it will be appreciated and goes also without saying that all single features, embodiments, configurations or the like are also to be understood and are also disclosed in their respective combinations with one another.

Furthermore, it will be appreciated that, in the case of any values, numbers, figures, ranges etc. indicated hereinafter, any ranges etc. stated should not be understood in a restrictive but merely illustrative or exemplary manner. It will be apparent to the person skilled in the art that, depending on the individual case and/or based on the respective application, it is possible to deviate from the stated ranges, figures, values etc., without leaving the scope of the present invention.

Moreover, any values, numbers, figures, ranges, parameters and the like indicated hereinafter may be determined or ascertained, in principle, by standardized or expressly specified determination methods or else by determination methods well-known per se to those skilled in the art.

Furthermore, in relation to any hereinbelow recited relative or percentage-based indications, in particular weight-based amounts, it goes without saying that these indications are, in the context of the present invention, to be selected and/or to be combined by a person skilled in the art such that the resulting sum total—including where applicable any further components/ingredients—always results in 100% or 100 wt.-%, respectively.

Having stated this and with these provisions, the present invention will be described more in detail hereinafter.

DETAILED DESCRIPTION OF THE INVENTION

Figure 1:
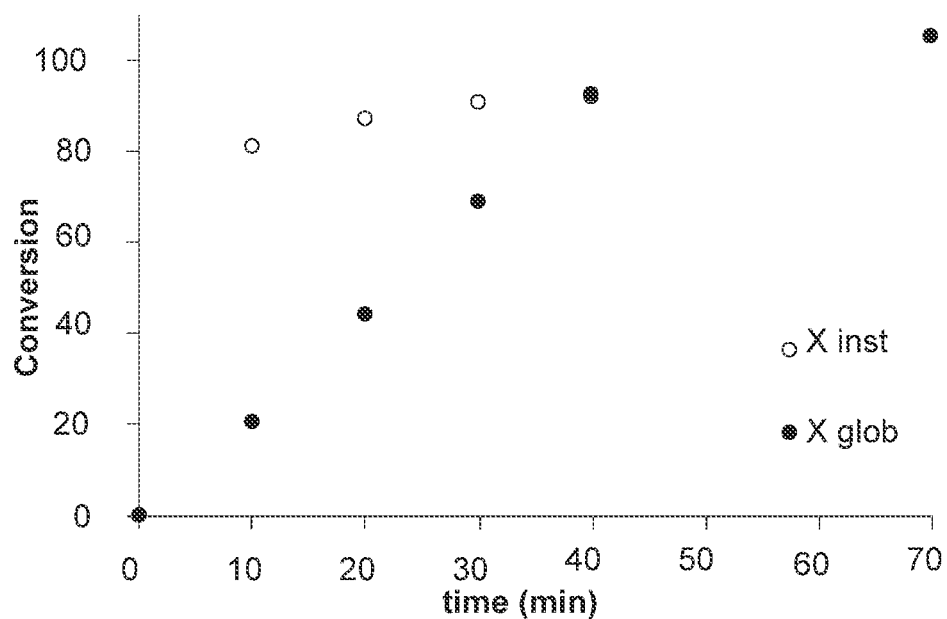
FIG. 1 shows the instantaneous and overall conversion during stage (a) according to a particular embodiment of the invention.

According to a first aspect of the present invention, the present invention refers to a method for producing a preferably water-based (=waterborne) polymeric composition, especially in the form of a preferably water-based (=waterborne) dispersion (i.e. emulsion or latex), particularly to be used as or in an adhesive, especially a pressure-sensitive adhesive, particularly a pressure-sensitive adhesive removable under neutral or basic (alkaline) conditions,
  wherein the method comprises a two-stage polymerization process, especially a two-stage emulsion polymerization process, preferably a two-stage radical emulsion polymerization process,
  wherein:
  (a) in a first stage (a), a copolymerization of monomers (=moieties) (i), (ii) and (iii) is performed via emulsion polymerization, preferably via radical emulsion polymerization, wherein (i) monomer (=moiety) (i) comprises at least one ethylenically unsaturated monomer, the homopolymer of which has a glass transition temperature $Tg^{(i)}$ ranging from −100° C. to −10° C., especially from −60° C. to −20° C., (ii) monomer (=moiety) (ii) comprises at least one mono- or difunctional bicyclic monomer comprising at least one substituent comprising one ethylenically unsaturated bond (i.e. carbon-carbon double bond), preferably at least one substituent comprising a (meth)acrylic rest (i.e. radical), especially wherein the at least one mono- or difunctional bicyclic monomer is derived from isosorbide or from (iso)borneol, (iii) monomer (=moiety) (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms;

so as to produce a first copolymer (A) which comprises moieties (i), (ii) and (iii) each as defined hereinabove and contains free carboxylic groups —C(O)—OH, followed by a (step of) conversion of the free carboxylic groups into carboxylate groups —C(O)—O⁻; subsequently (b) in a second stage (b), a copolymerization of monomers (=moieties) (i) and (ii) is performed via emulsion polymerization, preferably via radical emulsion polymerization, in the presence of the carboxylate groups containing first copolymer (A) obtained from stage (a), wherein monomers (=moieties) (i) and (ii) correspond to the above definitions, however, with the proviso that monomers (=moieties) (i) and (ii) used in the second stage (b) may be the same as or different from those used in the first stage (a), so as to produce a graft copolymer (B) comprising a copolymeric structure of moieties (i) and (ii) obtained from the second stage (b) copolymerization and which is covalently bonded with the first copolymer (A) via grafting.

Thus, in the case of the present invention, the inventive method leads to a graft copolymer comprising the aforedefined moieties (i), (ii) and (iii), especially in random distribution, which are the three different moieties or monomers from which the resulting graft copolymer is obtainable via the inventive two-stage copolymerization method. Especially, the graft copolymer comprises a copolymeric structure comprising moieties (i) and (ii), which copolymeric structure is covalently bonded, via grafting, with another copolymeric structure comprising moieties (i), (ii) and (iii).

As applicants have surprisingly found out, the inventive two-stage method, wherein, in a first stage (a), a free carboxylate groups containing first copolymer (A) is produced and then, in a second stage (b), the free carboxylate groups containing first copolymer is grafted with a copolymeric structure produced in the second stage (b) to produce a graft copolymer (B) containing free carboxylic acid groups, which graft copolymer (B) and the polymeric composition containing such graft copolymer (B), respectively, is surprisingly appropriate for the use as or in pressure-sensitive adhesives being removable under pre-defined, especially moderate or mild conditions (e.g. under neutral or basic/alkaline conditions) and providing, at the same time, good or even improved performance properties, particularly adhesivity/adhesion but also cohesion, particularly for a multitude of different usages and applications and/or for universal use, respectively.

Surprisingly, the free carboxylic acid groups or free carboxylate groups, respectively, containing first copolymer (A) may exert a multiple functions in the second stage (b) of the inventive process (i.e. during the graft copolymerization reaction of the second stage) and surprisingly exerts multiple functions also within the resulting copolymeric structure, i.e. providing removability under the above defined conditions, optionally providing additional crosslinkages through grafting within the copolymeric structure, and also improving both adhesiveness and cohesiveness of the copolymeric structure.

Moiety (ii) itself is a mono- or difunctional monomer being derived from isosorbide or (iso)borneol. In this context, the term "derived from isosorbide or (iso)borneol" particularly means that an isosorbide or an (iso)borneol forms a base skeleton of monomer/moiety (ii); in other words, this means that an isosorbide-based bicyclic skeleton or a (iso)borneol-based bicyclic skeleton is comprised or contained by moiety (ii) and is consequently incorporated into the resulting final copolymer. In again other words, the term "derived from isosorbide" or "derived from (iso) borneol" in this context particularly denotes an isosorbide or (iso)borneol having been subjected to a reaction, especially an esterification reaction, in order to add to or incorporate into the isosorbide or (iso)borneol, respectively, the at least one substituent comprising one ethylenically unsaturated bond (i.e. carbon-carbon double bond); i.e. thus incorporating to or into the isosorbide or (iso)borneol skeleton an additional or new functional group or substituent, preferably a (meth)acrylic functional group. Thus, moiety (ii) does not comprise isosorbide or (iso)borneol itself but rather its derivative which comprise an isosorbide or (iso)borneol base skeleton comprising at least one substituent comprising one ethylenically unsaturated bond (i.e. carbon-carbon double bond), preferably at least one substituent comprising a (meth)acrylic rest (i.e. a (meth)acrylic radical), instead of the hydroxyl group(s) of unsubstituted isosorbide or an (iso)borneol.

Consequently, the isosorbide-based moiety (ii) as used in the present invention may be represented by the following general formula, wherein $R^1$ represents a substituent comprising one ethylenically unsaturated bond (i.e. carbon-carbon double bond) and wherein $R^2$ represents a substituent comprising one ethylenically unsaturated bond (i.e. carbon-carbon double bond) in the case of the difunctional monomer or hydrogen in the case of the monofunctional monomer:

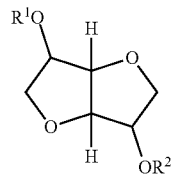

The compound isosorbide, also known as D-isosorbide, 1,4:3,6-dianhydro-D-sorbitol, 1,4:3,6-dianhydro-D-glucitol, 1,4-dianhydrosorbitol or (3R,3aR,6S,6aR)-hexahydro-furo [3,2-b]furan-3,6-diol (according to IUPAC=International Union of Pure and Applied Chemistry), is a bicyclic chemical compound from the group of diols and oxygen-containing heterocycles, containing two fused furan rings. Isosorbide itself is obtained e.g. by acid-catalyzed dehydration of D-sorbitol which yields the monocyclic furanoid sorbitan, which, upon further dehydration, forms the bicyclic furofuran derivative isosorbide. D-sorbitol again is obtained e.g. by catalytic hydrogenation of D-glucose, which is in turn produced by hydrolysis of starch.

The molecule of isosorbide may be represented by the following planar structural formula:

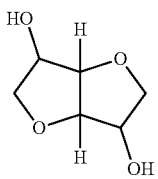

Thus, isosorbide is a plant-based or bio-based chemical material from which biodegradable derivatives of various functionalities can be obtained. D-isosorbide is a specific isomer with a distinct conformation, which is illustrated by the following formula:

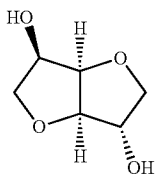

Thus, the two secondary hydroxyl groups in the V-shaped bicyclic system of the above formula possess different orientations, leading to different chemical reactivities. Hence, a selective monoderivatization of isosorbide is possible. The hydroxyl group in 5-position is endo-oriented and forms a hydrogen bond with the oxygen atom in the adjacent furan ring. This makes the hydroxyl group in 5-position more nucleophilic and more reactive than the exo-oriented hydroxyl group in 2-position.

In the case of the present invention, the isosorbide-based or isosorbide-derived structure of moiety (ii) is modified, if compared to isosorbide itself as represented by the above formulae, by replacing one or both hydroxyl groups of the isosorbide by a substituent comprising one ethylenically unsaturated bond (i.e. carbon-carbon double bond), especially a methacrylic rest (radical), i.e. $CH_3$—$C(CH_2)$—$C(O)$—.

The compound (iso)borneol, also known as endo/exo-1,7,7-trimethyl-bicyclo[2.2.1]heptan-2-ol (according to IUPAC=International Union of Pure and Applied Chemistry), is a bicyclic organic compound and a terpene derivative, wherein two different enantiomers of borneol exist. In (iso)borneol the hydroxyl group is placed in an exo-position. Borneol occurs naturally in over 260 plants and is found for example in citrus pear oils, pine tree, spices such as nutmeg, ginger and thyme.

Moreover, the (iso)borneol-based moiety (ii) may be represented by the following general formula, wherein $R^1$ represents a substituent comprising one ethylenically unsaturated bond (i.e. carbon-carbon double bond):

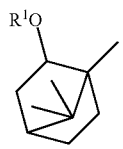

The molecule of (iso)borneol may be represented by the following structural formula:

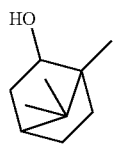

In the case of the present invention, the (iso)borneol-based or (iso)borneol-derived structure of moiety (ii) is modified, if compared to (iso)borneol itself as represented by the above formula, by replacing the hydroxyl group of the (iso)borneol by a substituent comprising one ethylenically unsaturated bond (carbon-carbon double bond), preferably by a substituent comprising a (meth)acrylic rest (radical).

Consequently, the iso)borneol-based moiety (ii) as used in the present invention may be represented by the following general formula, wherein $R^1$ represents a substituent comprising one ethylenically unsaturated bond (i.e. carbon-carbon double bond):

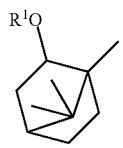

Furthermore, the term "mono- or difunctional" in context with monomer/moiety (ii) refers to the substituent comprising one ethylenically unsaturated bond (carbon-carbon double bond). Thus, a monofunctional bicyclic monomer comprises one substituent comprising one ethylenically unsaturated bond (i.e. carbon-carbon double bond) and a difunctional bicyclic monomer comprises two substituents each comprising one ethylenically unsaturated bond (i.e. carbon-carbon double bond).

Moreover, grafting refers to the process of producing a graft copolymer, wherein a graft copolymer is a segmented copolymer with a linear backbone of one composite (which can, however, comprise several different moieties) and randomly distributed branches of another composite (which also can comprise several different moieties). One of the more well-known examples of a graft copolymer is high impact polystyrene, which consists of a polystyrene backbone with polybutadiene grafted chains.

A graft copolymer can be produced according to three different methods (i.e. "grafting to"-method, "grafting from"-method and "grafting through"-method) or their respective combinations. "Grafting to" refers to the use of a backbone chain with functional groups which are distributed randomly along the chain and which functional groups are reactive and a graft copolymer is formed by a coupling reaction at these reactive functional groups. "Grafting from" refers to the use a macromolecular backbone with reactive site, wherein these reactive sites can be modified to initiate functionality; then further monomers can be added and copolymerized to form new polymeric chains. "Grafting through", also known as the macromonomer method, refers to the copolymerization of a macromonomer with new monomers (radicals).

Without being willing to be bound to any specific theory, the grafting process occurring in the second stage (b) of the present method may predominantly be considered as a "grafting through"-process: The growing chains react to or with the pendant double bonds present in copolymer (A). Particularly, this is to apply when moiety/monomer (ii) is a difunctional monomer, i.e. comprises two substituents each comprising one ethylenically unsaturated bond (i.e. carbon-carbon double bond) and preferably comprises two substituents comprising each a (meth)acrylic rest (radical) (e.g. in the case of difunctional bicyclic monomers of below formula (1b) used as moiety/monomer (ii)). In the case of a monofunctional bicyclic monomer, e.g. of below formulae (1a) and/or (1c), used as moiety/monomer (ii), there are no pendant double bonds, so that in this case grafting may still occur by abstraction of H atoms in acrylate monomer units of copolymer (A); i.e. labile H atoms are abstracted, thus creating a radical in the copolymer (A) chain that can add monomer and hence create a new chain that would have attached copolymer (A); in the latter case, grafting predominantly tends occur as a "grafting from"-propagation. This reaction may also occur for difunctional moieties/monomers (ii) but is less likely because the propagation to a double bond is faster than the abstraction reaction.

The present invention, particularly the inventive method as well as the inventive polymeric composition thus produced and the uses and applications thereof as well as the inventive graft copolymer and the inventive random copolymer thus produced and the uses and applications thereof, is linked to a multitude of particularities and advantages, which significantly distinguish the present invention over the prior art and which indicate the significant technical progress and inventiveness involved by the present invention if compared to the prior art.

The inventive method is conceived preferably as a two-stage process, particularly a two-stage (seeded) emulsion polymerization, especially a semi-batch two-step (seeded) emulsion polymerization: In a first stage (a), a random copolymer (i.e. first copolymer (A)) is produced via emulsion polymerization, and this resulting product from the first stage (a) can be used as a seed, as an emulsifier and as a stabilizer in a subsequent second stage (b); the subsequent second stage (step) (b) is thus performed as a so-called seeded polymerization, particularly as a seeded emulsion polymerization, producing a graft copolymer.

Typically, the overall method of the present invention, i.e. both the first stage (a) and also the second stage (b), is/are performed as an emulsion polymerization, particularly as a radical emulsion polymerization.

The method of the present invention as well as the resulting polymeric composition are environmentally friendly and/or environmentally compatible under several aspects and particularly fulfill also the most recent environmental requirements: The overall method of the present invention, i.e. both the first stage (a) and the second stage (b), is/are performed preferably in a liquid water-based (i.e. waterborne) carrier or milieu. Thus, the use of volatile organic compounds (VOCs) (of course, except for the used monomers) may be efficiently avoided completely. Therefore, also the resulting inventive polymeric composition, preferably dispersion (i.e. emulsion or latex), is conceived on a mere preferably water-based (waterborne) basis or formulation, so that also on behalf of its use or application no volatile organic substances have to be handled. Consequently, both the inventive method and the resulting polymeric composition of the present invention are highly environmentally friendly and thus fulfill also the most recent requirements as to environmental compatibility.

When the overall method of the present invention is performed according to a preferred embodiment, wherein it is performed in a water-based (waterborne) carrier system or milieu, waste waters or wastes polluted with organics are completely avoided. This facilitates performing and handling of the inventive method and the resulting polymeric composition and contributes to the highly environmental compatibility of the present invention. Thus, the invention is also applicable on an industrial level or on a large-scale level, respectively.

Furthermore, for the synthesis or production of the inventive polymeric composition as a whole, bio-based raw-materials can be used. The polymeric composition can have a bio-content of up to 71%, resulting in an especially high environmental compatibility and in a significant reduction of the so-called carbon-footprint.

The inventive method may be performed either as a continuous process, especially as a continuous one-pot process, or, alternatively, stages (a) and (b) may be performed separately. When performing stages (a) and (b) separately, a masterbatch of the first copolymer (A) may be produced and stored (wherein for storing the first copolymer (A) the free carboxylic groups may not yet be converted into carboxylate groups; i.e. the conversion of the free carboxylic groups into carboxylate groups may be performed only immediately before the second stage (b)). Thus, also for these reasons, the invention is also applicable on an industrial level or on a large-scale level, respectively.

Above all, high-performance polymeric compositions are provided by the present invention, which can especially be used as or in an adhesive, especially as or in a pressure-sensitive adhesive, particularly as or in a pressure-sensitive adhesive removable under neutral or basic (alkaline) conditions (i.e. in contact with water under neutral or basic/alkaline conditions): On the one hand, the inventive polymeric composition, especially when used in or as an adhesive, especially a pressure-sensitive adhesive, particularly a pressure-sensitive adhesive removable under neutral or basic (alkaline) conditions, provides excellent adhesion properties; on the other hand, the inventive polymeric composition, especially when used in or as an adhesive, especially a pressure-sensitive adhesive, particularly a pressure-sensitive adhesive removable under neutral or basic (alkaline) conditions, can be removed under defined neutral or basic (alkaline) conditions, especially without leaving any relevant residues on the surface of the adherend. These properties, inter alia, significantly distinguish the present polymeric composition from prior art compositions, i.e. the inventive polymeric composition, especially when used in or as an adhesive, especially a pressure-sensitive adhesive, particularly a pressure-sensitive adhesive removable under neutral or basic (alkaline) conditions, unifies, at the same time, excellent adhesion properties, on the one hand, and superior removability under defined neutral or basic (alkaline) conditions, especially without leaving any significant residues on the adherend, on the other hand.

When using a difunctional bicyclic monomer derived from isosorbide as monomer (moiety) (ii), especially dimethacrylic isosorbide, which enables grafting in the second stage (b) (i.e. it functions as a crosslinker) and comprises functional groups, especially ester groups, (which, when being incorporated into a polymeric composition [i.e. polymeric network], lead to improved removability under neutral or basic/alkaline conditions), a kind of a double functionality can already be provided by such difunctional bicyclic monomer derived from isosorbide, especially dimethacrylic isosorbide: On the one hand, the polymeric composition, especially when used in or as an adhesive, especially a pressure-sensitive adhesive, particularly a pressure-sensitive adhesive removable under neutral or basic (alkaline) conditions, provides effective and improved adhesive strength, especially both improved adhesion and cohesion. On the other hand, the polymeric composition, especially when used in or as an adhesive, especially as a pressure-sensitive adhesive, particularly as a pressure-sensitive adhesive removable under neutral or basic (alkaline) conditions, can be removed under defined neutral or basic (alkaline) conditions and therefore be peeled and/or removed and/or released from the adherend basically without leaving any significant residue. Thus, an adhesive can be provided with or in the form of the inventive polymeric composition which adheres permanently until subjected to a purposeful and targeted treatment in neutral or basic (alkaline) conditions, resulting in the removal and/or release and/or peel from the adherend (i.e. without leaving any residues).

Furthermore, when using a monofunctional bicyclic monomer derived from isosorbide as monomer (moiety) (ii), especially monomethacrylic isosorbide, which comprises one hydroxyl group and is thus able to form hydrogen bonds, also providing a kind of double functionality: On the one hand, the polymeric composition, especially when used in or as an adhesive, especially a pressure-sensitive adhesive, particularly a pressure-sensitive adhesive removable under neutral or basic (alkaline) conditions, provides effective and improved adhesive strength due to hydrogen bonds formed with the substrate and due to hydrogen bonds form within the polymeric composition providing improved intrinsic strength (comparable to the intrinsic strength provided by crosslinkers). Especially, a high hydrogen bond density leads to an increased resistance to flow and shifts the deformation behavior from viscous towards elastic. On the other hand, the polymeric composition, especially when used in or as an adhesive, especially a pressure-sensitive adhesive, particularly a pressure-sensitive adhesive removable under neutral or basic (alkaline) conditions, can be removed under defined neutral or basic (alkaline) conditions and therefore be peeled and/or removed and/or released from the adherend basically without leaving any significant residue, especially since the hydrogen bonds both formed with the substrate and formed intrinsically are easily broken in the presence of water. Thus, an adhesive can be provided with or in the form of the inventive polymeric composition with improved adherence but also with improved removability.

In this respect, hydrogen bonds are reversible physical bonds which can reinforce the polymer matrix (intrinsic strength), however, allow molecular motion. Overall, hydrogen bonds improve the cohesive strength in a polymeric network used as or in an adhesive.

Moreover, when using a monofunctional bicyclic monomer derived from (iso)borneol as monomer (moiety) (ii), especially monomethacrylic (iso)borneol, the homopolymer of which has a very high glass transition temperature Tg (i.e. a Tg of about 150° C.), rigidity and stiffness to the polymeric network is provided and thus cohesiveness is improved. Hence, the solid-like behavior of the resulting material is enhanced. Consequently, due to the rigid chemical structure resulting from the bulky bicyclic structure, improved cohesiveness is provided and furthermore the Tg of the resulting copolymer (i.e. both of the first copolymer (A) and also of the graft copolymer (B)) can be adjusted by adapting the amount of monomer (moiety) (ii) used in the inventive method. Furthermore, the polymeric composition, especially when used in or as an adhesive, especially a pressure-sensitive adhesive, particularly a pressure-sensitive adhesive removable under neutral or basic (alkaline) conditions, can be removed without leaving any residues due to the increased cohesiveness, which cohesiveness also remains high during the debonding process, especially adhesive failure instead of cohesive failure can be ensured. Thus, an adhesive can be provided with or in the form of the inventive polymeric composition with improved cohesiveness also during removal, thus not leaving any residues. Moreover, monomethacrylic (iso)borneol can be provided with a very high bio-content of about 73%, thus improving the high environmental compatibility of the polymeric composition and significantly reducing the so-called carbon-footprint.

Consequently, depending on which of the aforedescribed monomers is used as monomer (moiety) (ii) or which combination of monomers is used, the properties, especially the mechanical properties, the adhesive properties and the debonding properties, can be adjusted or tailored with respect to the final application. Particularly, the glass transition temperature Tg, the adhesiveness, the cohesiveness and the removability of the resulting polymeric composition can be tailored. In this context, each of the monomers usable as monomer (moiety) (ii), especially their combination, improves the adhesive and/or cohesive strength while allowing easy removability or debonding in neutral or basic (alkaline) conditions, however, without any debonding or removal in environments with high humidity; particularly, debonding without leaving any residues is especially improved.

Moreover, when incorporating the aforedefined monomers as moieties (ii), especially their combination, in the copolymer comprised by the inventive polymeric composition, preferably dispersion (i.e. emulsion or latex), particularly to be used as or in an adhesive, especially a pressure-sensitive adhesive, particularly a pressure-sensitive adhesive removable under neutral or basic (alkaline) conditions, no tackifiers or other water-soluble monomers or polymers are needed to provide an adhesive, especially a pressure-sensitive adhesive, with excellent mechanical and adhesion properties as well as other properties and which nevertheless allows essentially complete and easy removability.

Figure 15:
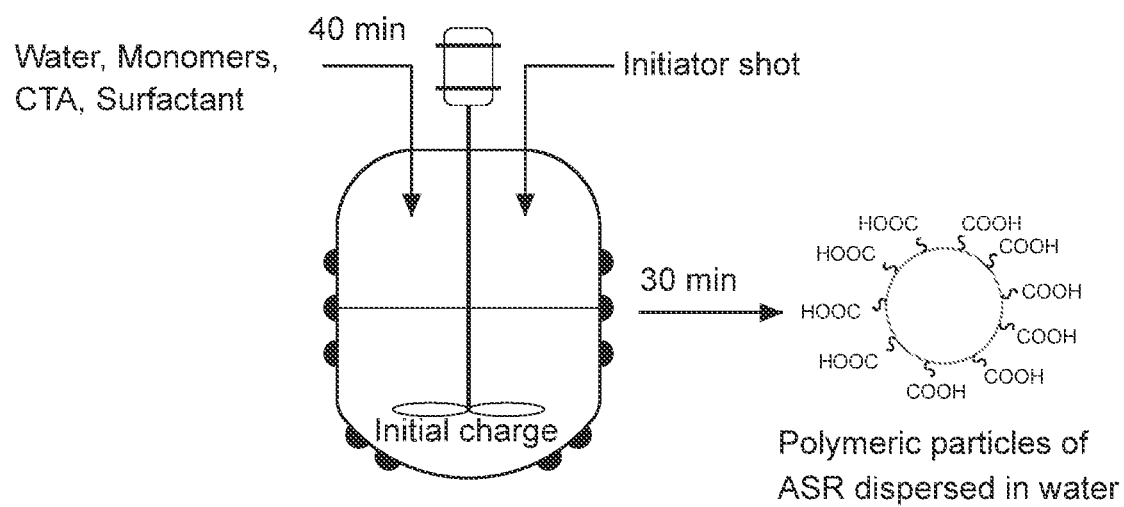
FIG. 15 shows a scheme of the first stage (a) according to a particular embodiment of the present invention.
Figure 16:
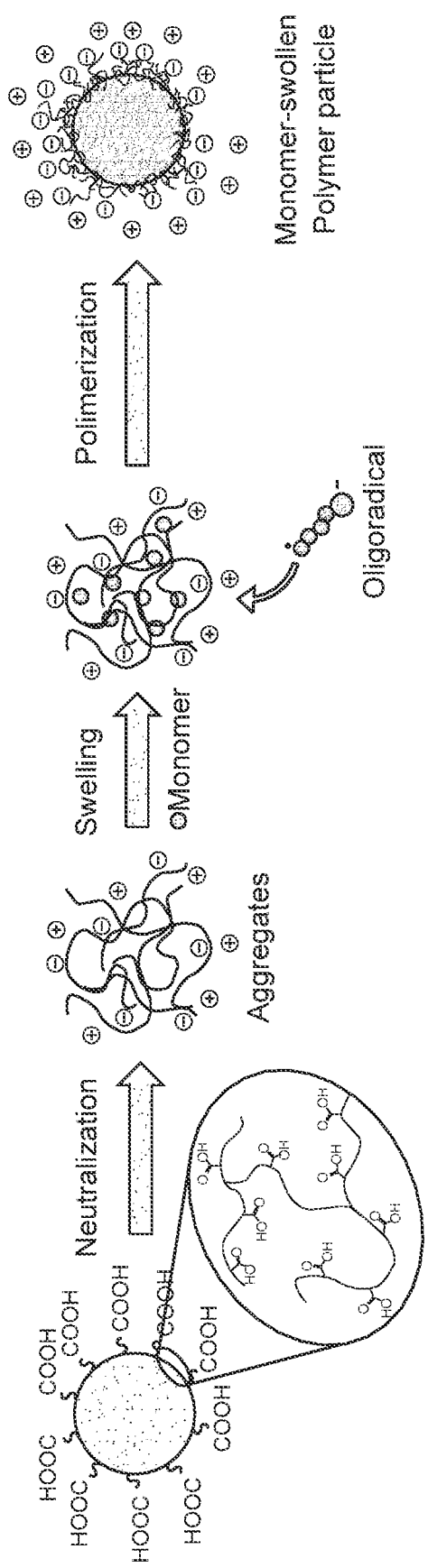
FIG. 16 shows a scheme of the conversion of the free carboxylic acid groups of the first copolymer (A) into carboxylate groups (i.e., final step or part of stage (a)) including subsequent intermediate forming of aggregates and swelling thereof (e.g. inclusion of free monomers and oligoradicals etc.), followed by the subsequent second stage (b) (i.e., polymerization) according to another particular embodiment of the present invention.

In the first stage (a) of the inventive method, the use of monomer (iii) leads to a first copolymer (A) (synonymously also called "ASR"="alkali soluble resin") which contains free carboxylic groups —C(O)—OH. These free carboxylic groups are positioned on the outside of the polymeric particles resulting from the first stage (a). These polymeric particles containing free carboxylic groups on their outside can be easily neutralized by the addition of an alkaline agent, whereby the free carboxylic groups are converted into carboxylate groups —C(O)—O$^-$. The polymeric particles containing free carboxylate groups on their outside can then act as an emulsifier, as a seed and/or as a stabilizer in the second stage (b); thus, in the second stage (b), no additional emulsifiers and/or stabilizers are needed. Due to the seeded emulsion polymerization process and due to the lack of further monomers (moieties) (iii) in the second stage (b), it can be ensured that the free carboxylic acid groups or the carboxylate groups, respectively, remain on the outside of the polymer particles resulting from the overall process according to the present invention (see also FIGS. 15 and 16). When the polymeric composition comprising graft copolymer (B) is used as or in an adhesive, the polymer particles contain free carboxylic acid groups on the outside, which strengthen the network but also providing higher flexibility due to the possibility of forming hydrogen bonds which are strong but flexible. Consequently, due to the presence of free carboxylic groups on the outside of the polymeric particles the adhesive fibers are reinforced.

Moreover, the free carboxylic groups on the outside of the polymeric particles lead to an easy and quick removability of a respective pressure sensitive adhesive in neutral or basic (alkaline) conditions. When in contact with an especially alkaline solution, the free carboxylic groups are again converted into carboxylate groups (i.e. ionization) resulting in the removability of the adhesive, especially without any residues. Thus, the free carboxylic groups on the outside of the polymeric particles lead to alkali soluble polymer particles. Especially, this results in an adhesives which can be completely removed, especially without any residues, e.g. within a time period of e.g. 10 to 20 minutes. In this respect, e.g. a slightly alkaline medium with a pH of e.g. about 10 is sufficient for such quick removal (see also FIG. 17).

Consequently, the polymeric composition or the graft copolymer (B) resulting from the inventive process is easily and quickly removable under neutral or basic (alkaline) conditions when used as or in an adhesive, especially a pressure-sensitive adhesive. This easy and quick removability results especially from the free carboxylic acid groups on the outside of the graft copolymer (B) but is further supported by moiety (ii), especially by each of the possible monomers suitable to be used as monomer (moiety) (ii), particularly isosorbide monomethacrylate, isosorbide dimethacrylate, (iso)borneol methacrylate or their combinations, especially due to the presence of groups forming hydrogen-bonds (e.g. hydroxyl groups) and ester groups, breaking under neutral or basic conditions.

The removability of the PSA, especially of the graft copolymer (B) used as or in a PSA, is furthermore controllable under defined conditions. In this context, particularly both the site and speed of the removal can be controlled; especially such controllability of removal is possible via the specific selection of monomer (moiety) (iii) and its respective amount used in the first stage (a), especially the amount of free carboxylic groups positioned on the outside of the polymer particles (i.e. graft copolymer (B)). Moreover, also the selection of monomer (moiety) (ii) used in stages (a) and (b), especially which monomer or monomer combination is used, the grafting degree within the polymeric composition and/or the copolymer comprised by the polymeric composition can influence the removability; especially, the number of functional groups, especially groups forming hydrogen-bonds (e.g. hydroxyl groups) and ester groups, breaking under neutral or basic conditions directly influence both the exact site and speed of the removal. In this context, the removal speed increases with the number of the respective functional groups, especially ester groups and groups forming hydrogen-bonds, within the copolymer (which have been introduced by moiety (ii)).

Furthermore, the removability of the copolymer comprised by the polymeric composition is also controllable with regard to the conditions, i.e. the copolymer comprised by the polymeric composition is stable under slightly acidic conditions and is only removed under neutral or basic (i.e. alkaline) conditions (i.e. in contact with water). This specific characteristic of the copolymer comprised by the polymeric composition is especially advantageous when films formed from the polymeric composition are used as or in adhesives, especially pressure-sensitive adhesives, particularly pressure-sensitive adhesives removable under neutral or basic (alkaline) conditions. Especially, the polymeric composition is not removed in environments with high humidity.

The crosslinking degree or amount of grafting within the inventive polymeric composition or within the graft copolymer (B) is also easily adjustable and controllable, especially with regard to the specific monomer (moiety) (ii) or combination of monomers (moieties) (ii) incorporated in the copolymer and their ratio, especially the amount of difunctional bicyclic monomer comprising two substituents each comprising one ethylenically unsaturated bond (carbon-carbon double bond), and, therefore, also the swelling degree and/or the swellability of the polymeric composition or the films produced from the polymeric composition can be adjusted according to the specific use or application.

Furthermore, by controlling the crosslinking degree, also the microstructure of the copolymer comprised by the polymeric composition can be controlled, which again directly influences the quality and/or performance of the polymeric composition or films produced from the polymeric composition.

Moreover, also the molecular mass (which can synonymously also be named molar mass), especially the weight-average molecular mass ($M_w$) of the copolymer, particularly of the polymer molecules (i.e. particles), of the polymeric composition can be controlled and/or tailored. This can be effected during their production e.g. by selection of monomer (moiety) (ii) and/or incorporation of chain-transfer-agents (CTAs) and/or an optional crosslinker, especially by selecting monomer (moiety) (ii) and/or chain-transfer-agent (CTA) and/or crosslinker with respect to their respective chemical nature, physicochemical properties and/or amounts.

The inventive monomer (moiety) (ii), especially mono- or difunctional bicyclic monomer comprising at least one substituent comprising one ethylenically unsaturated bond (carbon-carbon double bond), can usually be used as a hard monomer, i.e. the homopolymer of the mixture or of each monomer has a glass transition temperature $Tg^{(ii)}$ ranging from 30° C. to 200° C., especially from 40° C. to 150° C.

Thus, the resulting inventive polymeric composition may comprise a copolymer comprising, inter alia, moieties (i) and (ii) having different characteristics, namely: moiety (i) based on/derived from at least one ethylenically unsaturated monomer, the homopolymer of which has a glass transition temperature $Tg^{(i)}$ ranging from −100° C. to −10° C., especially from −60° C. to −20° C., on the one hand, and moiety (ii) comprising at least one mono- or difunctional bicyclic monomer, especially derived from isosorbide or (iso)borneol, comprising at least one substituent comprising one ethylenically unsaturated bond (i.e. carbon-carbon double bond), the homopolymer(s) of which usually has/have a glass transition temperature $Tg^{(ii)}$ ranging from 30° C. to 200° C., especially from 40° C. to 150° C., on the other hand. Consequently, moiety (i), due to the relatively low glass transition temperature $Tg^{(i)}$, forms a soft or flexible part (moiety) in the overall copolymer of the polymeric composition, whereas moiety (ii), due to the relatively high glass transition temperature $Tg^{(ii)}$, forms a rigid or stiff part (moiety) in the overall copolymer of the polymeric composition.

The resulting copolymer is thus so to say a "hybrid" copolymer comprising both at least one moiety (i) having soft or flexible characteristics, on the one hand, and also at least one moiety (ii) having rigid or stiff characteristics, on the other hand.

On behalf of application of the polymeric composition comprising such copolymer, moiety (i) having soft or flexible characteristics provides improved flexibility and flowability (e.g. improved wettability of the adherend, tack, peel etc.) and extended durability (e.g. longevity), thus resulting in improved pressure-sensitive adhesives which have enough flow to wet the adherend and to form a bond but also enough resistance to flow in order to stay adhered to the adherend when stress is applied, whereas moiety (ii) having rigid or stiff characteristics provides improved mechanical properties, especially when used in or as adhesives, particularly pressure-sensitive adhesives (such as e.g. improved peel, shear values etc.) and thus an improved adhesion to the adherend. Consequently, by using the inventive method for producing a pressure-sensitive adhesive according to the present invention, the overall performance of the resulting pressure-sensitive adhesive can be improved, especially with respect to adhesion and cohesion at the same time, particularly if compared to known prior art pressure-sensitive adhesives.

As delineated already hereinabove, moiety (ii) and/or the at least one mono- or difunctional bicyclic monomer, especially derived from isosorbide or (iso)borneol, comprising at least one substituent comprising one ethylenically unsaturated bond (carbon-carbon double bond), preferably comprising functional groups, especially ester groups, which, when being incorporated into a polymeric composition (i.e. polymeric network), lead to removability under neutral or basic (alkaline) conditions, and also hydroxyl groups forming hydrogen bonds strengthening the polymeric network while keeping it flexible and being breakable under neutral or basic (alkaline) conditions effect the easy removal of the copolymer comprised in the polymeric composition of the present invention when subjected to a treatment under defined neutral or basic (alkaline) conditions. Furthermore, moiety (iii) provides free carboxylic groups on the outside of the polymeric particles which are ionizable in alkaline solution and thus enable solving of the copolymer comprised in the polymeric composition in alkaline solutions. Above all removal only takes place when the inventive polymeric composition or the respective film produced therefrom is subjected to such defined treatment under neutral or basic (alkaline) conditions (i.e. in contact with water); otherwise (i.e. when no treatment under neutral or basic (alkaline) conditions is applied), the inventive polymeric composition or the respective film produced therefrom, especially when used as or in an adhesive, especially a pressure-sensitive adhesive, particularly a pressure-sensitive adhesive removable under neutral or basic (alkaline) conditions, provides lasting high-performance adhesion.

As delineated before, the polymeric composition of the present invention resulting from the inventive production method provides excellent properties, especially for the use in or as adhesives, particularly pressure-sensitive adhesives, more particularly pressure-sensitive adhesive removable under neutral or basic (alkaline) conditions, so that an efficient adhesion is provided by the inventive polymeric composition, fulfilling at the same time the requirements for the removal under defined neutral or basic (alkaline) conditions and those of an environmental compatibility. Especially, the use of toxic or harmful substances, such as e.g. volatile organic compounds or VOCs, may be completely avoided by the present invention. At the same time, the resulting polymeric composition provides excellent mechanical and adhesion properties as well as other properties. Furthermore, the polymeric composition can be almost completely based on bio-based materials, especially up to 71% bio-based materials or bio-content which helps to reduce the carbon-footprint and also improves the environmental compatibility of the resulting adhesive.

The polymeric composition or the film produced from the polymeric composition exhibits excellent properties which are required for pressure-sensitive adhesives, especially with respect to e.g. initial tack, loop tack, probe tack, peel resistance, shear and SAFT properties.

Apart from this, the inventive method is economically efficient and especially uses commercially available and usual starting materials, especially bio-based materials can be used, and may be easily controlled and performed also on an industrial or large-scale production level. The inventive method, i.e. the production process of the invention, is thus both economic and cost-efficient and also environmentally compatible as well as easy to use and to apply and also suited for the application on an industrial level or on a large-scale level.

On the whole, the present invention provides an efficient method for producing a polymeric composition, especially to be used in or as adhesives, especially pressure-sensitive adhesives, particularly pressure-sensitive adhesives removable under neutral or basic (alkaline) conditions. Particularly these pressure-sensitive adhesives removable under neutral or basic (alkaline) conditions produced or obtained from or derived of the inventive polymeric composition are highly suitable for the use in combination with or for adhering labels, packagings, tags, tickets, tabs, stickers, sign, plaques or the like to objects. Furthermore, by using such pressure-sensitive adhesives removable under defined neutral or basic (alkaline) conditions and produced or obtained from or derived from the inventive polymeric composition, any attached and/or adhered labels, packagings, tags, tickets, tabs, stickers, sign, plaques or the like are peelable and/or removable and/or releasable from the objects to which they are attached, especially under neutral or basic (alkaline) conditions and/or when in contact with a neutral or basic (alkaline) medium, especially without leaving any relevant residue.

Thus, the inventive polymeric composition, especially resulting from the inventive two-stage polymerization process and comprising polymeric particles with free carboxylic acid groups on the outside, can be used in order to solve known recycling problems usually associated with consumer goods such as plastics and glass bottles, especially complete removability of the labels in short times, with low energy consumption, without adding additives and without adhesive residues on the substrate.

As clearly delineated hereinbefore, the present invention, namely both the inventive process (method) as well as the polymeric composition as such resulting therefrom and also the various uses and applications thereof, are linked to a multitude of particularities and advantages which clearly distinguish the present invention from the disadvantageous prior art techniques.

In the following, the present invention, namely first of all the inventive method, will be explained in more detail.

As delineated hereinabove, according to a first aspect of the present invention, the present invention refers to a method for producing a preferably water-based (waterborne) polymeric composition, especially in the form of a preferably water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions, wherein the method comprises a two-stage polymerization process, especially a two-stage emulsion polymerization process, preferably a two-stage radical emulsion polymerization process,
wherein:
(a) in a first stage (a), a copolymerization of monomers (moieties) (i), (ii) and (iii) is performed via emulsion polymerization, preferably via radical emulsion polymerization, wherein
(i) monomer (moiety) (i) comprises at least one ethylenically unsaturated monomer, the homopolymer of which has a glass transition temperature $Tg^{(i)}$ ranging from −100° C. to −10° C., especially from −60° C. to −20° C.,
(ii) monomer (moiety) (ii) comprises at least one mono- or difunctional bicyclic monomer comprising at least one substituent comprising one ethylenically unsaturated bond (carbon-carbon double bond), preferably at least one substituent comprising a (meth)acrylic rest (radical), especially wherein the at least one mono- or difunctional bicyclic monomer is derived from isosorbide or from (iso)borneol,
(iii) monomer (moiety) (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms;
so as to produce a first copolymer (A) which comprises moieties (i), (ii) and (iii) each as defined hereinabove and contains free carboxylic groups —C(O)—OH, followed by a conversion of the free carboxylic groups into carboxylate groups —C(O)—O⁻; subsequently
(b) in a second stage (b), a copolymerization of monomers (moieties) (i) and (ii) is performed via emulsion polymerization, preferably via radical emulsion polymerization, in the presence of the carboxylate groups containing first copolymer (A) obtained from stage (a),
wherein monomers (moieties) (i) and (ii) correspond to the above definitions, however, with the proviso that monomers (moieties) (i) and (ii) used in the second stage (b) may be the same as or different from those used in the first stage (a),
so as to produce a graft copolymer (B) comprising a copolymeric structure of moieties (i) and (ii) obtained from the second stage (b) copolymerization and which is covalently bonded with the first copolymer (A) via grafting.

The glass-liquid transition or glass transition (as mentioned above in context with moiety (i)), according to IUPAC definition, is a process in which a polymer melt changes on cooling to a polymer glass or a polymer glass changes on heating to a polymer melt, respectively. Especially, the glass-liquid transition or glass transition denotes the gradual and reversible transition in amorphous polymers or in amorphous regions/moieties of semicrystalline polymers from a hard and relatively brittle (i.e. glassy or glass-like) state into a viscous or rubbery state as the temperature is increased. In this respect, the so-called glass transition temperature Tg of a polymer characterizes the temperature where this glass transition occurs.

The glass transition temperature Tg indicated hereinabove and/or hereinbelow (i.e. especially in context with moiety (i) and also in context with other moieties and/or polymers) particularly refers to the glass transition temperature Tg as defined and/or determined according to standard DIN EN ISO 11357-2:2014 (i.e. determination via Differential Scanning Calorimetry DSC). Differential scanning calorimetry (DSC) is a thermoanalytical analysis in which the difference in the amount of heat required to increase the temperature of a sample and a reference is measured as a function of temperature.

According to a particular embodiment of the present invention, it is preferred when the first copolymer (A) is a random copolymer. In this respect, a random copolymer refers to a copolymer, wherein the homopolymer subunits are in random order/sequence and the number of moieties within one homopolymer subunit is also random.

According to another particular embodiment of the present invention, it is preferred when moieties (i), (ii) and (iii) in the first copolymer (A) are present and/or are linked in random distribution.

According to a further particular embodiment of the present invention, it is preferred when the graft copolymer (B) is a random graft copolymer.

According to a yet another particular embodiment of the present invention, it is preferred when in graft copolymer (B), moieties (i), (ii) and (iii) are present and/or are linked in random distribution.

Furthermore, according to another particular embodiment of the present invention, it is preferred when in graft copolymer (B), moieties (i) and (ii) and the first copolymer (A) are present and/or are linked in random distribution.

Moreover, according to a particular embodiment of the present invention, it is preferred when, in the first stage (a), the monomers (moieties) (i), (ii) and (iii) are used in a (i)/(ii)/(iii)-weight ratio of (30-93)/(2-25)/(5-45), especially (40-91)/(3-20)/(6-40), preferably (48-88)/(4-17)/(8-35), more preferably (55-85)/(5-15)/(10-30), even more preferably (60-80)/(5-15)/(10-20). The first copolymer (A) resulting from the first stage (a), wherein the aforementioned monomer-ratio is used, is especially suitable to be used as a seed and/or as an emulsifier and/or as a stabilizer in the second stage (b).

Usually, the first stage (a) may be performed/carried out until an average molecular mass, especially a weight-average molecular mass ($M_w$), of the first copolymer (A) in the range of from 2,000 to 50,000 Da (Daltons=g/mol), especially in the range of from 5,000 to 25,000 Da, preferably in the range of from 7,500 to 20,000 Da, more preferably in the range of from 8,000 to 15,000 Da, has been reached. Typically, a first copolymer (A) with an average molecular mass, especially a weight-average molecular mass ($M_w$), in the range of from 2,000 to 50,000 Da, especially in the range of from 5,000 to 25,000 Da, preferably in the range of from 7,500 to 20,000 Da, more preferably in the range of from 8,000 to 15,000 Da, may be obtained from the first stage (a). Especially, the first stage (a) may be performed such as to produce a first copolymer (A) with an average molecular mass, especially a weight-average molecular mass ($M_w$), in the range of from 2,000 to 50,000 Da, especially in the range of from 5,000 to 25,000 Da, preferably in the range of from 7,500 to 20,000 Da, more preferably in the range of from 8,000 to 15,000 Da.

Particularly, the first stage (a) may be performed/carried out until an average molecular mass, especially a weight-average molecular mass ($M_w$), of the first copolymer (A) of at least 2,000 Da, especially of at least 5,000 Da, preferably of at least 7,500 Da, more preferably of at least 8,000 Da, has been reached. Usually, a first copolymer (A) with an average molecular mass, especially a weight-average molecular mass ($M_w$), of at least 2,000 Da, especially of at least 5,000 Da, preferably of at least 7,500 Da, more preferably of at least 8,000 Da, may be obtained from the first stage (a). Preferably, the first stage (a) may be performed such as to produce a first copolymer (A) with an average molecular mass, especially a weight-average molecular mass ($M_w$), of at least 2,000 Da, especially of at least 5,000 Da, preferably of at least 7,500 Da, more preferably of at least 8,000 Da.

Usually, the first stage (a) may be performed/carried out until an average molecular mass, especially a weight-average molecular mass ($M_w$), of the first copolymer (A) of at most 50,000 Da, especially of at most 25,000 Da, preferably of at most 20,000 Da, more preferably of at most 15,000 Da, has been reached. Especially, a first copolymer (A) with an average molecular mass, especially a weight-average molecular mass ($M_w$), of at most 50,000 Da, especially of at most 25,000 Da, preferably of at most 20,000 Da, more preferably of at most 15,000 Da, may be obtained from the first stage (a). Typically, the first stage (a) may be performed such as to produce a first copolymer (A) with an average molecular mass, especially a weight-average molecular mass ($M_w$), of at most 50,000 Da, especially of at most 25,000 Da, preferably of at most 20,000 Da, more preferably of at most 15,000 Da.

In this respect, average molecular mass, especially weight-average molecular mass ($M_w$), as referred to hereinbefore and hereinabove, may be determined by size exclusion chromatography (SEC), particularly gel permeation chromatography (GPC), preferably with refractive index detection (RI), preferably in accordance with DIN EN ISO 16014-5:2019, particularly with polystyrene (PS) as standard, especially measured with a fraction soluble in tetrahydrofuran (THF).

The average molecular mass, especially the weight-average molecular mass ($M_w$), mentioned hereinabove and hereinbelow refers to the molecular mass (i.e. average/weight-average molecular mass) measured with the respective fraction soluble in tetrahydrofuran (THF).

A first copolymer (A), resulting from the first stage (a), with an average molecular masses as defined hereinabove is especially suitable to be used as a seed and/or as an emulsifier and/or as a stabilizer in the inventive second stage (b).

Furthermore, the first stage (a) may be performed/carried out such as to produce a first copolymer (A) which has an acid value (AV), especially as determined before the conversion of the free carboxylic groups into carboxylate groups, of at least 75 mg KOH/g, especially of at least 80 mg KOH/g, preferably of at least 85 mg KOH/g, especially as determined by titration, particularly potentiometric titration, preferably in accordance with ASTM D664. Especially, the first stage (a) may be performed/carried out until an acid value (AV) of the first copolymer (A), especially as determined before the conversion of the free carboxylic groups into carboxylate groups, of at least 75 mg KOH/g, especially of at least 80 mg KOH/g, preferably of at least 85 mg KOH/g, has been reached, especially as determined by titration, particularly potentiometric titration, preferably in accordance with ASTM D664.

Moreover, the first stage (a) may be performed/carried out such as to produce a first copolymer (A) which has an acid value (AV), especially as determined before the conversion of the free carboxylic groups into carboxylate groups, in the range of from 75 to 140 mg KOH/g, especially in the range of from 80 to 120 mg KOH/g, preferably in the range of from 85 to 100 mg KOH/g, especially as determined by titration, particularly potentiometric titration, preferably in accordance with ASTM D664. Particularly, the first stage (a) may be performed/carried out until an acid value (AV) of the first copolymer (A), especially as determined before the conversion of the free carboxylic groups into carboxylate groups, in the range of from 75 to 140 mg KOH/g, especially in the range of from 80 to 120 mg KOH/g, preferably in the range of from 85 to 100 mg KOH/g, has been reached, especially as determined by titration, particularly potentiometric titration, preferably in accordance with ASTM D664.

In this respect, the acid value (synonymously also acid number) referred to hereinbefore and hereinabove indicates the mass of potassium hydroxide (KOH) in milligrams (mg) that is required to neutralize one gram of the first copolymer (A) (i.e. the free carboxylic acid group containing first copolymer (A)). The acid value is a measure of carboxylic acid groups in a chemical compound and is used to quantify the acidity of a substance.

According to a typical embodiment of the present invention, the first stage (a) may be performed/carried out until a (absolute) particle diameter in the range of from 40 nm to 200 nm, especially in the range of from 50 nm to 180 nm, preferably in the range of from 60 nm to 170 nm, more preferably in the range of from 70 nm to 160 nm, even more preferably in the range of from 80 nm to 140 nm, has been reached, especially as determined by light scattering, preferably in accordance with ISO 22412:2017. According to another typical embodiment of the present invention, the first stage (a) may be performed/carried out such as to produce a first copolymer (A) which has a (absolute) particle diameter in the range of from 40 nm to 200 nm, especially in the range of from 50 nm to 180 nm, preferably in the range of from 60 nm to 170 nm, more preferably in the range of from 70 nm to 160 nm, even more preferably in the range of from 80 nm to 140 nm, especially as determined by light scattering, preferably in accordance with ISO 22412:2017.

A first copolymer (A) with the aforementioned particle sizes is especially eligible to be used in the second stage (b) according to the present invention, especially as an emulsifier, as a seed and as a stabilizer for the production of the inventive polymeric composition comprising graft copolymer (B).

According to a particular embodiment of the present invention, the first stage (a) may be performed/carried out until a solids content, based on the total weight of the first copolymer (A) resulting from stage (a), in the range of from 1 to 50% by weight, especially in the range of from 5 to 40% by weight, preferably in the range of from 10 to 35% by weight, more preferably in the range of from 15 to 30% by weight, has been reached. According to another particular embodiment of the present invention, the first stage (a) may be performed/carried out such as to produce a first copolymer (A) which has a solids content, based on the total weight of the first copolymer (A) resulting from stage (a), in the range of from 1 to 50% by weight, especially in the range of from 5 to 40% by weight, preferably in the range of from 10 to 35% by weight, more preferably in the range of from 15 to 30% by weight.

A polymeric composition comprising the first copolymer (A) with the aforedefined solids content is especially suitable to be used in the emulsion polymerization of the second stage (b).

According to a preferred embodiment of the present invention, in the second stage (b), the moieties (monomers) (i) and (ii), on the one hand, and the carboxylate groups containing first copolymer (A), on the other hand, may be used in a (A)/[(i)+(ii)]-weight ratio of (1-50)/(50-99), especially (2-40)/(60-98), preferably (5-30)/(70-95), more preferably (10-25)/(75-90).

According to another preferred embodiment of the present invention, in the second stage (b), the moieties (monomers) (i) and (ii) as well as the carboxylate groups containing first copolymer (A) may be used in a (i)/(ii)/(A)-weight ratio of (35-90)/(2-28)/(8-37), especially (40-87)/(3-25)/(10-35), preferably (44-84)/(4-23)/(12-33), more preferably (50-80)/(5-20)/(15-30).

When using these amounts of monomers (moieties) in the second stage (b) of the inventive method, a polymeric composition or a graft copolymer (B) results which is particularly suitable to be used as or in an adhesive, especially a pressure-sensitive adhesive, particularly a pressure-sensitive adhesive removable under neutral or basic (alkaline) conditions.

Usually, the second stage (b) may be performed/carried out until an average molecular mass, especially a weight-average molecular mass ($M_w$), of the graft copolymer (B) in the range of from 30,000 to 1,000,000 Da, especially in the range of from 35,000 to 750,000 Da, preferably in the range of from 40,000 to 500,000 Da, more preferably in the range of from 45,000 to 250,000 Da, even more preferably in the range of from 50,000 to 200,000 Da, has been reached. Typically, a graft copolymer (B) with an average molecular mass, especially a weight-average molecular mass ($M_w$), in the range of from 30,000 to 1,000,000 Da, especially in the range of from 35,000 to 750,000 Da, preferably in the range of from 40,000 to 500,000 Da, more preferably in the range of from 45,000 to 250,000 Da, even more preferably in the range of from 50,000 to 200,000 Da, may be obtained from the second stage (b). Particularly, the second stage (b) may be performed such as to produce a graft copolymer (B) with an average molecular mass, especially a weight-average molecular mass ($M_w$), in the range of from 30,000 to 1,000,000 Da, especially in the range of from 35,000 to 750,000 Da, preferably in the range of from 40,000 to 500,000 Da, more preferably in the range of from 45,000 to 250,000 Da even more preferably in the range of from 50,000 to 200,000 Da.

Especially, the second stage (b) may be performed/carried out until an average molecular mass, especially a weight-average molecular mass ($M_w$), of the graft copolymer (B) of at least 30,000 Da, especially of at least 35,000 Da, preferably of at least 40,000 Da, more preferably of at least 45,000 Da, even more preferably of at least 50,000 Da, has been reached. Preferably, a graft copolymer (B) with an average molecular mass, especially a weight-average molecular mass ($M_w$), of at least 30,000 Da, especially of at least 35,000 Da, preferably of at least 40,000 Da, more preferably of at least 45,000 Da, even more preferably of at least 50,000 Da, may be obtained from the second stage (b). Generally, the second stage (b) may be performed such as to produce a graft copolymer (B) with an average molecular mass, especially a weight-average molecular mass ($M_w$), of at least 30,000 Da, especially of at least 35,000 Da, preferably of at least 40,000 Da, more preferably of at least 45,000 Da, even more preferably of at least 50,000 Da.

Usually, the second stage (b) may be performed/carried out until an average molecular mass, especially a weight-average molecular mass ($M_w$), of the graft copolymer (B) of at most 1,000,000 Da, especially of at most 750,000 Da, preferably of at most 500,000 Da, more preferably of at most 250,000 Da, even more preferably of at most 200,000 Da, has been reached. Usually, a graft copolymer (B) with an average molecular mass, especially a weight-average molecular mass ($M_w$), of at most 1,000,000 Da, especially of at most 750,000 Da, preferably of at most 500,000 Da, more preferably of at most 250,000 Da, even more preferably of at most 200,000 Da, may be obtained from the second stage (b). Especially, the second stage (b) may be performed such as to produce a graft copolymer (B) with an average molecular mass, especially a weight-average molecular mass ($M_w$), of at most 1,000,000 Da, especially of at most 750,000 Da, preferably of at most 500,000 Da, more preferably of at most 250,000 Da, even more preferably of at most 200,000 Da.

In respect, average molecular mass, especially weight-average molecular mass ($M_w$), may be determined by size exclusion chromatography (SEC), particularly gel permeation chromatography (GPC), preferably with refractive index detection (RI), preferably in accordance with DIN EN ISO 16014-5:2019, particularly with polystyrene (PS) as standard, especially measured with a fraction soluble in tetrahydrofuran.

A graft copolymer (B) with the aforedefined molecular mass is particularly eligible to be used as or in an adhesive, especially a pressure-sensitive adhesive, particularly a pressure-sensitive adhesive removable under neutral or basic (alkaline) conditions.

According to a particular embodiment of the present invention, the second stage (b) may performed/carried out until a (absolute) particle diameter in the range of from 140 nm to 300 nm, especially in the range of from 150 nm to 280 nm, preferably in the range of from 160 nm to 270 nm, more preferably in the range of from 170 nm to 260 nm, even more preferably in the range of from 180 nm to 250 nm, has been reached; especially as determined by light scattering, preferably in accordance with ISO 22412:2017. According to another particular embodiment of the present invention, the second stage (b) may be performed/carried out such as to produce a graft copolymer (B) which has a (absolute) particle diameter in the range of from 140 nm to 300 nm, especially in the range of from 150 nm to 280 nm, preferably in the range of from 160 nm to 270 nm, more preferably in the range of from 170 nm to 260 nm, even more preferably in the range of from 180 nm to 250 nm; especially as determined by light scattering, preferably in accordance with ISO 22412:2017.

According to yet another particular embodiment of the present invention, the second stage (b) may be performed/carried out until a solids content, based on the total weight of the graft copolymer (B) resulting from stage (b), in the range of from 20 to 75% by weight, especially in the range of from 25 to 70% by weight, preferably in the range of from 35 to 65% by weight, more preferably in the range of from 40 to 60% by weight, has been reached. According to a further particular embodiment of the present invention, the second stage (b) may be performed/carried out such as to produce a graft copolymer (B) which has a solids content, based on the total weight of the graft copolymer (B) resulting from stage (b), in the range of from 20 to 75% by weight, especially in the range of from 25 to 70% by weight, preferably in the range of from 35 to 65% by weight, more preferably in the range of from 40 to 60% by weight.

Furthermore, according to another particular embodiment of the present invention, it is preferred when the ratio of the [average molecular mass, especially weight-average molecular mass ($M_w$), of the graft copolymer (B)]/[average molecular mass, especially weight-average molecular mass ($M_w$), of the first copolymer (A)] is within the range of from 2 to 500, especially 3 to 250, preferably 3.5 to 150, more preferably 4 to 100, even more preferably 4.5 to 50, yet even more preferably 5 to 20.

Moreover, according to a further particular embodiment of the present invention, it is preferred when, in the overall method and/or in the overall two-stage polymerization process, the moieties (monomers) (i), (ii) and (iii) are used in a (i)/(ii)/(iii)-weight ratio of (60-97)/(3-28)/(0.25-12), especially (65-95)/(5-25)/(0.5-10), preferably (71-92)/(8-22)/(0.75-7), more preferably (75-89)/(10-20)/(1-5).

With respect to moiety (i), as delineated hereinabove, moiety (i) of the copolymer of the polymeric composition produced by the inventive method is based on or derived from an ethylenically unsaturated monomer, the homopolymer of which has a glass transition temperature $Tg^{(i)}$ ranging from −100° C. to −10° C., especially from −60° C. to −20° C. (i.e. a first ethylenically unsaturated monomer forming a homopolymer having a glass transition temperature $Tg^{(i)}$ ranging from −100° C. to −10° C., especially from −60° C. to −20° C.) (i.e. glass transition temperature $Tg^{(i)}$ in accordance with standard DIN EN ISO 11357-2: 2014).

According to a particular embodiment of the inventive method, it is preferred when monomer (moiety) (i) and/or (i) the ethylenically unsaturated monomer, the homopolymer of which has a glass transition temperature $Tg^{(i)}$ ranging from −100° C. to −10° C., especially from −60° C. to −20° C., is selected from the group consisting of:

(1) linear, branched or cycloaliphatic $C_1$-$C_{22}$-alkyl(meth)acrylates, especially methyl(meth)acrylate, ethyl(meth)acrylate, n-butyl(meth)acrylate, iso-butyl(meth)acrylate, lauryl(meth)acrylate, 2-ethylhexyl(meth)acrylate, stearyl(meth)acrylate, cyclohexyl(meth)acrylate, isobornyl(meth)acrylate, n-octyl(meth)acrylate, 2-octyl(meth)acrylate and tert-butyl(meth)acrylate;

(2) linear, branched or cycloaliphatic $C_1$-$C_{22}$-alkylacrylic acids, especially methacrylic acid and ethylacrylic acid;

(3) aryl(meth)acrylates, especially benzyl(meth)acrylate and phenyl(meth)acrylate, especially wherein the aryl radicals are each unsubstituted or substituted with up to four substituents;

(4) arylacrylic acids, especially benzylacrylic acid and phenylacrylic acid, especially wherein the aryl radicals may be each unsubstituted or substituted with up to four substituents;

(5) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclo-hexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethyl(meth)acrylate, 2-methoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether(meth)acrylate and poly(propyleneglycol)methylether(meth)acrylate;

(6) aminoalkyl(meth)acrylates, especially N,N-dimethylaminoethyl(meth)acrylate, 2-trimethylammoniumethyl(meth)acrylatchloride and N,N-dimethylaminopropyl(meth)acrylate;

(7) oxiranyl(meth)acrylates, especially 2,3-epoxybutyl(meth)acrylate, 3,4-epoxybutyl(meth)acrylate and glycidyl(meth)acrylate;

(8) styrenes and substituted styrenes, especially α-methylstyrenes, 4-methylstyrenes, 4-vinylbenzoic acid and sodium-4-vinylbenzene sulfonate;

(9) (meth)acrylonitriles;

(10) ethylenically unsaturated sulfonic acids and sulfates and salts thereof, especially potassium[3-((meth)acryloyloxy)propylsulfonate and ammonium[2-((meth)acryloyloxy)ethyl]sulfate;

(11) vinylesters of carboxylic acids comprising 1 to 20 carbon atoms, especially vinylacetate;

(12) vinylesters of versatic acids;

(13) (meth)acrylamides;

(14) N-alkyl- and N,N-dialkyl-substituted (meth)acrylamides comprising linear, branched or cycloaliphatic $C_1$-$C_{22}$-alkyl groups, especially N-(tert-butylacrylamide and N,N-dimethylacrylamide;

(15) heterocyclic (meth)acrylates, especially piperonyl (meth)acrylate;

(16) $C_1$-$C_{22}$-alkyl vinylether, especially butylvinylether, 2-ethylhexylvinylether, ethylvinylether, isobutylene, methylvinylether, propylvinylether;

(17) isobutylene (2-methylpropene).

According to yet another particular embodiment of the inventive method, it is preferred when monomer (moiety) (i) and/or (i) the ethylenically unsaturated monomer, the homopolymer of which has a glass transition temperature $Tg^{(i)}$ ranging from −100° C. to −10° C., especially from −60° C. to −20° C., is selected from the group consisting of:

(1) linear, branched or cycloaliphatic $C_1$-$C_{22}$-alkylacrylates, especially ethylacrylate, n-butylacrylate, isobutylacrylate, laurylacrylate, laurylmethacrylate, 2-ethylhexylacrylate, 2-ethylhexymethacrylate, stearylacrylate, stearylmethacrylate, n-octylmethacrylate, n-octylacrylate, 2-octylmethacrylate and 2-octylacrylate;

(2) linear, branched or cycloaliphatic $C_1$-$C_{22}$-alkylacrylic acids, especially ethylacrylic acid;

(3) arylacrylates, especially wherein the aryl radicals are each unsubstituted or substituted with up to four substituents;

(4) arylacrylic acids, especially benzylacrylic acid and phenylacrylic acid, especially wherein the aryl radicals may be each unsubstituted or substituted with up to four substituents;

(5) monoacrylates of ethers, polyethyleneglycols, polypropyleneglycols or mixed polyethylene/propylene glycols each comprising 5 to 80 carbon atoms, especially tetrahydrofurfuryl-methacrylate, tetrahydrofurfurylacrylate, methoxyethoxyethylmethacrylate, methoxyethoxy-ethylacrylate, 1-butoxypropylmethacrylate, 1-butoxypropylacrylate, cyclohexyloxymethyl-methacrylate, cyclohexyloxymethylacrylate, methoxymethoxyethylmethacrylate, methoxymethoxyethylacrylate, benzyloxymethylmethacrylate, benzyloxymethylacrylate, furfuryl-methacrylate, furfurylacrylate, 2-butoxyethylmethacrylate, 2-butoxyethylacrylate, 2-ethoxyethylmethacrylate, 2-ethoxyethyacrylate, 2-methoxyethyacrylate, allyloxymethylmethacrylate, allyloxymethylacrylate, 1-ethoxybutylmethacrylate, 1-ethoxybutylacrylate, 1-ethoxyethylmethacrylate, 1-ethoxyethylacrylate, ethoxymethylmethacrylate, ethoxymethylacrylate, poly-(ethyleneglycol)methylethermethacrylate, poly(ethyleneglycol)methyletheracrylate, poly(propyleneglycol)methylethermethacrylate and poly(propyleneglycol)methyletheracrylate;

(6) aminoalkylacrylates, especially N,N-dimethylaminoethylacrylate, 2-trimethylammoniumethylacrylatchloride and N,N-dimethylaminopropylacrylate;

(7) oxiranylacrylates, especially 2,3-epoxybutylacrylate, 3,4-epoxybutylacrylate and glycidylacrylate;

(8) styrenes and substituted styrenes;

(9) ethylenically unsaturated sulfonic acids and sulfates and salts thereof, especially potassium[3-(acryloyloxy)propyl]sulfonate and ammonium[2-(acryloyloxy)ethyl] sulfate;

(10) vinylesters of carboxylic acids comprising 1 to 20 carbon atoms;

(11) N-alkyl- and N,N-dialkyl-substituted acrylamides comprising linear, branched or cycloaliphatic $C_1$-$C_{22}$-alkyl groups;

(12) heterocyclic acrylates, especially piperonylacrylate

(13) $C_1$-$C_{22}$-alkyl vinylether, especially butylvinylether, 2-ethylhexylvinylether, ethylvinylether, methylvinylether, propylvinylether;

(14) isobutylene (2-methylpropene).

According to a preferred embodiment of the present invention, monomer (moiety) (i) and/or (i) the ethylenically unsaturated monomer, the homopolymer of which has a glass transition temperature $Tg^{(i)}$ ranging from −100° C. to −10° C., especially from −60° C. to −20° C., comprises or is 2-octylacrylate, n-butylacrylate, 2-ethylhexylacrylate and combinations thereof, preferably 2-octylacrylate.

These monomers, especially 2-octylacrylate, can be provided with a high bio-content and thus enhance the environmental compatibility of the polymeric composition and thus of a PSA comprising the inventive polymeric composition. For example, 2-octylacrylate can be provided with a bio-content of 73% and can be obtained from e.g. castor oil.

With respect to moiety (ii), as delineated hereinabove, moiety (ii) of the copolymer of the polymeric composition produced by the inventive method is based on or comprises at least one mono- or difunctional bicyclic monomer comprising at least one substituent comprising one ethylenically unsaturated bond (carbon-carbon double bond), preferably at least one substituent comprising a (meth)acrylic rest (radical), especially wherein the at least one mono- or difunctional bicyclic monomer is derived from isosorbide or from (iso)borneol.

According to a preferred embodiment of the present invention, monomer (moiety) (ii) may be selected with the proviso that monomer (moiety) (ii) comprises at least one difunctional bicyclic monomer, preferably derived from isosorbide, which comprises two substituents each comprising one ethylenically unsaturated bond (carbon-carbon double bond) and/or with the proviso that, as monomer (moiety) (ii), at least one difunctional bicyclic monomer, preferably derived from isosorbide, which comprises two substituents each comprising one ethylenically unsaturated bond (carbon-carbon double bond) is used only in one of stages (a) and (b), preferably only in the first stage (a). Preferably, both aforementioned provisos should be fulfilled (i.e. preferably "and"-linkage of both provisos);

Especially, the difunctional bicyclic monomer, preferably derived from isosorbide, which comprises two substituents each comprising one ethylenically unsaturated bond (carbon-carbon double bond) may be used in combination with and/or may be combined with at least one other monomer (moiety) (ii) being different therefrom. Preferably, the at least one other monomer (moiety) (ii) being different therefrom may be at least one monofunctional bicyclic monomer, preferably derived from isosorbide or (iso)borneol, which comprises one substituent comprising one ethylenically unsaturated bond (carbon-carbon double bond).

Monomers derived from isosorbide or (iso)borneol can have a high bio-content and thus also contribute to the high overall bio-content of the resulting polymeric composition and graft copolymer (B). A respective monomer derived from isosorbide can be obtained from e.g. glucose with a bio-content of up to 60% and a respective monomer derived from (iso)borneol can be obtained from e.g. pine tree with a bio-content of up to 77%.

According to a particular embodiment of the present invention, monomer (moiety) (ii) and/or (ii) the monomer comprising at least one mono- or difunctional bicyclic monomer comprising at least one substituent comprising one ethylenically unsaturated bond (carbon-carbon double bond) may be selected from mono- or difunctional bicyclic monomers derived from isosorbide or from (iso)borneol and which comprise at least one substituent comprising one ethylenically unsaturated bond (carbon-carbon double bond), preferably at least one substituent comprising a (meth)acrylic rest (radical).

In this context, it is preferred, when monomer (moiety) (ii) is selected with the proviso that monomer (moiety) (ii) comprises at least one difunctional bicyclic monomer, preferably derived from isosorbide, which comprises two substituents each comprising one ethylenically unsaturated bond (carbon-carbon double bond) and/or with the proviso that, as monomer (moiety) (ii), at least one difunctional bicyclic monomer, preferably derived from isosorbide, which comprises two substituents each comprising one ethylenically unsaturated bond (carbon-carbon double bond) is used only in one of stages (a) and (b), preferably only in the first stage (a). Preferably, both aforementioned provisos should be fulfilled (i.e. preferably "and"-linkage of both provisos). Especially, the difunctional bicyclic monomer, preferably derived from isosorbide, which comprises two substituents each comprising one ethylenically unsaturated bond (carbon-carbon double bond) is used in combination with and/or is combined with at least one other monomer (moiety) (ii) being different therefrom, preferably wherein the at least one other monomer (moiety) (ii) being different therefrom is at least one monofunctional bicyclic monomer, preferably derived from isosorbide or (iso)borneol, which comprises one substituent comprising one ethylenically unsaturated bond (carbon-carbon double bond).

This selection of monomer (moiety) (ii), especially with the aforementioned provisos, leads to a final copolymer with excellent adhesiveness and cohesiveness, especially when used as or in adhesives, especially pressure-sensitive adhesive, particularly pressure-sensitive adhesives removable under neutral or basic (alkaline) conditions. Furthermore, due to the selection and preferably combination of monomers (moieties) (ii) excessive crosslinking can be avoided and the molecular mass can be controlled or tailored.

According to another particular embodiment of the present invention, monomer (moiety) (ii) and/or (ii) the monomer comprising at least one mono- or difunctional bicyclic monomer comprising at least one substituent comprising one ethylenically unsaturated bond (carbon-carbon double bond) may be selected from mono- or difunctional bicyclic monomers of formulae (1a), (1b) and (1c) as well as combinations thereof:

(1a)

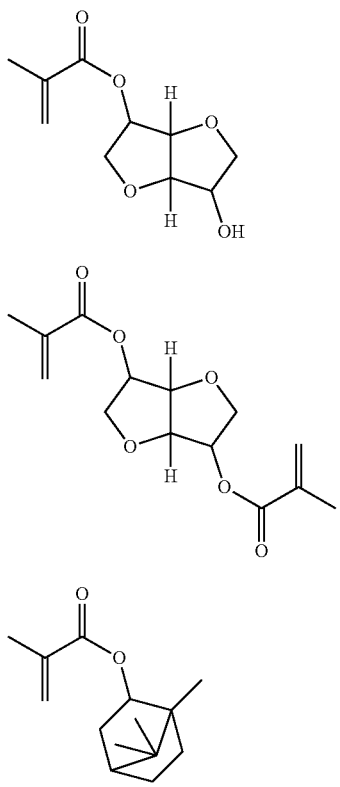

In this context, it is preferred, when monomer (moiety) (ii) is selected with the proviso that monomer (moiety) (ii) comprises at least one difunctional bicyclic monomer of formula (1b) and/or with the proviso that, as monomer (moiety) (ii), at least one difunctional bicyclic monomer of formula (1b) is used only in one of stages (a) and (b), preferably only in the first stage (a); preferably wherein both aforementioned provisos should be fulfilled (i.e. preferably "and"-linkage of both provisos). Especially, the at least one difunctional bicyclic monomer of formula (1b) is used in combination with and/or is combined with at least one other monomer (moiety) (ii) being different therefrom, preferably wherein the at least one other monomer (moiety) (ii) being different therefrom is at least one monofunctional bicyclic monomer of formula (1a) and/or (1c).

According to a further particular embodiment of the present invention, monomer (moiety) (ii) and/or (ii) the monomer comprising at least one mono- or difunctional bicyclic monomer comprising at least one substituent comprising one ethylenically unsaturated bond (carbon-carbon double bond) may be selected from a mixture of mono- and difunctional bicyclic monomers of formulae (1a) and (1b):

(1a)

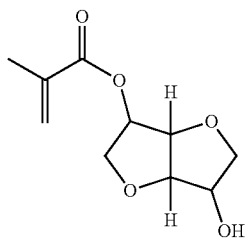

-continued

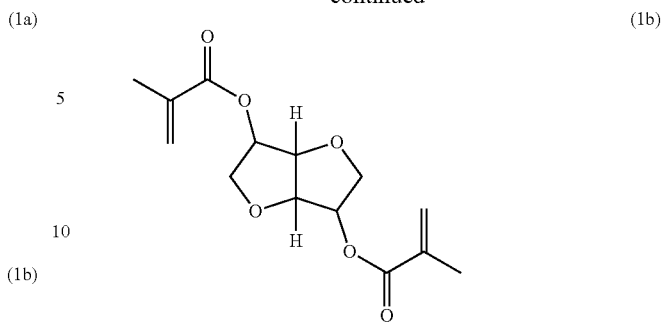

especially with a molecular ratio of monofunctional monomer (1a): difunctional monomer (1b) of at least 1:1 and particularly varying within a range of from 100:1 to 1:1, especially within a range of from 50:1 to 1,5:1, preferably within a range of from 20:1 to 2:1, more preferably of about 4:1.

In this context, it is preferred when monomer (moiety) (ii) is selected with the proviso that, as monomer (moiety) (ii), the mixture of mono- and difunctional bicyclic monomers of formulae (1a) and (1b) is used only in one of stages (a) and (b), preferably only in the first stage (a).

Furthermore, it can also be preferred, when monomer (moiety) (ii) is selected with the proviso that, as monomer (moiety) (ii), the mixture of mono- and difunctional bicyclic monomers of formulae (1a) and (1b) is used only in one of stages (a) and (b), preferably only in the first stage (a), wherein in the remaining stage, preferably in the second stage (b), a monomer (moiety) (ii) is selected to comprise or to be at least one monofunctional bicyclic monomer of formula (1a) and/or (1c).

With respect to moiety (iii), as delineated hereinabove, moiety (iii) of the copolymer of the polymeric composition produced by the inventive method is based on or comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms.

According to a particular embodiment of the inventive method, it is preferred when monomer (moiety) (iii) and/or (iii) the at least one ethylenically unsaturated carboxylic acid is selected from monoethylenically unsaturated mono- and dicarboxylic acids having 3 to 6 carbon atoms and combinations thereof.

According to a further particular embodiment of the inventive method, it is preferred when monomer (moiety) (iii) and/or (iii) the at least one ethylenically unsaturated carboxylic acid corresponds to the following general formula (2):

(2)

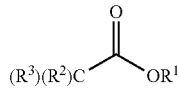

wherein in general formula (2)
  $R^1$ represents hydrogen or an organic rest (radical), especially hydrogen or a linear, branched or cyclic hydrocarbon rest (radical) which may comprise at least one heteroatom such as oxygen and/or nitrogen and/or sulfur and preferably represents hydrogen or a rest (radical) HO—C(O)—CH$_2$—CH$_3$—, more preferably represents hydrogen; and R$^2$ represents hydrogen or an organic rest (radical), especially hydrogen or a linear, branched or cyclic hydrocarbon rest (radical) which may comprise at least one heteroatom such as oxygen and/or nitrogen and/or sulfur and preferably represents hydrogen, methyl, ethyl, propyl or a rest (radical) HO—C(O)—CH$_2$—, more preferably represents hydrogen or methyl, even more preferably represents methyl; and R$^3$ represents an organic rest (radical), especially a linear, branched or cyclic hydrocarbon rest (radical) which may comprise at least one heteroatom such as oxygen and/or nitrogen and/or sulfur and preferably represents CH$_2$═, CH$_3$—CH═ or HO—C(O)—CH═, more preferably represents CH$_2$═.

According to a preferred embodiment of the inventive method, monomer (moiety) (iii) and/or (iii) the at least one ethylenically unsaturated carboxylic acid is selected from the group consisting of monoethylenically unsaturated monocarboxylic acids, monoethylenically unsaturated dicarboxylic acids and combinations thereof, especially selected from the group consisting of acrylic acid, methacrylic acid, crotonic acid, 2-ethylpropenonic acid, 2-propylpropenonic acid, 2-acryloxyacetic acid, 2-methacryloxyacetic acid, itaconic acid, fumaric acid, maleic acid and combinations thereof, preferably selected from the group consisting of acrylic acid, methacrylic acid and combinations thereof.

According to yet another particular embodiment of the inventive method, it is preferred when monomer (moiety) (i) and/or (i) the ethylenically unsaturated monomer, the homopolymer of which has a glass transition temperature Tg$^{(i)}$ ranging from −100° C. to −10° C., especially from −60° C. to −20° C., comprises or is 2-octylacrylate, n-butylacrylate, 2-ethylhexylacrylate and combinations thereof, preferably 2-octylacrylate; and/or when monomer (moiety) (ii) and/or (ii) the monomer comprising at least one mono- or difunctional bicyclic monomer comprising at least one substituent comprising one ethylenically unsaturated bond (carbon-carbon double bond) is selected from mono- or difunctional bicyclic monomers derived from isosorbide or from (iso)borneol and which comprise at least one substituent comprising one ethylenically unsaturated bond (carbon-carbon double bond), preferably at least one substituent comprising a (meth)acrylic rest (radical), and preferably is selected from mono- or difunctional bicyclic monomers of formulae (1a), (1b) and (1c) as well as combinations thereof:

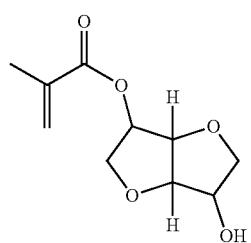

(1a)

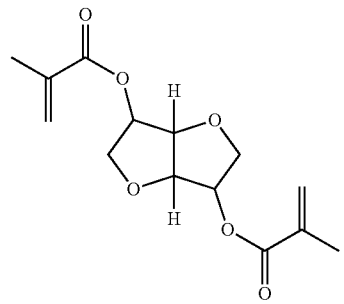

(1b)

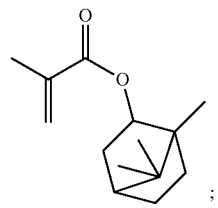

(1c)

and/or when monomer (moiety) (iii) and/or (iii) the at least one ethylenically unsaturated carboxylic acid is selected from the group consisting of monoethylenically unsaturated monocarboxylic acids, monoethylenically unsaturated dicarboxylic acids and combinations thereof, especially from the group consisting of acrylic acid, methacrylic acid, crotonic acid, 2-ethylpropenonic acid, 2-propylpropenonic acid, 2-acryloxyacetic acid, 2-methacryloxyacetic acid, itaconic acid, fumaric acid, maleic acid and combinations thereof, preferably selected from the group consisting of acrylic acid, methacrylic acid and combinations thereof.

According to a further particular embodiment of the first aspect of the present invention, there is provided a method for producing a preferably water-based (waterborne) polymeric composition, especially in the form of a preferably water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions, especially a method as described hereinabove, wherein the method comprises a two-stage polymerization process, especially a two-stage emulsion polymerization process, preferably a two-stage radical emulsion polymerization process, wherein:

(a) in a first stage (a), a copolymerization of monomers (moieties) (i), (ii) and (iii) is performed via emulsion polymerization, preferably via radical emulsion polymerization, wherein (i) monomer (moiety) (i) comprises at least one ethylenically unsaturated monomer, the homopolymer of which has a glass transition temperature Tg$^{(i)}$ ranging from −100° C. to −10° C., especially from −60° C. to −20° C., and is selected from the group consisting of 2-octylacrylate, n-butylacrylate, 2-ethylhexylacrylate and combinations thereof, preferably 2-octylacrylate, (ii) monomer (moiety) (ii) comprises at least one mono- or difunctional bicyclic monomer comprising at least one substituent comprising one ethylenically unsaturated bond (carbon-carbon double bond), preferably at least one substituent comprising a (meth)acrylic rest (radical), and is selected from mono- or difunctional bicyclic monomers derived from isosorbide or from (iso)borneol and which comprise at least one substituent comprising one ethylenically unsaturated bond (carbon-carbon double bond), preferably at least one substituent comprising a (meth)acrylic rest (radical), and preferably is selected from mono- or difunctional bicyclic monomers of formulae (1a), (1b) and (1c) as well as combinations thereof:

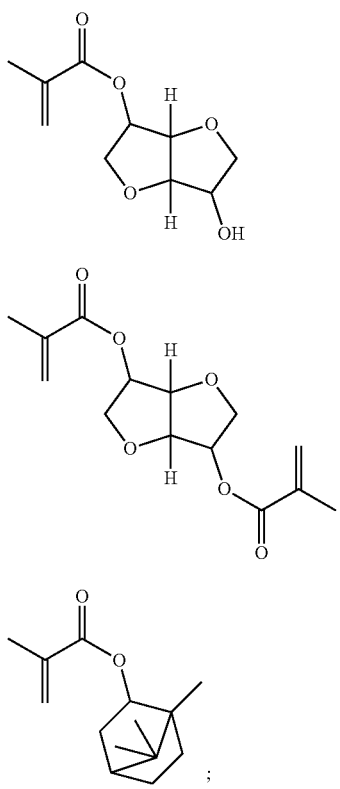

and/or (iii) monomer (moiety) (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms, and is selected from the group consisting of acrylic acid, methacrylic acid, crotonic acid, 2-ethylpropenonic acid, 2-propylpropenonic acid, 2-acryloxyacetic acid, 2-methacryloxyacetic acid, itaconic acid, fumaric acid, maleic acid and combinations thereof, preferably selected from the group consisting of acrylic acid, methacrylic acid and combinations thereof;

so as to produce a first copolymer (A) which comprises moieties (i), (ii) and (iii) each as defined hereinabove and contains free carboxylic groups —C(O)—OH, followed by a conversion of the free carboxylic groups into carboxylate groups —C(O)—O⁻; subsequently (b) in a second stage (b), a copolymerization of monomers (moieties) (i) and (ii) is performed via emulsion polymerization, preferably via radical emulsion polymerization, in the presence of the carboxylate groups containing first copolymer (A) obtained from stage (a), wherein monomers (moieties) (i) and (ii) correspond to the above definitions, however, with the proviso that monomers (moieties) (i) and (ii) used in second stage (b) may be the same as or different from those used in first stage (a), so as to produce a graft copolymer (B) comprising a copolymeric structure of moieties (i) and (ii) obtained from the second stage (b) copolymerization and which is covalently bonded with the first copolymer (A) via grafting.

In this context, it is preferred when monomer (moiety) (ii) is selected with the proviso that monomer (moiety) (ii) comprises at least one difunctional bicyclic monomer derived from isosorbide, which comprises two substituents each comprising one ethylenically unsaturated bond (carbon-carbon double bond), preferably at least one difunctional bicyclic monomer of formula (1b), and/or with the proviso that, as monomer (moiety) (ii), at least one difunctional bicyclic monomer derived from isosorbide, which comprises two substituents each comprising one ethylenically unsaturated bond (carbon-carbon double bond), preferably at least one difunctional bicyclic monomer of formula (1b), is used only in one of stages (a) and (b), preferably only in the first stage (a). Preferably, both aforementioned provisos should be fulfilled (i.e. preferably "and"-linkage of both provisos). Especially, the difunctional bicyclic monomer derived from isosorbide, which comprises two substituents each comprising one ethylenically unsaturated bond (carbon-carbon double bond), preferably the at least one difunctional bicyclic monomer of formula (1b), is used in combination with and/or is combined with at least one other monomer (moiety) (ii) being different therefrom, preferably wherein the at least one other monomer (moiety) (ii) being different therefrom is at least one monofunctional bicyclic monomer derived from isosorbide or (iso)borneol, which comprises one substituent comprising one ethylenically unsaturated bond (carbon-carbon double bond) and preferably is at least one monofunctional bicyclic monomer of formula (1a) and/or (1c).

According to another particular embodiment of the present invention, in at least one of stages (a) and/or (b) copolymerization may be performed in the presence of an additional monomer (iv), especially in the presence of (iv) an additional ethylenically unsaturated monomer, the homopolymer of which has a glass transition temperature $Tg^{(iv)}$ ranging from 30° C. to 200° C., especially from 40° C. to 150° C.

In other words, according to a particular embodiment of the present invention, an additional monomer (iv), especially (iv) an additional ethylenically unsaturated monomer, the homopolymer of which has a glass transition temperature $Tg^{(iv)}$ ranging from 30° C. to 200° C., especially from 40° C. to 150° C., may be copolymerized with monomers (moieties) (i), (ii) and (iii) in the first stage (a) and/or with monomers (moieties) (i) and (ii) and the first copolymer (A) in the second stage (b).

The addition of an additional monomer (iv), which is a hard monomer, allows further adjusting of the mechanical properties and especially of the Tg of the resulting graft copolymer (B). Thus, the graft copolymer (B) or the respective copolymeric composition can be precisely tailored with respect to the use or application.

According to the specific embodiment of the present invention, wherein an additional monomer (iv) is copolymerized, it may be preferred when monomer (moiety) (iv) and/or (iv) the additional ethylenically unsaturated monomer, the homopolymer of which has a glass transition temperature $Tg^{(iv)}$ ranging from 30° C. to 200° C., especially from 40° C. to 150° C., is selected from the group consisting of:

(1) linear, branched or cycloaliphatic $C_1$-$C_{22}$-alkyl(meth)acrylates, especially methyl(meth)acrylate, ethyl(meth)acrylate, n-butyl(meth)acrylate, isobutyl(meth)acrylate, iso-propyl(meth)acrylate, lauryl(meth)acrylate, 2-ethylhexyl(meth)acrylate, stearyl(meth)acrylate, cyclohexyl(meth)acrylate, isobornyl(meth)acrylate, 2-octyl(meth)acrylate and tert-butyl(meth)acrylate;

(2) acrylic acid and linear, branched or cycloaliphatic $C_1$-$C_{22}$-alkylacrylic acids, especially methacrylic acid and ethylacrylic acid;

(3) aryl(meth)acrylates, especially benzyl(meth)acrylate and phenyl(meth)acrylate, especially wherein the aryl radicals may be each unsubstituted or substituted with up to four substituents;

(4) arylacrylic acids, especially benzylacrylic acid and phenylacrylic acid, especially wherein the aryl radicals may be each unsubstituted or substituted with up to four substituents;

(5) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclohexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether(meth)acrylate and poly(propyleneglycol)methylether(meth)acrylate;

(6) aminoalkyl(meth)acrylates, especially N,N-dimethylaminoethyl(meth)acrylate, 2-trimethylammoniumethyl(meth)acrylatchloride and N,N-dimethylaminopropyl(meth)acrylate;

(7) oxiranyl(meth)acrylates, especially 2,3-epoxybutyl(meth)acrylate, 3,4-epoxybutyl(meth)acrylate and glycidyl(meth)acrylate;

(8) styrenes and substituted styrenes, especially α-methylstyrenes, 4-methylstyrenes, 4-vinylbenzoic acid, vinylbenzoate, sodium-4-vinylbenzene sulfonate, 4-acetoxystyrene, 4-bromostyrene, 4-tert-butylstyrene, 2-chlorostyrene, 3-chlorostyrene, 4-chlorostyrene, 2,6-dichlorostyrene, 2,4-dimethylstyrene, 2,5-dimethylstyrene, 3,5-dimethylstyrene, 4-methoxystyrene, 4-ethoxystyrene, 3-methylstyrene, 2,4,6-trimethylstyrene and styrene;

(9) (meth)acrylonitriles;

(10) ethylenically unsaturated sulfonic acids and sulfates and salts thereof, especially potassium[3-((meth)acryloyloxy)propyl]sulfonate and ammonium[2-((meth)acryloyloxy)ethyl]-sulfate;

(11) vinylesters of carboxylic acids comprising 1 to 20 carbon atoms, especially vinylacetate;

(12) vinylesters of versatic acids;

(13) (meth)acrylamides;

(14) N-alkyl- and N,N-dialkyl-substituted (meth)acrylamides comprising linear, branched or cycloaliphatic $C_1$-$C_{22}$-alkyl groups, especially N-(tert-butyl)acrylamide and N,N-dimethylacrylamide;

(15) heterocyclic (meth)acrylates, especially piperonyl(meth)acrylate;

(16) $C_1$-$C_{22}$-alkyl vinylether, especially tert-butylvinylether, cyclohexylvinylether and phenylvinylketone;

(17) vinylpyridines, especially 2-vinylpyridine and 4-vinylpyridine.

According to the specific embodiment of the present invention, wherein an additional monomer (iv) is copolymerized, it may also be preferred monomer (moiety) (iv) and/or (iv) the additional ethylenically unsaturated monomer, the homopolymer of which has a glass transition temperature $Tg^{(iv)}$ ranging from 30° C. to 200° C., especially from 40° C. to 150° C., is selected from the group consisting of:

(1) linear, branched or cycloaliphatic $C_1$-$C_{22}$-alkylmethacrylates, especially methylmethacrylate, ethylmethacrylate, iso-butylmethacrylate, iso-propylmethacrylate, cyclohexylmethacrylate, isobornylmethacrylate, isobornylacrylate, tert-butylacrylate and tert-butylmethacrylate;

(2) acrylic acid and linear, branched or cycloaliphatic $C_1$-$C_{22}$-alkylacrylic acids;

(3) arylmethacrylates, especially benzylmethacrylate, phenylacrylate and phenylmethacrylate, especially wherein the aryl radicals are each unsubstituted or substituted with up to four substituents;

(4) arylacrylic acids, especially wherein the aryl radicals may be each unsubstituted or substituted with up to four substituents;

(6) aminoalkylmethacrylates, especially N,N-dimethylaminoethylmethacrylate, 2-trimethylammoniumethylmethacrylate chloride and N,N-dimethylaminopropylmethacrylate;

(7) oxiranylmethacrylates, especially 2,3-epoxybutylmethacrylate, 3,4-epoxybutylmethacrylate and glycidylmethacrylate;

(8) styrenes and substituted styrenes, especially α-methylstyrenes, 4-methylstyrenes, 4-vinylbenzoic acid, vinylbenzoate, sodium-4-vinylbenzene sulfonate, 4-acetoxystyrene, 4-bromostyrene, 4-tert-butylstyrene, 2-chlorostyrene, 3-chlorostyrene, 4-chlorostyrene, 2,6-dichlorostyrene, 2,4-dimethylstyrene, 2,5-dimethylstyrene, 3,5-dimethylstyrene, 4-methoxystyrene, 4-ethoxystyrene, 3-methylstyrene, 2,4,6-trimethylstyrene and styrene;

(9) acrylonitrile and methacrylonitrile;

(10) ethylenically unsaturated sulfonic acids and sulfates and salts thereof, especially potassium[3-(methacryloyloxy)propyl]sulfonate and ammonium[2-(methacryloyloxy)ethyl]sulfate;

(11) vinylesters of carboxylic acids comprising 1 to 20 carbon atoms, especially vinylacetate;

(12) vinylesters of versatic acids;

(13) acrylamide and methacrylamide;

(14) N-alkyl- and N,N-dialkyl-substituted methacrylamides comprising linear, branched or cycloaliphatic $C_1$-$C_{22}$-alkyl groups, especially N-(tert-butyl)acrylamide and N,N-dimethylacrylamide;

(15) heterocyclic methacrylates, especially piperonylmethacrylate and piperonylacrylate;

(16) $C_1$-$C_{22}$-alkyl vinylether, especially tert-butylvinylether, cyclohexylvinylether and phenylvinylketone;

(17) vinylpyridines, especially 2-vinylpyridine and 4-vinylpyridine.

According to the specific embodiment of the present invention, wherein an additional monomer (iv) is copolymerized, it may especially be preferred when monomer (moiety) (iv) and/or (iv) the additional ethylenically unsaturated monomer, the homopolymer of which has a glass transition temperature $Tg^{(iv)}$ ranging from 30° C. to 200° C., especially from 40° C. to 150° C., comprises or is benzylmethacrylate, benzylacrylate, tert-butylmethacrylate, tert-butylacrylate, cyclohexylmethacrylate, ethylmethacrylate, isobornylmethacrylate, isobornylacrylate, isobutylmethacrylate, isopropylmethacrylate, methylmethacrylate, phenylmethacrylate, piperonylmethacrylate, piperonylacrylate, 4-acetoxystyrene, 4-bromostyrene, 4-tert-butylstyrene, 2-chlorostyrene, 3-chlorostyrene, 4-chlorostyrene, 2,6-dichlorostyrene, 2,4-dimethylstyrene, 2,5-dimethylstyrene, 3,5-dimethylstyrene, 4-methoxystyrene, 4-ethoxystyrene, 3-methylstyrene, 4-methylstyrene, 2,4,6-trimethylstyrene, styrene, tert-butylvinylether, cyclohexylvinylether, phenylvinylketone, vinylbenzoate, 2-vinylpyridine, 4-vinylpyridine, especially methylmethacrylate, isobornylmethacrylate, isobornylacrylate, benzylmethacrylate, piperonylmethacrylate, styrene and combinations thereof.

According to the specific embodiment of the present invention, wherein an additional monomer (iv) is copolymerized, it may furthermore be preferred, when in the overall method and/or in the overall two-stage polymerization process, the moieties (monomers) (i), (ii), (iii) and (iv) are used in a (i)/(ii)/(iii)/(iv)-weight ratio of (60-97)/(3-28)/(0.25-12)/(0.1-10), especially (65-95)/(5-25)/(0.5-10)/(0.2-9), preferably (71-92)/(8-22)/(0.75-7)/(0.5-7), more preferably (75-89)/(10-20)/(1-5)/(1-5).

When using the monomers (moieties) (i), (ii), (iii) and (iv) in the aforementioned weight ratio excellent mechanical, adhesion and removal properties can be obtained. Especially, due to the specified ranges tailoring of specific properties with respect to the use or application is possible while guaranteeing high performance, especially when used as or in adhesives, especially pressure-sensitive adhesives, particularly pressure-sensitive adhesives removable under neutral or basic (alkaline) conditions.

With respect to the first stage (a) of the inventive method, in the following typical and representative but non-limiting embodiments will be described.

Typically, the first stage (a) may be performed in the presence of at least one polymerization initiator, especially a radical polymerization initiator. Such initiator ensures an efficient initiation or start of the polymerization reaction and thus an efficient reaction course. This ensures an efficient polymerization procedure within the first stage (a).

Preferably, such polymerization initiator, especially radical polymerization initiator, may be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably selected from the group consisting of inorganic and/or organic persulfates and azobisisobutyronitrile (AIBN), particularly selected from the group consisting of inorganic persulfates of alkali or earth alkaline metals and azobisisobutyronitrile (AIBN), more particularly selected from the group consisting of potassium persulfate (KPS), sodium persulfate (NaPS), ammonium persulfate (APS) or azobisisobutyronitrile (AIBN).

Apart from azoinitiators such as e.g. AIBN and inorganic persulfates such as e.g. KPS, NaPS and APS, stage (a), i.e. polymerization, can also be performed in the presence of other polymerization initiators. The initiator system may, for example, be chosen among thermal initiators, redox initiators or combinations thereof, for example tert-butyl hydroperoxide, cumene hydroperoxide, tert-butyl perbenzoate, tert-butyl 2-ethyl perhexanoate, hydrogen peroxide and benzoyl peroxide. Either oil and/or water-soluble initiators may be used. Suitable reducing agents of a redox initiator system may include compounds, such as sulfur compounds with a low oxidation state, such as sulfites, hydrogen sulfites, alkali metal bisulfites, ketone adducts of bisulfites, such as acetone bisulfite, alkali metal disulfites, metabisulfites and its salts, thiosulfates, formaldehyde sulfoxylates and its salts, reducing nitrogen compounds, such as hydroxylamines, hydroxylamine hydrosulfate and hydroxylammonium salts, polyamines and reducing sugars, such as sorbose, fructose, glucose, lactose and derivatives thereof, enediols, such as ascorbic acid and isoascorbic acid, sulfinic acids, hydroxy alkyl sulfinic acids, such as hydroxy methyl sulfinic acid and 2-hydroxy-2-sulfinactic acid and its salts. Redox initiators are typically used in combination with trace amounts of metal such as iron, for example supplied as ferrous sulfate.

Usually, the first stage (a) may be performed in the presence of at least one surfactant (synonymously also called emulsifier). This embodiment also ensures an efficient polymerization procedure.

Especially, such surfactant or emulsifier may be an anionic, non-ionic or polymerizable surfactant, especially selected from the group consisting of anionic organic sulfates and sulfonates and nonionic alkylene oxides, especially ethylene and/or propylene oxides, and combinations thereof, preferably selected from the group consisting of organic sulfonates, particularly dodecyl diphenyloxide disulfonates, more particularly sodium dodecyl sulfate, and polymerizable surfactants (surfmers), especially allyl, alkyl, (meth) acrylate, styrenic, maleate, fumarate, crotonate, allyloxy and acrylamide functional groups containing anionic and non-ionic polymerizable surfactants, preferably, ammonium polyoxyalkylene alkenylether sulfates (e.g. Latemul PD-104, Kao Corporation), phosphate esters of polyalkylene monomethacrylates (e.g. Sipomer PAM 200, Solvay), polyoxyethylene styrenated propenyl phenyl ether sulfate ammonium salts (e.g. HITENOL AR series, DKS surfactants), polyoxyethylene-1-(allyloxymethyl) alkyl ether sulfate ammonium salts (e.g. HITENOL KH series, DKS surfactants), polyoxyethylene-1-(allyloxymethyl) alkyl ethers (e.g., NOIGEN KN series, DKS surfactants), polyoxyethylene styrenated propenyl phenyl ethers (e.g., NOIGEN AN series, DKS surfactants).

As appropriate surfactants, there may particularly be used anionic surfactants, such as e.g. alkyl, alkyl phenyl or styrenated phenyl sulfates and sulfonates, especially sodium dodecyl sulfate, or polymerizable anionic surfactants containing sulfates and sulfonates together with allyl, propenyl and propenyl phenyl polymerizable groups, or polymerizable non-ionic surfactants with hydrophilic part containing ethylene oxide or propylene oxide groups or mixtures of both together with polymerizable groups like allyl, propenyl and propenyl phenyl.

However, according to another (i.e. alternative) embodiment, the first stage (a) may also be performed in the absence of any surfactant (i.e. in the absence of any emulsifier).

Furthermore, it may be advantageous when the first stage (a) is performed in the presence of at least one buffer, especially an inorganic carbonate buffer, a hydrogen carbonate buffer or an ammonium hydroxide buffer. This embodiment ensures a stable and constant reaction environment and thus an efficient reaction course.

Typically, the first stage (a) may be performed in the presence of at least one chain-transfer-agent (CTA). A chain-transfer-agent, as used according to the present invention, has at least one weak chemical bond, which therefore facilitates the chain-transfer reaction. Thereby, the molecular mass of the resulting polymer particles of the polymeric composition can be controlled and tailored, especially via the chemical nature, physicochemical properties and amounts of such chain-transfer-agent Such chain-transfer-agents may also be called modifiers. This also influences molecular masses and molecular mass distributions, particularly also the so-called polydispersity index (PDI). Thus, adhesive properties may be purposefully tailored and/or modified, especially improved, by the incorporation of a chain-transfer-agent (CTA), especially when used in amounts in the range of from 0.001 to 2 wt.-%, particularly in the range of from 0.02 to 1.5 wt.-%, based on the monomers (moieties) to be copolymerized and/or based on the monomeric starting mixture.

Especially, the chain-transfer-agent may be selected from the group consisting of thiols, especially thiols with an aliphatic chain containing 4 to 18 carbon atoms, and halo-carbons, especially selected from the group consisting of dodecyl mercaptan (DDM), 2-ethylhexyl thioglycolate, tetrabromomethane, 1-butanethiol, 1-propanethil, 1-prentanethil, 1-hexanthiol, 2-methyl-2-propaneethil, 1-octanethiol, 1-dodecanethiol and carbon tetrachloride, preferably selected from the group consisting of dodecyl mercaptan (DDM), 1-butanethiol, 1-dodecanethiol and 2-ethylhexylthioglycolate.

Particularly, the first stage (a) may be performed under neutral or acidic conditions, preferably under acidic conditions.

Particularly, the first stage (a) may be performed in a water-based (waterborne) or a solvent-based (solventborne) liquid milieu or carrier, preferably in a water-based (waterborne) liquid milieu or carrier. Especially, the water-based (waterborne) or solvent-based (solventborne) liquid milieu or carrier may additionally comprise at least one polymerization initiator and/or at least one surfactant and/or at least one buffer, preferably each as defined hereinabove, and/or optionally at least one further additive. This ensures an efficient polymerization reaction under environmentally friendly conditions.

Furthermore, the first stage (a) may be performed under various temperature conditions. Usually, the first stage (a) may be performed at elevated temperatures and/or wherein the first stage (step) (a) is performed at a temperature in the range of from 30° C. to 200° C., especially in the range of from 30° C. to 150° C., preferably in the range of from 35° C. to 130° C., more preferably in the range of from 40° C. to 100° C.

Moreover, the first stage (a) may be performed under various pressure conditions. Typically, the first stage (step) (a) may be performed at ambient pressure (1 bar or 101.325 kPa), at reduced pressure or at elevated pressure, preferably at ambient pressure (1 bar or 101.325 kPa).

Also, the first stage (a) may be performed for various durations. Typically, the first stage (a) may be performed for a duration in the range of from 0.01 to 24 hours, especially in the range of from 0.1 to 12 hours, preferably in the range of from 0.5 to 6 hours, more preferably in the range of from 0.75 to 4 hours.

According to a typical embodiment, the first stage (a) may be performed in an at least essentially inert atmosphere, especially selected from nitrogen and noble gases, especially nitrogen. Especially, such procedure prevents undesired side-reactions, especially due to oxidation or hydrolysis.

Usually, the first stage (a) may be performed as an emulsion polymerization, particularly as a radical emulsion polymerization, preferably with diameter sizes of the dispersed phase from 50 nm to 1 micrometer. This ensures producing polymeric compositions with excellent film-forming properties and superior adhesion when used in or as an adhesive.

According to a particular embodiment of the present invention, it is advantageous when, in the first stage (a), a (pre)emulsion and/or a homogenous mixture containing water or solvent, monomers (i), (ii) and (iii) used in this first stage (a) and optionally surfactant is fed into a solution containing water or solvent and optionally catalyst and/or buffer and/or chain-transfer agent.

According to a particular embodiment of the present invention, it is preferred when, the free carboxylic group containing first copolymer (A), especially as determined before the conversion of the free carboxylic groups into carboxylate groups, has an acid value (AV) in the range of from 75 to 140 mg KOH/g, especially in the range of from 80 to 120 mg KOH/g, preferably in the range of from 85 to 100 mg KOH/g, especially as determined by titration, particularly potentiometric titration, preferably in accordance with ASTM D664.

A first copolymer (A) with this acid value has a sufficient number of free carboxylic groups to be used as a stabilizer and emulsifier in the second stage (b) and provides a sufficient number of free carboxylic acid groups that, when grafted with the copolymeric structure obtained in the second stage (b) to obtain a graft copolymer (B) easy and quick removal of an adhesive comprising the graft copolymer (B) is enabled.

According to another particular embodiment of the present invention, it is preferred when, the first copolymer (A) resulting from the first stage (a) has an average molecular mass, especially a weight-average molecular mass ($M_w$), in the range of from 2,000 to 50,000 Da, especially in the range of from 5,000 to 25,000 Da, preferably in the range of from 7,500 to 20,000 Da, more preferably in the range of from 8,000 to 15,000 Da; especially wherein average molecular mass, especially weight-average molecular mass ($M_w$), is determined by size exclusion chromatography (SEC), particularly gel permeation chromatography (GPC), preferably with refractive index detection (RI), preferably in accordance with DIN EN ISO 16014-5:2019, particularly with polystyrene (PS) as standard, especially measured with a fraction soluble in tetrahydrofuran.

Such first copolymer (A) is especially advantageous when used in the second stage (b) and can simultaneously be used and/or act as a seed, as an emulsifier and as a stabilizer.

According to a further particular embodiment of the present invention, it is preferred when, the polymeric composition, especially the preferably water-based (waterborne) dispersion, comprising the first copolymer (A), each resulting from the first stage (a), has a solids content, based on the total weight of the first copolymer (A) resulting from stage (a), in the range of from 1 to 50% by weight, especially in the range of from 5 to 40% by weight, preferably in the range of from 10 to 35% by weight, more preferably in the range of from 15 to 30% by weight.

Such solids content is especially appropriate when the first copolymer (A) is used as a seed in the subsequent second stage (b).

According to yet another particular embodiment of the present invention, it is preferred when, the first copolymer (A) resulting from the first stage (a) has a (absolute) particle diameter in the range of from 40 nm to 200 nm, especially in the range of from 50 nm to 180 nm, preferably in the range of from 60 nm to 170 nm, more preferably in the range of from 70 nm to 160 nm, even more preferably in the range of from 80 nm to 140 nm; especially as determined by light scattering, preferably in accordance with ISO 22412:2017.

Such particle sizes are particularly suitable when the first copolymer (A) is used in an emulsion polymerization process in the second stage (b).

Moreover, it is preferred, when the first copolymer (A) resulting from the first stage (a) has a multiple functionality, especially an at least triple functionality, when used in the second stage (b), especially a functionality as a seed and/or as an emulsifier and/or as a stabilizer, and/or wherein the first copolymer (A) resulting from the first stage (a) is appropriate to be used and/or functions in the second stage (b) as a seed and/or as an emulsifier and/or as a stabilizer.

In other words, it is preferred, when the first copolymer (A) resulting from the first stage (a) is used as a seed and/or as an emulsifier and/or as a stabilizer in the second stage (b).

In this respect, it is referred to the carboxylate group containing first copolymer (A); i.e. the first copolymer (A) after the conversion of the free carboxylic acid groups into carboxylate groups. By using a first copolymer (A) in the second stage (b) with a triple functionality, the addition of further additives can be avoided.

According to a particular embodiment, conversion of the free carboxylic groups of the first copolymer (A) into carboxylate groups may be performed separately from the copolymerization carried out in the first stage (a), especially in a different reactor and/or time-shifted with respect to the copolymerization carried out in the first stage (a). Especially, conversion of the free carboxylic groups of the first copolymer (A) into carboxylate groups may be performed immediately before the second stage (b) and/or the free carboxylic groups containing first copolymer (A) obtained from the first stage (a) copolymerization may be temporarily stored and/or kept before conversion of the free carboxylic groups of the first copolymer (A) into carboxylate groups is performed.

Thus, the inventive method can be performed in separated stages so that a masterbatch of the inventive first copolymer (A) can be synthesized and stored. Consequently, the inventive method is also applicable in plants equipped for a one-stage process.

Moreover, according to another particular embodiment, conversion of the free carboxylic groups of the first copolymer (A) into carboxylate groups may be performed by neutralizing or alkalizing, preferably alkalizing, the polymerization milieu and/or the carrier containing the first copolymer (A).

Additionally, according to a further embodiment of the present invention, conversion of the free carboxylic groups of the first copolymer (A) into carboxylate groups may be performed by adjusting the polymerization milieu and/or the carrier containing the first copolymer (A) to a neutral or slightly alkaline pH value, preferably to a slightly alkaline pH value, particularly by use of an alkaline agent.

Thus, the first copolymer (A) is stable and can be stored until the pH value is purposefully adjusted. In this respect, it can even be advantageous to adjust the pH value of the carrier to a slightly acidic value to prevent conversion of the carboxylic acid groups.

Especially, for conversion of the free carboxylic groups of the first copolymer (A) into carboxylate groups, an alkaline agent may be added to the first copolymer (A), especially to the polymerization milieu and/or to the carrier containing the first copolymer (A), particularly effecting a neutral or alkaline pH value, preferably a pH value in the range of from 7 to 10, particularly a pH value in the range of from 7 to 9.

With respect to the second stage (b) of the inventive method, in the following typical and representative but non-limiting embodiments will be described.

Typically, also the second stage (b) may be performed in the presence of at least one polymerization initiator, especially a radical polymerization initiator.

Especially, such polymerization initiator, especially a radical polymerization initiator, as used in stage (b) may preferably be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably selected from the group consisting of inorganic and/or organic persulfates and azobisisobutyronitrile (AIBN), particularly selected from the group consisting of inorganic persulfates of alkali or earth alkaline metals and azobisisobutyronitrile (AIBN), more particularly selected from the group consisting of potassium persulfate (KPS), sodium persulfate (NaPS), ammonium persulfate (APS) or azobisisobutyronitrile (AIBN).

Basically, the same polymerization initiators as used in stage (a) may be used in stage (b). Consequently, for further details as to the polymerization initiators to be used, reference can be made to the above explanation for stage (a).

Principally, also the second stage (b) may be performed in the presence of at least one surfactant (i.e. emulsifier). Also this measurement constitutes to ensure an efficient polymerization procedure within the second stage (b).

Especially, such surfactant or emulsifier may preferably be an anionic, non-ionic or polymerizable surfactant, especially selected from the group consisting of anionic organic sulfates and sulfonates and non-ionic alkylene oxides, especially ethylene and/or propylene oxides, and combinations thereof, preferably selected from the group consisting of organic sulfonates, particularly dodecyl diphenyloxide disulfonates, more particularly sodium dodecyl sulfate, and polymerizable surfactants (surfmers), especially allyl, alkyl, (meth)acrylate, styrenic, maleate, fumarate, crotonate, allyloxy and acrylamide functional groups containing anionic and non-ionic polymerizable surfactants, preferably, ammonium polyoxyalkylene alkenylether sulfates (e.g. Latemul PD-104, Kao Corporation), phosphate esters of polyalkylene monomethacrylates (e.g. Sipomer PAM 200, Solvay), polyoxyethylene styrenated propenyl phenyl ether sulfate ammonium salts (e.g. HITENOL AR series, DKS surfactants), polyoxyethylene-1-(allyloxymethyl) alkyl ether sulfate ammonium salts (e.g. HITENOL KH series, DKS surfactants), polyoxyethylene-1-(allyloxymethyl) alkyl ethers (e.g., NOIGEN KN series, DKS surfactants), polyoxyethylene styrenated propenyl phenyl ethers (e.g., NOIGEN AN series, DKS surfactants).

Basically, the same surfactants as used in stage (a) may be used in stage (b). Consequently, for further details as to the surfactants to be used, reference can be made to the above explanation for stage (a).

However, according to another (i.e. alternative) embodiment, the second stage (b) may also be performed in the absence of any surfactant (i.e. in the absence of any emulsifier).

Furthermore, it may be advantageous when also the second stage (b) is performed in the presence of at least one buffer, especially selected from the group consisting of inorganic carbonate buffers, hydrogen carbonate buffers and ammonium hydroxide buffers. This embodiment ensures a stable and constant reaction environment and thus an efficient reaction course.

Typically, the second stage (b) may be performed in the presence of at least one chain-transfer-agent (CTA). A chain-transfer-agent, as used according to the present invention, has at least one weak chemical bond, which therefore facilitates the chain-transfer reaction. Thereby, the molecular mass of the resulting polymer particles of the polymeric composition can be controlled and tailored, especially via the chemical nature, physicochemical properties and amounts of such chain-transfer-agent Such chain-transfer-agents may also be called modifiers. This also influences molecular masses and molecular mass distributions, particularly also the so-called polydispersity index (PDI). Thus, adhesive properties may be purposefully tailored and/or modified, especially improved, by the incorporation of a chain-transfer-agent (CTA), especially when used in amounts in the range of from 0.001 to 2 wt.-%, particularly in the range of from 0.02 to 1.5 wt.-%, based on the monomers (moieties) to be copolymerized and/or based on the monomeric starting mixture.

Especially, the chain-transfer-agent may be selected from the group consisting of thiols, especially thiols with an aliphatic chain containing 4 to 18 carbon atoms, and halocarbons, especially selected from the group consisting of dodecyl mercaptan (DDM), 2-ethylhexyl thioglycolate, tetrabromomethane, 1-butanethiol, 1-propanethil, 1-prentanethil, 1-hexanthiol, 2-methyl-2-propaneethiol, 1-octanethiol, 1-dodecanethiol and carbon tetrachloride, preferably selected from the group consisting of dodecyl mercaptan (DDM), 1-butanethiol, 1-dodecanethiol and 2-ethylhexylthioglycolate.

Basically, the same chain-transfer agents as used in stage (a) may be used in stage (b). Consequently, for further details as to the surfactants to be used, reference can be made to the above explanation for stage (a).

According to a particular embodiment of the present invention, the second stage (b) may be performed under neutral or slightly alkaline conditions, preferably under slightly alkaline conditions, especially under conditions with a pH in the range of from 7 to 10, particularly in the range of from 7 to 9. Especially, an undesired hydrolysis of both the acrylate linkers and the ester groups is thereby prevented.

Particularly, also the second stage (step) (b) may be performed in a water-based (waterborne) or solvent-based (solventborne) liquid milieu or carrier, preferably in a water-based (waterborne) liquid milieu or carrier. Especially, the water-based (waterborne) or solvent-based (solventborne) liquid milieu or carrier may additionally comprises at least one polymerization initiator and/or at least one surfactant and/or at least one chain-transfer-agent (CTA), preferably each as defined hereinabove, and/or optionally at least one further additive. This ensures an efficient polymerization reaction under environmentally friendly conditions.

Furthermore, also the second stage (step) (b) may be performed under various temperature conditions. Usually, the second stage (step) (b) may be performed at elevated temperatures. Especially, the second stage (step) (b) may be performed at a temperature in the range of from 30° C. to 200° C., especially in the range of from 30° C. to 150° C., preferably in the range of from 35° C. to 130° C., more preferably in the range of from 40° C. to 100° C.

Moreover, also the second stage (step) (b) may be performed under various pressure conditions. Usually, the second stage (step) (b) may be performed at ambient pressure (1 bar or 101.325 kPa), at reduced pressure or at elevated pressure, preferably at ambient pressure (1 bar or 101.325 kPa).

Also, the second stage (step) (b) may be performed for various duration. Typically, the second stage (step) (b) may be performed for a duration in the range of from 0.01 to 24 hours, especially in the range of from 0.1 to 12 hours, preferably in the range of from 0.5 to 6 hours, more preferably in the range of from 0.75 to 4 hours.

According to a typical embodiment, also the second stage (step) (b) may be performed in an at least essentially inert atmosphere, especially selected from nitrogen and noble gases, especially nitrogen. Especially, such procedure prevents undesired side-reactions, especially due to oxidation or hydrolysis.

Usually, also the second stage (step) (b) may be performed as an emulsion polymerization, particularly as a radical emulsion polymerization, preferably with diameter sizes of the dispersed phase from 50 nm to 1 micrometer. This ensures producing polymeric compositions with excellent film-forming properties and superior adhesion, especially when used as or in adhesives.

According to yet another particular embodiment, the second stage (b) may be performed in the presence of a crosslinker, especially as defined hereinabove, especially when (i.e. for the case that) in the first and second stages (a) and (b) no difunctional bicyclic monomer comprising one substituent comprising one ethylenically unsaturated bond (carbon-carbon double bond) is used.

Moreover, according to a further particular embodiment, in the second stage (b), a crosslinker, especially as defined hereinabove, may be copolymerized with moieties (i), (ii) and the first copolymer (A), especially when (i.e. for the case that) in the first and second stages (a) and (b) no difunctional bicyclic monomer comprising one substituent comprising one ethylenically unsaturated bond (carbon-carbon double bond) is used.

In this context, a crosslink is a bond that links one polymer chain to another. These links may take the form of covalent bonds or ionic bonds, preferably the form of covalent bonds. By crosslinking a polymer, change in the polymer's physical properties is promoted. Crosslinkers are the respective monomers or molecules that are able to link to polymer chains to each other, especially by forming a bond, preferably a covalent bond, with each polymer chain.

Incorporating a crosslinker or crosslinking agent in the copolymer improves the intrinsic stability and strength, thus preventing cohesive failure of an adhesive containing the copolymer under strain (i.e. breakdown of intramolecular bonding forces within the adhesive—the bond to the respective substrate however is not broken). In this context, all crosslinkers known as such from the prior art in this technical field can be used or incorporated.

According to a particular embodiment of the present invention, it is also advantageous when, in the second stage (b), a (pre)emulsion and/or a homogenous mixture containing water or solvent, the monomers (i) and (ii) used in this second stage (b), and optionally the chain-transfer-agent (CTA) and/or the surfactant are fed into a solution containing water or solvent, the first copolymer (A) obtained from the first stage (a) and optionally the catalyst.

According to a particular embodiment of the inventive method, the first stage (a) and/or the second stage (b), preferably the first stage (a) and the second stage (b), may be followed by a post-polymerization step. Especially, post-polymerization may be performed so as to remove residual monomers. Particularly, post-polymerization may be performed at elevated temperatures. Especially, post-polymerization may be performed at a temperature in the range of from 30° C. to 200° C., especially in the range of from 30° C. to 150° C., preferably in the range of from 35° C. to 130° C., more preferably in the range of from 40° C. to 100° C. Particularly, post-polymerization may be performed at ambient pressure (1 bar or 101.325 kPa), at reduced pressure or at elevated pressure, preferably at ambient pressure (1 bar or 101.325 kPa). Especially, post-polymerization may be performed for a duration in the range of from 0.01 to 24 hours, especially in the range of from 0.1 to 12 hours, preferably in the range of from 0.5 to 6 hours, more preferably in the range of from 0.75 to 4 hours.

As delineated hereinabove, according to a particular embodiment of the inventive method, the method of the present invention is performed in the absence of organic solvents and/or in the absence of volatile organic compounds (VOCs). This leads to a high environmental compatibility. Also, this corresponds to harsh health and safety regulations and measurements, especially with respect to safety at work standards and industrial safety. Furthermore, this corresponds also to the health regulations and measurements with respect to the use of the polymeric composition in food and beverage related areas.

According to a preferred embodiment, monomer (moiety) (i) has a bio-based content of greater than 50%, especially greater than 55%, preferably greater than 60%, more preferably greater than 65%, based on monomer (moiety) (i), especially in accordance with DIN EN 16785. In other words, it is a preferred embodiment, when monomer (moiety) (i) has a bio-based content in the range of from 50% to 99%, especially in the range of from 55% to 95%, preferably in the range of from 60% to 90%, more preferably in the range of from 65% to 85%, based on monomer (moiety) (i), especially in accordance with DIN EN 16785.

Moreover, according to another preferred embodiment, monomer (moiety) (ii) has a bio-based content of greater than 50%, especially greater than 52.5%, preferably greater than 55%, based on monomer (moiety) (ii), especially in accordance with DIN EN 16785. Especially, it is preferred, when monomer (moiety) (ii) has a bio-based content in the range of from 50% to 99%, especially in the range of from 52.5% to 95%, preferably in the range of from 55% to 90%, based on monomer (moiety) (ii), especially in accordance with DIN EN 16785.

Furthermore, according to a further preferred embodiment, the (overall) polymeric composition has a bio-based content of greater than 50%, especially greater than 55%, preferably greater than 60%, more preferably greater than 65%, based on the solids content of the polymeric composition and/or based on graft copolymer (B), especially in accordance with DIN EN 16785. In other words, it is preferred, when the (overall) polymeric composition has a bio-based content in the range of from 50% to 99%, especially in the range of from 55% to 95%, preferably in the range of from 60% to 90%, more preferably in the range of from 65% to 85%, based on the solids content of the polymeric composition and/or based on graft copolymer (B), especially in accordance with DIN EN 16785.

Additionally, according to yet another preferred embodiment, graft copolymer (B) has a bio-based content of greater than 50%, especially greater than 55%, preferably greater than 60%, more preferably greater than 65%, based on graft copolymer (B), especially in accordance with DIN EN 16785. Moreover, it is preferred when graft copolymer (B) has a bio-based content in the range of from 50% to 99%, especially in the range of from 55% to 95%, preferably in the range of from 60% to 90%, more preferably in the range of from 65% to 85%, based on graft copolymer (B), especially in accordance with DIN EN 16785.

In this respect, for example 2-octyl acrylate can be obtained from castor oil with a bio-content of about 73%, isobornyl methacrylate can be obtained from pine tree resin with a bio-content of about 73% and mono- and dimethacrylic isosorbide can be obtained from glucose with a bio-content of up to 60%.

According to a particular embodiment of the present invention, the method may result in producing a preferably water-based (waterborne) polymeric composition, especially in the form of a preferably water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions, which polymeric composition may comprise at least one of the following copolymers:

(i)/(ii)/(iii)-copolymers and/or copolymers comprising moieties (i), (ii) and (iii), preferably with a (i)/(ii)/(iii)-weight ratio of (60-97)/(3-28)/(0.25-12), especially (65-95)/(5-25)/(0.5-10), preferably (71-92)/(8-22)/(0.75-7), more preferably (75-89)/(10-20)/(1-5).

Moreover, according to another particular embodiment of the present invention, the method may result in producing a preferably water-based (waterborne) polymeric composition, especially in the form of a preferably water-based (waterborne) dispersion (i.e. emulsion or latex), particularly to be used as or in an adhesive, especially a pressure-sensitive adhesive, particularly a pressure-sensitive adhesive removable under neutral or basic (alkaline) conditions, which polymeric composition may comprise at least one of the following copolymers:

(i)/(ii)/(iii)/(iv)-copolymers and/or copolymers comprising moieties (i), (ii), (iii) and (iv) preferably with a (i)/(ii)/(iii)/(iv)-weight ratio of (60-97)/(3-28)/(0.25-12)/(0.1-10), especially (65-95)/(5-25)/(0.5-10)/(0.2-9), preferably (71-92)/(8-22)/(0.75-7)/(0.5-7), more preferably (75-89)/(10-20)/(1-5)/(1-5).

With respect to the polymeric composition and/or graft copolymer (B) obtainable from the aforedescribed method, in the following typical and representative but non-limiting embodiments, especially properties and characteristics, will be described.

Typically, the polymeric composition obtainable according to the method described hereinabove may have a solids content in the range of from 20 to 75% by weight, especially in the range of from 25 to 70% by weight, preferably in the range of from 35 to 65% by weight, more preferably in the range of from 40 to 60% by weight, preferably in accordance with ISO 124:2014.

The term of the so-called solids content indicated hereinabove and hereinbelow is-known to those skilled in the art and used herein according to common language and understanding. The solids content indicated hereinabove and hereinbelow particularly refers to the non-volatile material (i.e. non-volatile content) contained in the emulsion, i.e. this is the material (i.e. content) which is left after the volatiles (e.g. solvent) have been removed (e.g. evaporated). In the context of the present invention, the volatile (i.e. solvent) is preferably water, i.e. the solids content essentially refers to that part of the emulsion which is not water, i.e. which is left after the water has been removed. The solids content may especially be determined according to the standard ISO 124:2014.

Preferably, the graft copolymer (B) obtainable according to the method described hereinabove and comprised by the polymeric composition may have a polydispersity index (PDI) in the range of from 1.5 to 13, especially in the range of from 2.5 to 12, preferably in the range of from 3 to 11, more preferably in the range of from 3.5 to 10, based on the fraction of the copolymer being soluble in tetrahydrofuran (THF), preferably in accordance with DIN EN ISO 16014-5:2019.

The polydispersity index (PDI) indicated hereinabove and hereinbelow is a measure of distribution of molecular mass in a given polymer sample and is determined from the ratio of the weight-average molecular mass to the number-average molecular mass and has a value equal to or greater than 1. Thus calculated according to the following formula:

$$PDI = \frac{M_w}{M_n}$$

Usually, the graft copolymer (B) obtainable according to the method described hereinabove and comprised by the polymeric composition may have a glass transition temperature Tg in the range of from −5 to −100° C., especially in the range of from −20 to −55° C., especially as determined by differential scanning calorimetry, preferably in accordance with DIN EN ISO 11357-2:2014.

Especially, the graft copolymer (B) obtainable according to the method described hereinabove and comprised by the polymeric composition may have a (absolute) particle diameter in the range of from 140 nm to 300 nm, especially in the range of from 150 nm to 280 nm, preferably in the range of from 160 nm to 270 nm, more preferably in the range of from 170 nm to 260 nm, even more preferably in the range of from 180 nm to 250 nm, has been reached; especially as determined by light scattering, preferably in accordance with ISO 22412:2017.

Particularly, the graft copolymer (B) obtainable according to the method described hereinabove and comprised by the polymeric composition may have an average molecular mass, especially a weight-average molecular mass ($M_w$), in the range of from 30,000 to 1,000,000 Da, especially in the range of from 35,000 to 750,000 Da, preferably in the range of from 40,000 to 500,000 Da, more preferably in the range of from 45,000 to 250,000 Da, even more preferably in the range of from 50,000 to 200,000 Da; especially wherein average molecular mass, especially weight-average molecular mass ($M_w$), is determined by size exclusion chromatography (SEC), particularly gel permeation chromatography (GPC), preferably with refractive index detection (RI), preferably in accordance with DIN EN ISO 16014-5:2019, particularly with polystyrene (PS) as standard, especially measured with a fraction soluble in tetrahydrofuran.

The weight-average molecular mass ($M_w$) or mass-average molecular mass indicated hereinabove and hereinbelow refers to the molecular mass averaged by the relative mass proportion. The weight-average molecular mass ($M_w$) is determined by the following formula, wherein Ni refers to the number of molecules and $M_i$ to the measured weight of one molecule, each with the repeating unit i:

$$M_w = \frac{\Sigma_i N_i M_i^2}{\Sigma_i N_i M_i}$$

In this context, the molecular masses of the individual molecules may be determined by size exclusion chromatography (SEC), particularly by gel permeation chromatography (GPC). Size exclusion chromatography (SEC), also known as molecular sieve chromatography, is a chromatographic method in which the molecules in solution are separated by molecular weight. Either an aqueous solution can be used to transport the sample (i.e. the molecules of the sample) through the column or an organic solvent is used as a mobile phase. The chromatography column (i.e. column) is packed with fine, porous pellets (beads), wherein the size of the pellets (beads) are used to estimate the dimensions of macromolecules. Gel permeation chromatography (GPC) is a type of size exclusion chromatography (SEC) which separates the molecules based on its size and is especially advantageous when analyzing polymers.

The refractive index detector is a universal detector preferably used for chromatographic application, such as GPC or HPLC (High-performance liquid chromatography), for determining the change in refractive index, particularly, the change in refractive index with respect to the pure solvent.

GPC measures the molecular volume and shape function as defined by the intrinsic viscosity. The molecular mass can be determined within a ±5% accuracy by using comparable or relevant standards (here: polystyrene).

According to a particular embodiment of the present invention, the weight-average molecular mass ($M_w$) of the polymer molecules and/or of the particles of the polymeric composition may be controlled and/or tailored, during their production, by moiety (ii) and/or an optional chain-transfer-agent (CTA) and/or an optional crosslinker, especially via the chemical nature, physicochemical properties and/or amounts of moiety (ii) and/or the optional chain-transfer-agent (CTA) and/or the crosslinker.

According to a further particular embodiment, the graft copolymer (B) obtainable according to the method described hereinabove and comprised by the polymeric composition may have a multimodal molecular mass distribution, especially a bimodal molecular mass distribution, preferably weight-based molecular mass distribution, especially measured with a fraction soluble in tetrahydrofuran.

The molecular mass distribution describes the relationship between the number of moles of each polymer species and the molecular mass of that species. In polymers, the individual polymer chains rarely have exactly the same degree of polymerization and molecular mass, thus, there is always a distribution around an average value. In practice, due to the limited size of the individual monomers and side reactions, there are always large variations from this average value. For example, multimodal, especially bimodal, distribution can be obtained, wherein several, especially two, separated maxima exist. Molecular mass distribution indications referred to hereinabove and hereinbelow particularly relate to weight-based or mass-based molecular mass distributions, especially measured with a fraction soluble in tetrahydrofuran.

Especially, the multimodal molecular mass distribution, especially the bimodal molecular mass distribution, of the graft copolymer (B) produced according to the method defined hereinabove and comprised by the polymeric composition may be controlled and/or tailored, during its production, via the reaction process, conditions and/or composition, especially by moiety (ii) and/or an optional chain-transfer-agent (CTA) and/or an optional crosslinker, preferably via the chemical nature, physicochemical properties and/or amounts of moiety (ii) and/or of the optional chain-transfer-agent (CTA) and/or of the optional cross-linker.

Typically, according to this specific embodiment where the graft copolymer (B) obtainable according to the method described hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein the at least two distribution maxima (peaks) differ by at least $0.2 \cdot 10^1$ g/mol, especially by at least $0.5 \cdot 10^1$ g/mol, preferably by at least $10^1$ g/mol.

Usually, according to this specific embodiment where the graft copolymer (B) obtainable according to the method described hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein the at least two distribution maxima (peaks) differ by at most $10^5$ g/mol, especially by at most $10^4$ g/mol, preferably by at most $10^3$ g/mol.

Preferably, according to this specific embodiment where the graft copolymer (B) obtainable according to the method described hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein the at least two distribution maxima (peaks) differ by a range of from $0.2 \cdot 10^1$ g/mol to $10^5$ g/mol, especially by a range of from $0.5 \cdot 10^1$ g/mol to 104 g/mol, preferably by a range of from $10^1$ g/mol to 103 g/mol.

Especially, according to this specific embodiment where the graft copolymer (B) obtainable according to the method described hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein a first distribution maximum is in the range of from $10^2$ g/mol to $5 \cdot 10^4$ g/mol and a second distribution maximum is in the range of from $6 \cdot 10^4$ g/mol to 106 g/mol.

Also, according to this specific embodiment where the graft copolymer (B) obtainable according to the method described hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein the at least two distribution modes differ by at least $0.2 \cdot 10^1$ g/mol, especially by at least $0.5 \cdot 10^1$ g/mol, preferably by at least $10^1$ g/mol.

Typically, according to this specific embodiment where the graft copolymer (B) obtainable according to the method described hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein the at least two distribution modes differ by at most $10^5$ g/mol, especially by at most $10^4$ g/mol, preferably by at most $10^3$ g/mol.

Usually, according to this specific embodiment where the graft copolymer (B) obtainable according to the method described hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein the at least two distribution modes differ by a range of from $0.2 \cdot 10^1$ g/mol to $10^5$ g/mol, especially by a range of from $0.5 \cdot 10^1$ g/mol to 104 g/mol, preferably by a range of from $10^1$ g/mol to $10^3$ g/mol.

Especially, according to this specific embodiment where the graft copolymer (B) obtainable according to the method described hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein a first distribution mode is in the range of from $10^2$ g/mol to $5 \cdot 10^4$ g/mol and a second distribution mode is in the range of from $6 \cdot 10^4$ g/mol to $10^6$ g/mol.

Furthermore, according to a particular embodiment, films produced from the polymeric composition, especially by applying the polymeric composition to a support surface (carrier) and subsequently drying and/or removal of liquid phase (dispersant), may have a gel content in the range of from 10 to 95%, especially in the range of from 25 to 85%, preferably in the range of from 30 to 80%, more preferably in the range of from 35 to 75%, especially as determined by Soxhlet extraction with tetrahydrofuran (THF) as solvent, preferably in accordance with ASTM-D2765.

Gel content indicated hereinabove and hereinbelow is a measured as the insoluble fraction of the polymer in a good solvent and it is taken as of crosslinking degree of the polymer. It is measured by first drying the latex before solubilizing it in a solvent such as tetrahydrofuran (THF). In the parts of the latex where the density of crosslinks is low, the latex dissolves, but highly crosslinked latex parts will swell and form a gel. Then, the solvent solution is filtered and the gel collected. Once dried, it is weighed, and this number is divided by the original weight to arrive at a gel percentage.

Soxhlet extraction is a method used to continuously extract soluble constituents (parts), wherein the solvent is heated to reflux and the extract containing solvent and solved constituent is continuously emptied in a siphon. Thereby, the soluble constituents are steadily separated from the insoluble ones.

Moreover, according to another particular embodiment, films produced from the polymeric composition, especially by applying the polymeric composition to a support surface (carrier) and subsequently drying and/or removal of liquid phase (dispersant), may have 180° peel values in the range of from 3 to 35 N/25 mm, especially in the range of from 4 to 30 N/25 mm, preferably in the range of from 5 to 25 N/25 mm, more preferably 5 to 10 N/25 mm, preferably in accordance with ASTM-D3330. Especially, for measuring 180° peel values, 15 µm films are used.

The 180° peel adhesion test is used to determine the force required to debond two components joined by an adhesive. In 180° peel test, a constant 180° angle is maintained whilst the two glued components are peeled apart.

Also, according to a particular embodiment, films produced from the polymeric composition, especially by applying the polymeric composition to a support surface (carrier) and subsequently drying and/or removal of liquid phase (dispersant), may have loop tack values in the range of from 5 to 50 N/25 mm, especially in the range of from 6 to 40 N/25 mm, preferably in the range of from 7 to 40 N/25 mm, preferably in accordance with ASTM-D6195. Especially, for measuring loop tack values, 15 µm films are used.

Loop tack tests are intended for quality control and specification of adhesive tapes and pressure sensitive adhesives. The length and width are specified to be 25 mm of the loop strip, the dimensions and material of the base plate and the speed of the test are also specified. Tack is defined as the force required to separate, at a specified speed, a loop that has adhesively contacted a specified area of defined surfaces.

Additionally, according to a further particular embodiment, films produced from the polymeric composition, especially by applying the polymeric composition to a support surface (carrier) and subsequently drying and/or removal of liquid phase (dispersant), may have work of adhesion values in the range of from 10 to 240 J/m$^2$, especially in the range of from 20 to 220 J/m$^2$, preferably in the range of from 30 to 200 J/m$^2$, preferably in accordance with ASTM-D6195. Especially, for measuring work of adhesion values, 15 µm films are used.

The work of adhesion indicated hereinabove and hereinbelow is the reversible thermodynamic work required to separate the two adjacent phases.

According to a further particular embodiment, films produced from the polymeric composition, especially by applying the polymeric composition to a support surface (carrier) and subsequently drying and/or removal of liquid phase (dispersant), may have shear values in the range of from 30 to 14,000 min, especially in the range of from 50 to 13,000 min, preferably in the range of from 120 to 12,000 min, preferably in accordance with ASTM-D3654. Especially, for measuring shear values, m films are used.

Shear strength or also called shear resistance is the ability of a material to resist forces which can cause the internal structure of the material to slide against itself. Adhesives tend to have high shear strength. Thus, shear strength is the strength of a material or component against the type of yield or structural failure where the material or component fails in shear. It is therefore the load that an object is able to withstand in a direction parallel to the face of the material, as opposed to perpendicular to the surface.

Furthermore, according to another particular embodiment, films produced from the polymeric composition, especially by applying the polymeric composition to a support surface (carrier) and subsequently drying and/or removal of liquid phase (dispersant), may have SAFT values in the range of from 20 to 200° C., especially in the range of from 30 to 185° C., preferably in the range of from 40 to 170° C., preferably in conformity with ASTM-D4498. Especially, for measuring SAFT values, 15 µm films are used.

A modification of the shear-resistance test is the shear adhesion failure test (SAFT), which is a modification of ASTM D-4498—a standard test method for the heat-fail temperature in shear of hot melt adhesives. As described in this method, the samples are assembled as in the shear test using a 500 g load and placed into the test chamber. The temperature of the chamber starts at ambient and is ramped upward at a prescribed rate. The temperature at which the adhesive layer fails is noted as the shear adhesion failure temperature (SAFT) and serves as a guide to the high-temperature performance of the adhesive.

On the whole, the present invention provides an efficient and economic method for producing, under environmentally compatible conditions and with high yields, a polymeric composition providing high-performance properties, especially when used as or in an adhesive. The multitude of the respective particularities and advantages linked to the inventive method and to the resulting polymeric composition as well as to its uses and applications have been discussed in detail hereinbefore, so that reference can be made to the above explanations in this respect.

According to a second aspect of the present invention, the present invention further refers to a polymeric composition, particularly a preferably water-based (waterborne) polymeric composition, especially in the form of a preferably water-based (waterborne) dispersion (emulsion or latex), particularly to be used as or in an adhesive, especially a pressure-sensitive adhesive, particularly a pressure-sensitive adhesive removable under neutral or basic (alkaline) conditions, comprising graft copolymer (B), wherein the polymeric composition is obtainable by a method as defined hereinabove.

According to a particular embodiment, pursuant to this aspect of the present invention, the present invention is directed to a polymeric composition, particularly a preferably water-based (waterborne) polymeric composition, especially in the form of a preferably water-based (waterborne) dispersion (emulsion or latex), particularly to be used as or in an adhesive, especially a pressure-sensitive adhesive, particularly a pressure-sensitive adhesive removable under neutral or basic (alkaline) conditions, especially the polymeric composition as defined hereinabove, wherein the polymeric composition comprises a graft copolymer (B) as defined hereinabove as well as also hereinbelow.

Furthermore, according to another particular embodiment, pursuant to this aspect of the present invention, the present invention is also directed to a polymeric composition, particularly a preferably water-based (waterborne) polymeric composition, especially in the form of a preferably water-based (waterborne) dispersion (emulsion or latex), particularly to be used as or in an adhesive, especially a pressure-sensitive adhesive, particularly a pressure-sensitive adhesive removable under neutral or basic (alkaline) conditions, especially the polymeric composition as defined hereinabove, wherein the copolymeric composition comprises a random graft copolymer (B) comprising, in random distribution, moieties (i), (ii) and (iii) according to the following definition:
(i) moiety (i) comprises at least one ethylenically unsaturated monomer, the homopolymer of which has a glass transition temperature Tg$^{(i)}$ ranging from –100° C. to –10° C., especially from –60° C. to –20° C.,
(ii) moiety (ii) comprises at least one mono- or difunctional bicyclic monomer comprising at least one substituent comprising one ethylenically unsaturated bond (carbon-carbon double bond), preferably at least one substituent comprising a (meth)acrylic rest (radical), especially wherein the at least one mono- or difunctional bicyclic monomer is derived from isosorbide or from (iso)borneol, (iii) moiety (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms.

Moreover, according to yet another particular embodiment, pursuant to this aspect of the present invention, the present invention is also directed to a polymeric composition, particularly a preferably water-based (waterborne) polymeric composition, especially in the form of a preferably water-based (waterborne) dispersion (emulsion or latex), particularly to be used as or in an adhesive, especially a pressure-sensitive adhesive, particularly a pressure-sensitive adhesive removable under neutral or basic (alkaline) conditions, especially the polymeric composition as defined hereinabove, wherein the copolymeric composition comprises a random graft copolymer (B) comprising, in random distribution, moieties (i), (ii) and (iii) according to the following definition:

(i) moiety (i) comprises at least one ethylenically unsaturated monomer, the homopolymer of which has a glass transition temperature $Tg^{(i)}$ ranging from $-100°$ C. to $-10°$ C., especially from $-60°$ C. to $-20°$ C., (ii) moiety (ii) comprises at least one mono- or difunctional bicyclic monomer comprising at least one substituent comprising one ethylenically unsaturated bond (carbon-carbon double bond), preferably at least one substituent comprising a (meth)acrylic rest (radical), especially wherein the at least one mono- or difunctional bicyclic monomer is derived from isosorbide or from (iso)borneol, (iii) moiety (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms;

wherein the random graft copolymer (B) comprises a copolymeric structure comprising moieties (i) and (ii) as defined hereinabove, which copolymeric structure is covalently bonded, via grafting, with another copolymeric structure comprising moieties (i), (ii) and (iii) as defined hereinabove.

Within the scope of the present invention, it can be preferred, when the polymeric composition and/or the graft copolymer (B) is obtainable by a two-stage polymerization process, especially a two-stage emulsion polymerization process, preferably a two-stage radical emulsion polymerization process, especially as defined hereinabove.

Moreover, it can also be preferred, when the polymeric composition and/or the graft copolymer (B) comprises at least two moieties (i) being different from each other and/or wherein the polymeric composition and/or the graft copolymer (B) comprises at least two moieties (ii) being different from each other.

By using at least two monomers (moieties) (i) and/or (ii) when producing the polymeric composition and/or graft copolymer (B) the properties, especially the mechanical and adhesion properties, can be precisely tailored to the use or application.

Furthermore, it can also be preferred, when the polymeric composition and/or the graft copolymer (B) comprises at least two different monomeric species of at least one moiety (i), (ii) and/or (iii).

In this context, species refers to the base monomer of the respective moiety. For example within moiety (ii) isosorbide monomethacrylate and isoborneol monomethacrylate are two different species of monomer (moiety) (ii).

Usually, all moieties (i), (ii) and (iii) named in context with the inventive polymeric composition and/or with the inventive graft copolymer (B) fully correspond to the definitions given hereinabove as to the inventive method.

Furthermore, According to a particular embodiment of this aspect of the present invention, the inventive polymeric composition and/or the inventive graft copolymer (B) may further comprise an additional moiety (iv) as defined hereinabove, especially (iv) an additional ethylenically unsaturated monomer (moiety), the homopolymer of which has a glass transition temperature $Tg^{(iv)}$ ranging from $30°$ C. to $200°$ C., especially from $40°$ C. to $150°$ C., as defined hereinabove.

According to a particular embodiment of this aspect of the present invention, the polymeric composition may comprise at least one of the following copolymers:

(i)/(ii)/(iii)-copolymers and/or copolymers comprising moieties (i), (ii) and (iii), preferably with a (i)/(ii)/(iii)-weight ratio of (60-97)/(3-28)/(0.25-12), especially (65-95)/(5-25)/(0.5-10), preferably (71-92)/(8-22)/(0.75-7), more preferably (75-89)/(10-20)/(1-5).

Alternative, according to another particular embodiment of this aspect of the present invention, the polymeric composition may comprise at least one of the following copolymers:

(i)/(ii)/(iii)/(iv)-copolymers and/or copolymers comprising moieties (i), (ii), (iii) and (iv) preferably with a (i)/(ii)/(iii)/(iv)-weight ratio of (60-97)/(3-28)/(0.25-12)/(0.1-10), especially (65-95)/(5-25)/(0.5-10)/(0.2-9), preferably (71-92)/(8-22)/(0.75-7)/(0.5-7), more preferably (75-89)/(10-20)/(1-5)/(1-5).

Polymeric compositions comprising one of the aforedefined compositions are especially suitable to be used as or in an adhesive, especially a pressure-sensitive adhesive, particularly a pressure-sensitive adhesive removable under neutral or basic (alkaline) conditions.

With respect to the polymeric composition and/or the copolymer (i.e. graft copolymer (B)) comprised by the inventive polymeric composition, in the following typical and representative but nonlimiting embodiments and characteristics will be described:

Typically, the polymeric composition may have a solids content in the range of from 20 to 75% by weight, especially in the range of from 25 to 70% by weight, preferably in the range of from 35 to 65% by weight, more preferably in the range of from 40 to 60% by weight, preferably in accordance with ISO 124:2014.

A solids content in this range is especially suitable to be used as or in adhesives, especially pressure-sensitive adhesives, particularly pressure-sensitive adhesives removable under neutral or basic (alkaline) conditions (i.e. in contact with water under neutral or basic/alkaline conditions). In particular, polymeric compositions with the above specified solids content is easily applicable and processable, especially with regard to the above mentioned adhesives.

Especially, the copolymer (i.e. graft copolymer (B)) comprised by the polymeric composition may have a polydispersity index (PDI) in the range of from 1.5 to 13, especially in the range of from 2.5 to 12, preferably in the range of from 3 to 11, more preferably in the range of from 3.5 to 10, based on the fraction of the copolymer being soluble in tetrahydrofuran (THF), preferably in accordance with DIN EN ISO 16014-5:2019.

The glass transition temperature of the copolymer comprised by the inventive polymeric composition may vary in a wide range. Usually, the copolymer (i.e. graft copolymer (B)) comprised by the polymeric composition may have a glass transition temperature Tg in the range of from −5 to −100° C., especially in the range of from −20 to −55° C., especially as determined by differential scanning calorimetry, preferably in accordance with DIN EN ISO 11357-2:2014.

Also the (absolute) particle diameter of the copolymer comprised by the inventive polymeric composition may vary in a wide range. Especially, the copolymer (i.e. graft copolymer (B)) comprised by the polymeric composition may have a (absolute) particle diameter in the range of from 140 nm to 300 nm, especially in the range of from 150 nm to 280 nm, preferably in the range of from 160 nm to 270 nm, more preferably in the range of from 170 nm to 260 nm, even more preferably in the range of from 180 nm to 250 nm, has been reached; especially as determined by light scattering, preferably in accordance with ISO 22412:2017.

Particularly, the copolymer (i.e. graft copolymer (B)) comprised by the polymeric composition may have an average molecular mass, especially a weight-average molecular mass ($M_w$), in the range of from 30,000 to 1,000,000 Da, especially in the range of from 35,000 to 750,000 Da, preferably in the range of from 40,000 to 500,000 Da, more preferably in the range of from 45,000 to 250,000 Da, even more preferably in the range of from 50,000 to 200,000 Da; especially wherein average molecular mass, especially weight-average molecular mass ($M_w$), is determined by size exclusion chromatography (SEC), particularly gel permeation chromatography (GPC), preferably with refractive index detection (RI), preferably in accordance with DIN EN ISO 16014-5:2019, particularly with polystyrene (PS) as standard, especially measured with a fraction soluble in tetrahydrofuran.

According to a particular embodiment, the copolymer (i.e. graft copolymer (B)) comprised by the polymeric composition may have a multimodal molecular mass distribution, especially a bimodal molecular mass distribution, preferably weight-based molecular mass distribution, especially measured with a fraction soluble in tetrahydrofuran.

In this context, the multimodal molecular mass distribution, especially the bimodal molecular mass distribution, of the graft copolymer (B) produced according to the method defined hereinabove and comprised by the polymeric composition may be controlled and/or tailored, during its production, via the reaction process, conditions and/or composition, especially by moiety (ii) and/or an optional chain-transfer-agent (CTA) and/or an optional crosslinker, preferably via the chemical nature, physicochemical properties and/or amounts of moiety (ii) and/or of the optional chain-transfer-agent (CTA) and/or of the optional crosslinker.

Usually, according to this specific embodiment where the graft copolymer (B) produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein the at least two distribution maxima (peaks) differ by at least $0.2 \cdot 10^1$ g/mol, especially by at least $0.5 \cdot 10^1$ g/mol, preferably by at least $10^1$ g/mol.

Typically, according to this specific embodiment where the graft copolymer (B) produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein the at least two distribution maxima (peaks) differ by at most $10^5$ g/mol, especially by at most $10^4$ g/mol, preferably by at most $10^3$ g/mol.

Especially, according to this specific embodiment where the graft copolymer (B) produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein the at least two distribution maxima (peaks) differ by a range of from $0.2 \cdot 10^1$ g/mol to $10^5$ g/mol, especially by a range of from $0.5 \cdot 10^1$ g/mol to 104 g/mol, preferably by a range of from $10^1$ g/mol to 103 g/mol.

Moreover, according to this specific embodiment where the graft copolymer (B) produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 5A, 5B, 5C, 5D, 5E and 5F), may comprise at least two distribution maxima (peaks), wherein a first distribution maximum is in the range of from $10^2$ g/mol to $5 \cdot 10^4$ g/mol and a second distribution maximum is in the range of from $6 \cdot 10^4$ g/mol to $10^6$ g/mol.

Additionally, according to this specific embodiment where the graft copolymer (B) produced according to the method defined hereinabove and comprised by the polymeric composition may have a multimodal molecular mass distribution, especially a bimodal molecular mass distribution, wherein the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein the at least two distribution modes differ by at least $0.2 \cdot 10^1$ g/mol, especially by at least $0.5 \cdot 10^1$ g/mol, preferably by at least $10^1$ g/mol.

Typically, according to this specific embodiment where the graft copolymer (B) produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein the at least two distribution modes differ by at most $10^5$ g/mol, especially by at most $10^4$ g/mol, preferably by at most $10^3$ g/mol.

Usually, according to this specific embodiment where the graft copolymer (B) produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may have at least two molecular mass distribution modes (fractions), especially at least two weight-based molecular mass distribution modes, wherein the at least two distribution modes differ by a range of from $0.2 \cdot 10^1$ g/mol to $10^5$ g/mol, especially by a range of from $0.5 \cdot 10^1$ g/mol to $10^4$ g/mol, preferably by a range of from $10^1$ g/mol to $10^3$ g/mol.

Especially, according to this specific embodiment where the graft copolymer (B) produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 5A, 5B, 5C, 5D, 5E and 5F), may comprise at least two molecular mass distribution modes (fractions), especially at least two weight-based molecular mass distribution modes, wherein a first distribution mode is in the range of from $10^2$ g/mol to $5 \cdot 10^4$ g/mol and a second distribution mode is in the range of from $6 \cdot 10^4$ g/mol to $10^6$ g/mol.

With respect to films produced from the inventive polymeric composition, especially by applying the inventive polymeric composition to a support surface (carrier) and subsequently drying and/or removal of liquid phase (dispersant), in the following typical and representative but non-limiting embodiments and characteristics will be described, wherein all these embodiments and characteristics may be modified by selecting the moieties (i), (ii), (iii) and optionally (iv) (i.e. selecting the moieties based on their characteristics and their interaction), especially from the groups listed hereinabove, particularly with regard to the inventive method, their respective amounts and by adjusting the production method (e.g. polymerization time, polymerization temperature, catalyst, chain-transfer-agent etc., especially according to the ranges described with regard to the inventive method hereinabove) to obtain a graft copolymer (B) comprised by the inventive polymeric composition which is tailored or customized for its specific application or use:

Typically, the films produced from the polymeric composition, especially by applying the polymeric composition to a support surface (carrier) and subsequently drying and/or removal of liquid phase (dispersant), may have a gel content in the range of from 10 to 95%, especially in the range of from 25 to 85%, preferably in the range of from 30 to 80%, more preferably in the range of from 35 to 75%, especially as determined by Soxhlet extraction with tetrahydrofuran (THF) as solvent, preferably in accordance with ASTM-D2765.

Usually, the films produced from the polymeric composition, especially by applying the polymeric composition to a support surface (carrier) and subsequently drying and/or removal of liquid phase (dispersant), may have 180° peel values in the range of from 3 to 35 N/25 mm, especially in the range of from 4 to 30 N/25 mm, preferably in the range of from 5 to 25 N/25 mm, more preferably 5 to 10 N/25 mm, preferably in accordance with ASTM-D3330. Especially, for measuring 180° peel values, 15 µm films are used.

Also, the films produced from the polymeric composition, especially by applying the polymeric composition to a support surface (carrier) and subsequently drying and/or removal of liquid phase (dispersant), may have loop tack values in the range of from 5 to 50 N/25 mm, especially in the range of from 6 to 40 N/25 mm, preferably in the range of from 7 to 40 N/25 mm, preferably in accordance with ASTM-D6195. Especially, for measuring loop tack values, 15 µm films are used.

Furthermore, the films produced from the polymeric composition, especially by applying the polymeric composition to a support surface (carrier) and subsequently drying and/or removal of liquid phase (dispersant), may have work of adhesion values in the range of from 10 to 240 J/m², especially in the range of from 20 to 220 J/m², preferably in the range of from 30 to 200 J/m², preferably in accordance with ASTM-D6195. Especially, for measuring work of adhesion values, 15 µm films are used.

Moreover, the films produced from the polymeric composition, especially by applying the polymeric composition to a support surface (carrier) and subsequently drying and/or removal of liquid phase (dispersant), may have shear values in the range of from 30 to 14,000 min, especially in the range of from 50 to 13,000 min, preferably in the range of from 120 to 12,000 min, preferably in accordance with ASTM-D3654. Especially, for measuring shear values, 15 µm films are used.

Particularly, the films produced from the polymeric composition, especially by applying the polymeric composition to a support surface (carrier) and subsequently drying and/or removal of liquid phase (dispersant), may have SAFT values in the range of from 20 to 200° C., especially in the range of from 30 to 185° C., preferably in the range of from 40 to 170° C., preferably in conformity with ASTM-D4498. Especially, for measuring SAFT values, 15 µm films are used.

According to a particular embodiment, the inventive polymeric composition may have neutral or slightly acidic pH value.

In other words, the polymeric composition may have a pH value in the range of from 4 to 8, especially in the range of from 5 to 8, preferably in the range of from 6.5 to 8.

It is especially preferred for the polymeric composition to have a neutral or slightly alkaline (basic) pH value, especially in the aforedefined ranges, because thereby the free carboxylic groups are present on the outside of the polymeric particles and thus the polymeric particles are essentially not water soluble or water dispersible and can be used as or in an adhesive (i.e. in alkaline conditions the free carboxylic groups are converted into carboxylate groups which leads to the water solubility or water dispersibility of the polymeric particles).

According to this aspect of the present invention, it is preferred, when the polymeric composition and/or the copolymer comprised by the polymeric composition is removable under neutral or basic (alkaline) conditions, especially under neutral or basic (alkaline) pH conditions, particularly under pH conditions in the range of from 7 to 14, more particularly in the range of from 7.5 to 12.

According to this aspect of the present invention, it is also preferred, when the polymeric composition and/or the copolymer comprised by the polymeric composition is removable under neutral or basic (alkaline) conditions at ambient temperature (20° C.) or at elevated temperatures, especially at elevated temperatures, preferably at temperatures in the range of from 20 to 120° C., more preferably in the range of from 23 to 100° C., even more preferably in the range of from 25 to 90° C.

Furthermore, according to this aspect of the present invention, it is also preferred, when the polymeric composition and/or the copolymer comprised by the polymeric composition is essentially removed under neutral or basic (alkaline) conditions, especially under neutral or basic (alkaline) conditions as described hereinabove, after a duration in the range of from 2 min to 45 min, especially in the range of from 3 min to 30 min, preferably in the range of from 4 min to 20 min.

These conditions (temperature, pH value and time) are typically used during e.g. bottle cleaning processes. When the polymeric composition and/or the copolymer comprised therein can be easily removed in those conditions, no additional removal step would have to be incorporated in a respective process but the removal of the adhesive would be incorporated easily into an existing process without the need to change any process conditions.

According to a particular embodiment of this aspect of the present invention, the inventive polymeric composition may further comprise at least one additive, especially selected from the group consisting of tackifiers, resins, buffering agents, pH adjusting agents, surfactants, viscosifying agents, rheology modifiers, UV-stabilizing agents, heat protection agents, plasticizers, waxes, stabilizers, dispersants, preservatives, pigments, oils, colorants, flavorants and combinations thereof.

Furthermore, according to a particular embodiment of this aspect of the present invention, the inventive polymeric composition further comprises at least one tackifier, especially resin-based tackifier.

Moreover, the polymeric composition may be characterized by one or more of the features described hereinabove.

With respect to further details as to the polymeric composition according to the present invention, 25 reference may be made to the above descriptions of the inventive method, which apply accordingly also to this aspect of the present invention.

According to a third aspect of the present invention, the present invention further refers to the use of a polymeric composition as defined hereinabove as or in an adhesive, especially a pressure-sensitive adhesive, particularly a pressure-sensitive adhesive removable under neutral or basic (alkaline) conditions.

According to this aspect of the present invention, it is preferred when the use of the polymeric composition is characterized by one or more of the features described hereinabove.

With respect to further details as to the inventive use of a polymeric composition according to the present invention, reference may be made to the above description of the inventive method and the inventive polymeric composition, which applies accordingly also to this aspect of the present invention.

According to a fourth aspect of the present invention, the present invention further refers to an adhesive, especially a pressure-sensitive adhesive, especially removable under neutral or basic (alkaline) conditions, preferably in the form of a preferably water-based (waterborne) dispersion (emulsion or latex), wherein the adhesive comprises a preferably water-based (waterborne) polymeric composition as defined hereinabove and/or wherein the adhesive is obtainable using a preferably water-based (waterborne) polymeric composition as defined hereinabove and/or wherein the adhesive comprises a graft copolymer, especially a random graft copolymer (i.e. graft copolymer (B)), as defined hereinabove and hereinbelow.

According to a particular embodiment of this aspect of the present invention, the adhesive further comprises at least one additive, especially selected from the group consisting of tackifiers, resins, buffering agents, pH adjusting agents, surfactants, viscosifying agents, rheology modifiers, UV-stabilizing agents, heat protection agents, plasticizers, waxes, stabilizers, dispersants, preservatives, pigments, oils, colorants, flavorants and combinations thereof.

Furthermore, according to a particular embodiment of this aspect of the present invention, the adhesive further comprises at least one tackifier, especially resin-based tackifier.

By addition of further components (i.e. additives or tackifiers) the properties of the adhesive can be tailored to fit the exact application.

According to this aspect of the present invention, it is also preferred when the adhesive is characterized by one or more of the features described hereinabove.

With respect to further details as to the adhesive according to the present invention, reference may be made to the above description of the inventive method, the inventive polymeric composition and the inventive use of the polymeric composition, which applies accordingly also to this aspect of the present invention.

According to a fifth aspect of the present invention, the present invention further refers to the use of an adhesive as hereinabove for attaching and/or adhering labels, packagings, tags, tickets, tabs, stickers, sign, plaques or the like to objects.

According to this aspect of the present invention, it is preferred, when the attached and/or adhered labels, packagings, tags, tickets, tabs, stickers, sign, plaques or the like are peelable and/or removable and/or releasable from the objects, especially under neutral or basic (alkaline) conditions and/or especially when in contact with a neutral or basic (alkaline) medium.

According to this aspect of the present invention, it is also preferred when the use of the adhesive is characterized by one or more of the features described hereinabove.

With respect to further details as to the use of the adhesive according to the present invention, reference may be made to the above description of the inventive method, the inventive polymeric composition, the inventive use of the polymeric composition and the inventive adhesive, which applies accordingly also to this aspect of the present invention.

According to a sixth aspect of the present invention, the present invention further refers to a graft copolymer, especially a random graft copolymer (i.e. graft copolymer (B)), wherein the graft copolymer is obtainable from the polymeric composition as defined hereinabove, preferably by removal of the liquid carrier, especially the water-based (waterborne) liquid carrier, of the polymeric composition.

According to a particular embodiment, pursuant to this aspect of the present invention, the present invention is directed to a graft copolymer, especially a random graft copolymer (i.e. graft copolymer (B)), especially a graft copolymer as defined hereinabove, wherein the graft copolymer is a random graft copolymer comprising, in random distribution, moieties (i), (ii) and (iii) according to the following definition:

(i) monomer (moiety) (i) comprises at least one ethylenically unsaturated monomer, the homopolymer of which has a glass transition temperature $Tg^{(i)}$ ranging from −100° C. to −10° C., especially from −60° C. to −20° C., (ii) monomer (moiety) (ii) comprises at least one mono- or difunctional bicyclic monomer comprising at least one substituent comprising one ethylenically unsaturated bond (carbon-carbon double bond), preferably at least one substituent comprising a (meth)acrylic rest (radical), especially wherein the at least one mono- or difunctional bicyclic monomer is derived from isosorbide or from (iso)borneol, (iii) monomer (moiety) (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms.

Furthermore, according to another particular embodiment, pursuant to this aspect of the present invention, the present invention is also directed to a graft copolymer, especially a random graft copolymer (i.e. graft copolymer (B)), especially a graft copolymer as defined hereinabove, wherein the graft copolymer is a random graft copolymer comprising, in random distribution, moieties (i), (ii) and (iii) according to the following definition:

(i) monomer (moiety) (i) comprises at least one ethylenically unsaturated monomer, the homopolymer of which has a glass transition temperature $Tg^{(i)}$ ranging from −100° C. to −10° C., especially from −60° C. to −20° C., (ii) monomer (moiety) (ii) comprises at least one mono- or difunctional bicyclic monomer comprising at least one substituent comprising one ethylenically unsaturated bond (carbon-carbon double bond), preferably at least one substituent comprising a (meth)acrylic rest (radical), especially wherein the at least one mono- or difunctional bicyclic monomer is derived from isosorbide or from (iso)borneol, (iii) monomer (moiety) (iii) comprises at least one ethylenically unsaturated carboxylic acid, especially at least one ethylenically unsaturated carboxylic acid having 3 to 6 carbon atoms, preferably at least one monoethylenically unsaturated carboxylic acid preferably having 3 to 6 carbon atoms, more preferably at least one monoethylenically unsaturated mono- or dicarboxylic acid preferably having 3 to 6 carbon atoms;

wherein the graft copolymer comprises a copolymeric structure comprising moieties (i) and (ii) as defined hereinabove, which copolymeric structure is covalently bonded, via grafting, with another copolymeric structure comprising moieties (i), (ii) and (iii) as defined hereinabove.

According to a particular embodiment of this aspect of the present invention, it is preferred, when the graft copolymer is obtainable by a two-stage polymerization process, especially a two-stage emulsion polymerization process, preferably a two-stage radical emulsion polymerization process, especially as defined hereinabove.

Moreover, according to a further particular embodiment of this aspect of the present invention, it is also preferred, when the graft copolymer (B) comprises at least two moieties (i) being different from each other and/or wherein the graft copolymer (B) comprises at least two moieties (ii) being different from each other.

Additionally, according to another particular embodiment of this aspect of the present invention, it is also preferred, when the graft copolymer (B) comprises at least two different monomeric species of at least one moiety (i), (ii) and/or (iii).

In this context, species refers to the base monomer of the respective moiety, as already mentioned hereinbefore. For example within moiety (ii) isosorbide monomethacrylate and isoborneol monomethacrylate are two different species of monomer (moiety) (ii).

According to this aspect of the present invention, it is also preferred when the graft copolymer is characterized by one or more of the features described hereinabove.

With respect to further details as to the use of the adhesive according to the present invention, reference may be made to the above description of the inventive method, the inventive polymeric composition, the inventive use of the polymeric composition and the inventive adhesive and the inventive use of the adhesive, which applies accordingly also to this aspect of the present invention.

According to a seventh aspect of the present invention, the present invention further refers to a random copolymer (i.e. first copolymer (A)) and/or a preferably water-based (waterborne) copolymeric composition, especially in the form of a preferably water-based (waterborne) dispersion (i.e. emulsion, latex), comprising said random copolymer, wherein the random copolymer and/or the copolymeric composition is obtainable by the first stage (a) of the method defined hereinabove.

According to a particular embodiment of this aspect of the present invention, it is preferred, when the random copolymer comprises, in random distribution, moieties (i), (ii) and (iii) each as defined hereinabove and comprises free carboxylate groups —C(O)—O⁻.

Furthermore, according to yet another particular embodiment of this aspect of the present invention, it is preferred, when the random copolymer has a multiple functionality, especially at least a triple functionality, particularly when used in a copolymerization method, especially in the second stage (b) of the method defined hereinabove, especially a functionality as a seed and/or as an emulsifier and/or as a stabilizer.

In this context, a multiple functionality refers to the possibility of using the inventive random copolymer for different purposes simultaneously. For example, the inventive random copolymer can be used and/or function as an emulsifier and a stabilizer at the same time and in the same process.

Moreover, according to this aspect of the present invention, the random copolymer may be appropriate to be used and/or functions as a seed and/or as an emulsifier and/or as a stabilizer in a copolymerization method, especially in the second stage (b) of the method defined hereinabove.

With respect to the random copolymer and/or the copolymeric composition, in the following typical and representative but non-limiting embodiments and characteristics will be described:

Typically, the random copolymer, especially when the carboxylate groups have been converted into carboxylic acid groups, may have an acid value (AV) in the range of from 75 to 140 mg KOH/g, especially in the range of from 80 to 120 mg KOH/g, preferably in the range of from 85 to 100 mg KOH/g, especially as determined by titration, particularly potentiometric titration, preferably in accordance with ASTM D664.

Usually, the random copolymer may have an average molecular mass, especially a weight-average molecular mass ($M_w$), in the range of from 2,000 to 50,000 Da, especially in the range of from 5,000 to 25,000 Da, preferably in the range of from 7,500 to 20,000 Da, more preferably in the range of from 8,000 to 15,000 Da; especially wherein average molecular mass, especially weight-average molecular mass ($M_w$), is determined by size exclusion chromatography (SEC), particularly gel permeation chromatography (GPC), preferably with refractive index detection (RI), preferably in accordance with DIN EN ISO 16014-5:2019, particularly with polystyrene (PS) as standard, especially measured with a fraction soluble in tetrahydrofuran.

Especially, the copolymeric composition comprising the random copolymer may have a solids content, based on the total weight of the first copolymer (A) resulting from stage (a), in the range of from 1 to 50% by weight, especially in the range of from 5 to 40% by weight, preferably in the range of from 10 to 35% by weight, more preferably in the range of from 15 to 30% by weight.

Furthermore, the random copolymer may have a (absolute) particle diameter in the range of from 40 nm to 200 nm, especially in the range of from 50 nm to 180 nm, preferably in the range of from 60 nm to 170 nm, more preferably in the range of from 70 nm to 160 nm, even more preferably in the range of from 80 nm to 140 nm; especially as determined by light scattering, preferably in accordance with ISO 22412:2017.

According to this aspect of the present invention, it is also preferred when the random copolymer and/or the copolymeric composition is characterized by one or more of the features described hereinabove.

With respect to further details as to the use of the adhesive according to the present invention, reference may be made to the above description of the inventive method, the inventive polymeric composition, the inventive use of the polymeric composition and the inventive adhesive, the inventive use of the adhesive and the inventive graft copolymer, which applies accordingly also to this aspect of the present invention.

According to an eighth aspect of the present invention, the present invention further refers to the use of a random copolymer as defined hereinabove in a copolymerization method and/or as a seed and/or as an emulsifier and/or as a stabilizer in a copolymerization method, especially in the second stage (b) of the method defined hereinabove.

According to this aspect of the present invention, it is also preferred when the use of the random copolymer is characterized by one or more of the features described hereinabove.

With respect to further details as to the use of the adhesive according to the present invention, reference may be made to the above description of the inventive method, the inventive polymeric composition, the inventive use of the polymeric composition and the inventive adhesive, the inventive use of the adhesive, the inventive graft copolymer and the inventive random copolymer, which applies accordingly also to this aspect of the present invention.

Thus, on the whole, the present invention provides an efficient method for producing polymeric compositions, especially compositions to be used as or in adhesives, especially pressure-sensitive adhesives, particularly pressure-sensitive adhesives removable under neutral or basic (alkaline) conditions (i.e. in contact with water under neutral or basic/alkaline conditions). As delineated hereinbefore, the present invention, namely both the inventive method as well as the inventive polymeric compositions and adhesives resulting therefrom and the various uses and applications thereof, is linked to a multitude of particularities and advantages, which clearly distinguish the present invention from the disadvantageous prior art techniques.

Further embodiments, modifications and variations of the present invention can readily be recognized and implemented by the skilled practitioner when reading the description, without leaving the scope of the present invention.

The present invention is illustrated, in the following, with reference to various Examples including the respective Figures referring thereto, which Examples and Figures, however, shall not restrict or limit the present invention in any way.

EXAMPLES

Abbreviations

OA: 2-octyl acrylate (corresponds to monomer (moiety) (i))

IBOMA: isobornylmethacrylate (corresponds to monomer (moiety) (i))

ISOMA mix: mixture of monomethacrylic and dimethacrylic isosorbide (corresponds to monomer (moiety) (ii))

ISOMA mono: monomethacrylic isosorbide (corresponds to monomer (moiety) (ii))

MAA: methacrylic acid (corresponds to monomer (moiety) (iii))

EHTG: chain transfer-agent, 2-ethylhexylthioglycolate

NaPS: sodium persulfate

SDS sodium dodecyl sulfate

EHA 2-ethylhexyl acrylate

Synthesis of the Inventive Random Copolymers (i.e. Inventive First Copolymers (A)=ASRs)

A bio-based inventive random copolymer (synonymously also first copolymer (A) or ASR=alkaline soluble resin) is produced using 2-octyl acrylate (OA) as monomer (moiety) (i), a mixture of monomethacrylic and dimethacrylic isosorbide (ISOMA mix) with a molecular ratio of 4:1 or isobornylmethacrylate (IBOMA) as monomer (moiety) (ii) and methacrylic acid (AA) as monomer (moiety) (iii). Furthermore, 2-ethylhexylthioglycolate (EHTG) is used as a chain transfer agent to obtain, in a first stage (a) of the inventive method, copolymers (i.e. random copolymers (A) of the present invention, synonymously called, ASRs) with a weight-average molecular mass of the fraction soluble in tetrahydrofuran of about 10,000 Da. Two different ASRs are synthesized with the following monomer-ratio and bio-content:

TABLE 1

Synthesized inventive ASRs (random copolymers first copolymers (A)), wherein the amounts are given in wt.-%

| ASR | OA | IBOMA | ISOMA mix | MAA | bio-content |
|---|---|---|---|---|---|
| R1 | 75 | 10 | — | 15 | 62% |
| R2 | 75 | — | 10 | 15 | 61% |

The reactions are carried out in a 250 mL jacketed glass reactor equipped with reflux condenser, nitrogen and feeding inlet, sample outlet and anchor type stainless steel stirrer. First, the reactor is charged with the initial charge (see Table 2) and is then purged with nitrogen and the temperature is increased under agitation at 200 rpm to 80° C. Once the temperature is reached an aqueous initiator solution is added as a shot and then the monomer pre-emulsion is fed over a time period of 40 min. After the feeding process, a post-polymerization process is carried out for 30 min. The compositions used for the initial charge, the initiator solution and the monomer pre-emulsion are specified in Table 2 and a representative scheme of the process is presented in FIG. 15.

TABLE 2

Composition of the initial charge, the initiator solution and the pre-emulsion used

| | | amount [g] |
|---|---|---|
| initial charge | water | 85 |
| | SDS (15%) | 1.33 |
| initiator solution | water | 6.64 |
| | NaPS | 0.5 |
| monomer pre-emulsion | water | 20 |
| | SDS (15%) | 1.13 |
| | monomers | 30 |
| | EHTG | 1.1 |

Figure 2:
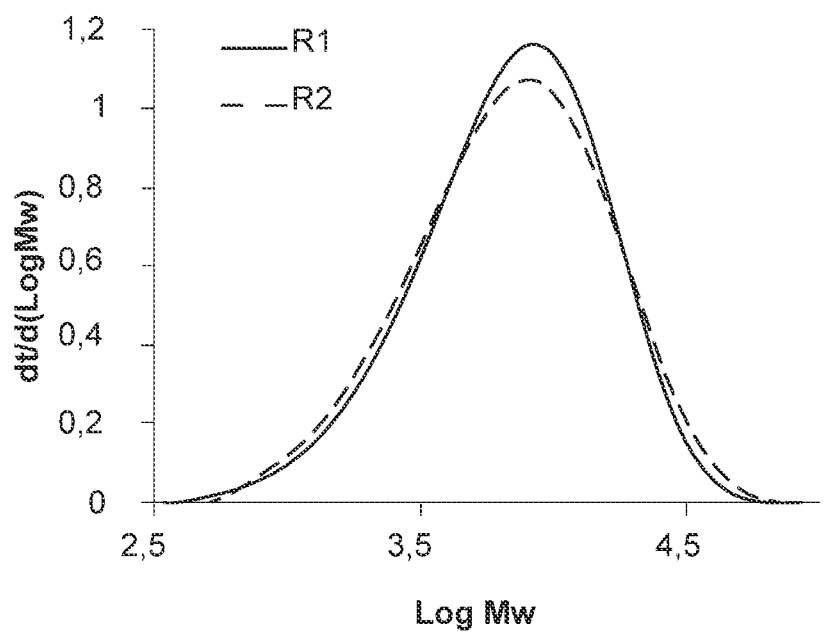
FIG. 2 shows the molecular mass distributions measured by SEC/RI (size exclusion chromatography with refractive index detection) of two different first copolymers (A) according to particular embodiments of the invention.

The two synthesized bio-based ASRs are obtained as stable dispersions with full conversion and solids content around 25% and similar particle sizes between 100 nm and 125 nm. A representative example of the evolution of instantaneous and overall conversion for ASR R1 is shown in FIG. 1. Furthermore, FIG. 2 shows the molecular mass distributions of the fractions soluble in tetrahydrofuran of the two synthesized ASRs R1 and R2. Table 3 shows the two resin compositions together with their main properties, namely intensity-average particle size (Dp), molecular mass ($M_w$), polydispersity index (Đ), glass transition temperature (Tg) and experimental acid value (AV). Both resins have similar molecular masses which are around the targeted value of 10,000 Da, wherein R1 (containing ISOMA mix) yields lower Tg compared to R2 (containing IBOMA).

TABLE 3

Composition, particle size, molecular mass, polydispersity index, glass transition temperature and acid value of the synthesized ASRs

| ASR | composition | Dp [nm] | Mw [kDa] | Đ | Tg [° C.] | AV [mg/g] |
|---|---|---|---|---|---|---|
| R1 | OA:IBOMA:MAA (75:10:15) | 125 | 9.3 ± 0.2 | 1.9 | −30 | 88 |
| R2 | OA:ISOMA mix:MAA (75:10:15) | 104 | 9.5 ± 0.2 | 2 | −40 | 89 |

The conversion is determined gravimetrically and the particle size is determined by dynamic light scattering (DLS). The acid value is measured by potentiometric titration in accordance with ASTM D664 to determine the amount of free-carboxylic acid groups in the resin. The resin is dissolved in isopropanol and the solution is then titrated with KOH solution (1.0 M). The amount of acidic groups is given by the acid value (AV):

$$AV = \frac{mgKOH}{gASR}$$

Where AV is the amount in milligrams of potassium hydroxide that is required to neutralize one gram of ASR. The theoretical acid value of the ASRs is 98 mg KOH/g ASR. The molecular mass distribution of the fraction soluble in THF is measured by size exclusion chromatography (SEC/RI) at 35° C. The glass transition temperature (Tg) was determined by differential scanning calorimetry (DSC).

In this respect, it is worth mentioning that the presence of isosorbide dimethacrylate in R2 provides pendant double bonds within the polymer structure, which can be confirmed by $^1$H NMR.

Synthesis of Inventive Pressure-Sensitive Adhesives (i.e. Inventive Polymeric Compositions Comprising the Inventive Graft Copolymers (B))

Using the two different ASRs (i.e. R1 and R2) as produced in the first stage (a) according to the aforedescribed procedure, a total of six different PSAs (synonymously also graft copolymers (B)) are synthesized, according to a second stage (b) of the inventive method, using a pre-emulsion of (further) monomers (i) and (ii) and optionally chain-transfer agent in the following specified amounts (i.e. in addition to the already synthesized ASRs R1 or R2):

TABLE 4

Amounts of monomers and CTA used in addition to the synthesized ASRs for the synthesis of inventive PSAs, wherein for PSAs R1.1, R1.2 and R1.3 R1 is used and for PSAs R2.1, R2.2 and R2.3 R2 is used, wherein the amounts of the monomers are given in wt.-%

| PSA | OA | IBOMA | ISOMA mono | EHTG [wbm %] |
|---|---|---|---|---|
| R1.1 | 100 | — | — | — |
| R1.2 | 85 | 15 | — | — |
| R1.3 | 85 | 15 | — | 0.025 |
| R2.1 | 85 | 15 | — | — |
| R2.2 | 85 | 15 | — | 0.025 |
| R2.3 | 85 | 10 | 5 | 0.025 |

For the synthesis of waterborne PSAs/polymeric composition, respectively, first a known quantity of the synthesized ASR (i.e. R1 or R2) is charged in the reactor, then the temperature is raised to 80° C. under moderate nitrogen flux. After that, a shot of ammonia is added, followed by 10 min of agitation at 200 rpm (i.e. conversion of the free carboxylic acid groups of the ASR into carboxylate groups). Then, a shot of initiator solution is added and the pre-emulsion of monomers (i) and (ii) (as specified in Table 4) is fed over a time period of 120 min. Subsequently, a post-polymerization process is performed for additional 60 min at 80° C. The ratio of ASR:pre-emulsion of monomers (i.e. second stage monomers) is 20:80. The ASR is used as a seed, a polymeric stabilizer and an emulsifier in the synthesis of the final PSA. Furthermore, as a reference, a standard comparative PSA is also produced, using a two-stage emulsion polymerization with the monomers 2-ethylhexyl acrylate (EHA), methyl methacrylate (MMA) and methacrylic acid (MAA) with the following composition: EHA:MMA:MAA (84:15:1). The compositions used for the initial charge, the ammonia shot, the initiator solution and the monomer pre-emulsion to produce the inventive PSAs are shown in Table 5 and a representative scheme of the process is presented in FIG. 16.

TABLE 5

Composition of the initial charge, the ammonia shot, the initiator solution and the pre-emulsion used in the second stage or the PSA synthesis

| | | amount [g] |
|---|---|---|
| initial charge | ASR | 28.6 |
| base | ammonia (25%) | 0.77 |
| initiator solution | water | 3 |
| | NaPS | 0.226 |
| monomer pre-emulsion | water | 23.86 |
| | SDS | 1.02 |
| | monomers | 45.14 |

Figure 3:
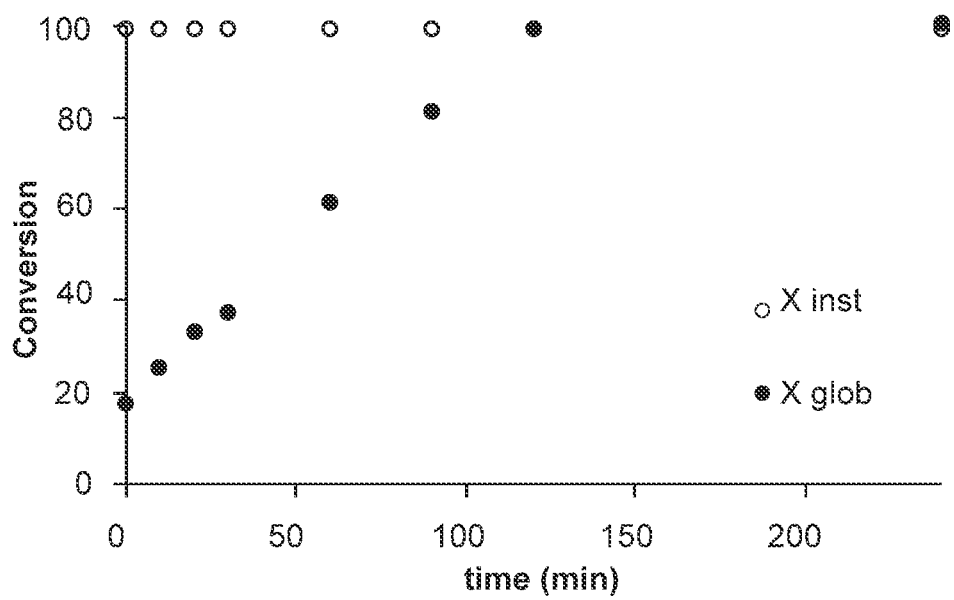
FIG. 3 shows the instantaneous and overall conversion during stage (b) according to a further particular embodiment of the invention.
Figure 4:
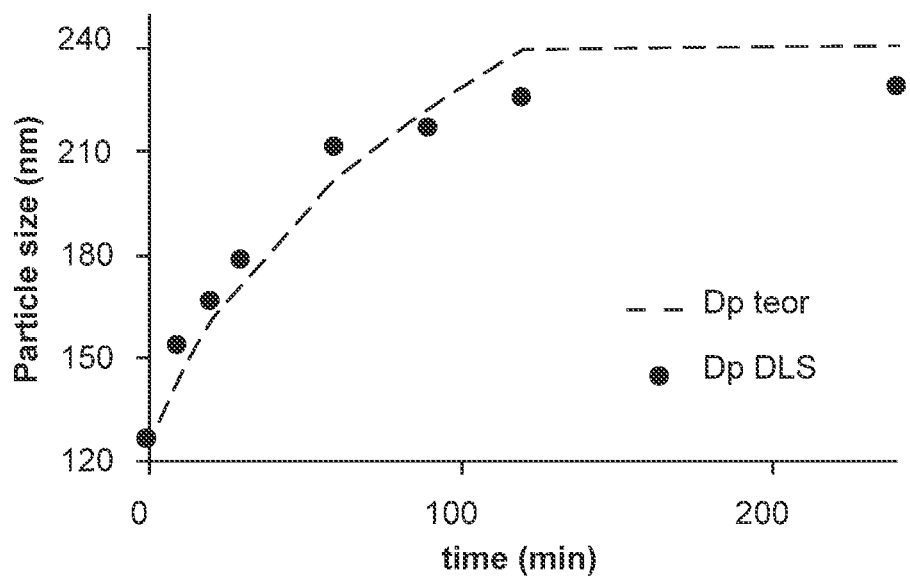
FIG. 4 shows average particle sizes during stage (b) according to yet another particular embodiment of the invention.

The bio-based latices (PSAs) with final solids content of 50% and particle sizes between 210 nm and 230 nm (see for example the particle size evolution of R1.2 in FIG. 4) are obtained as stable dispersions. With both resins starved-feed conditions (i.e. instantaneous conversion close to 100%) could be achieved. A representative example of the evolution of instantaneous and overall conversion for R1.2 is shown in FIG. 3.

In the following several exemplary structures illustrating copolymers produced by the inventive method and comprised by the inventive polymeric composition are shown (i.e. inventive polymeric compositions/graft copolymers (B) of Examples R1.1, R1.2, R1.3, R2.1, R2.2 and R2.3).

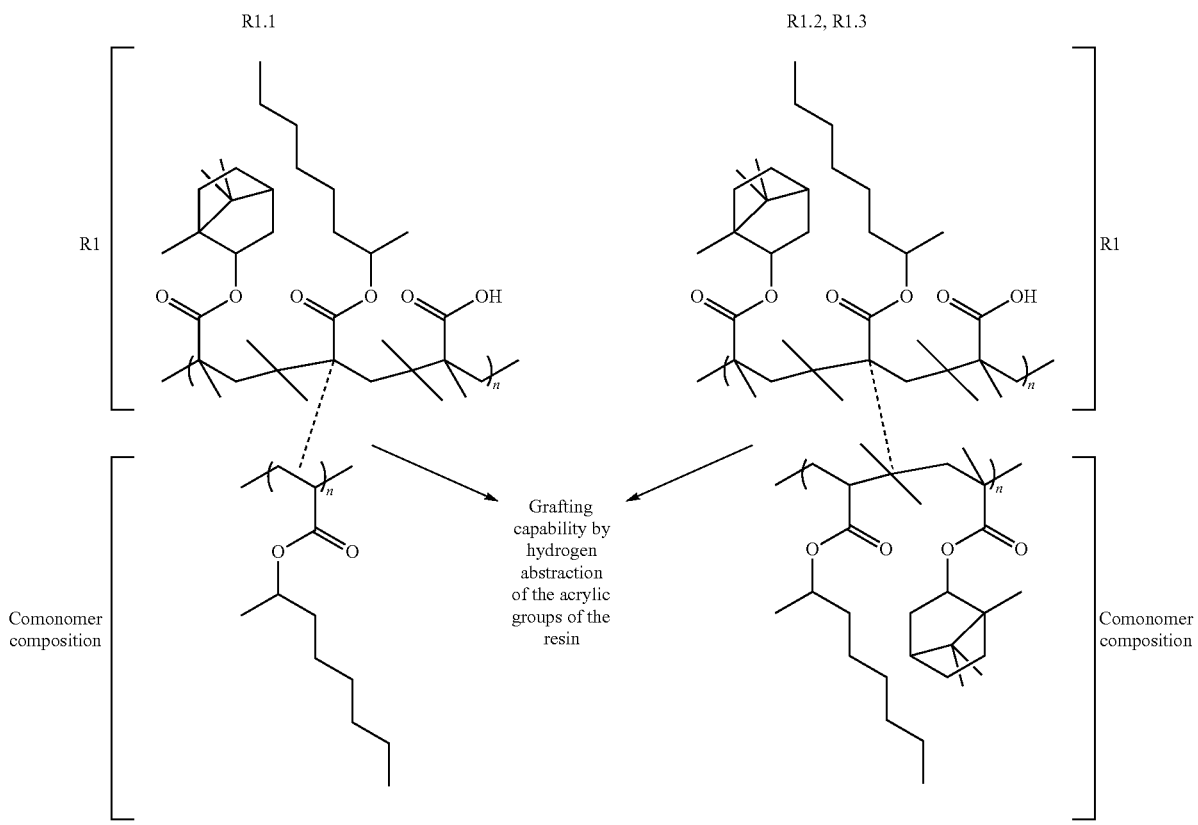

-continued

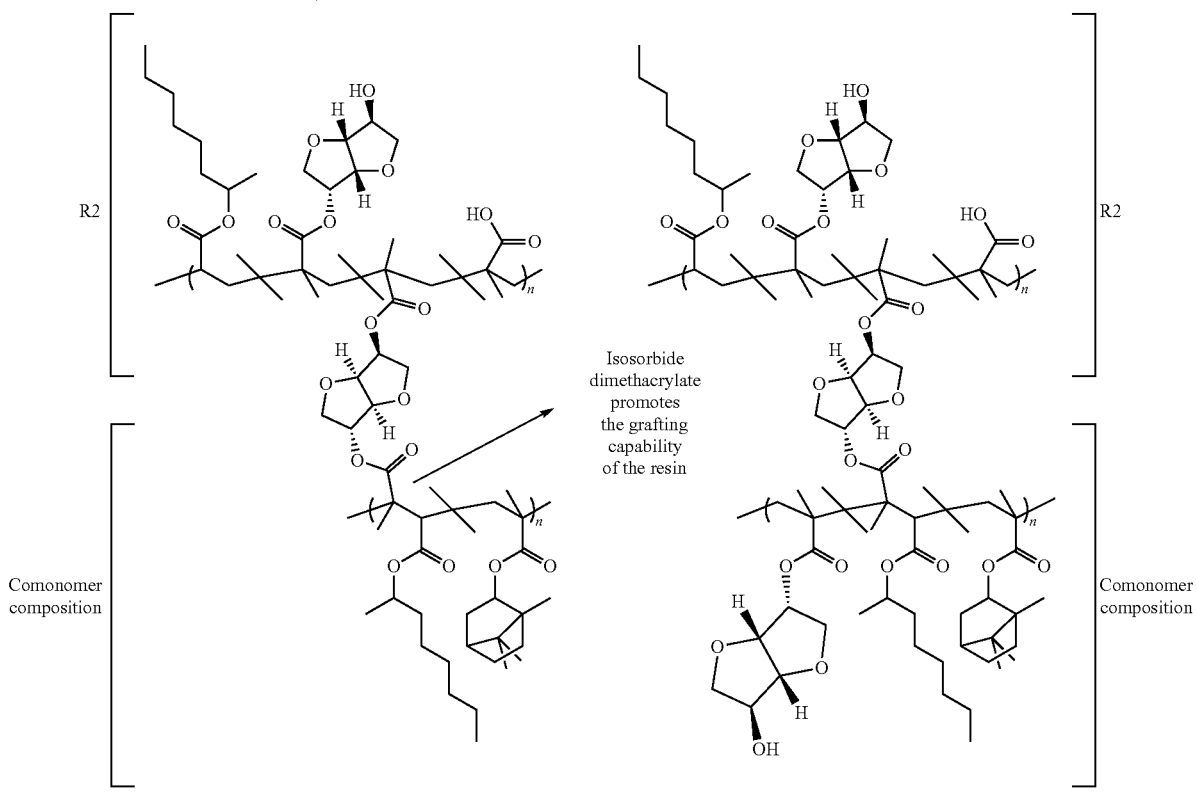

Isosorbide dimethacrylate promotes the grafting capability of the resin

The main properties, namely intensity-average particle size (Dp), gel content, molecular mass of the fraction soluble in tetrahydrofuran ($M_w$), polydispersity index (Đ), glass transition temperature (Tg) and bio-content of the synthesized PSAs are summarized in Table 6.

Crosslinking in the polyacrylates leads to the formation of a network. These networks, as they surpass a certain size, are not soluble in THF anymore, whereas the linear part of the polyacrylate (i.e. not crosslinked part) can be dissolved in THF.

TABLE 6

Composition particle diameter, gel content, molecular mass, polydispersity index, glass transition temperature and bio-content of the synthesized PSAs (polymeric composition or the respective graft copolymers (B))

| PSA | composition of monomer pre-emulsion | Dp [nm] | Gel [%] | Mw [kDa] | Đ | Tg [° C.] | bio-content [%] |
|---|---|---|---|---|---|---|---|
| R1.1 | OA (100) | 230 | 66 ± 51 | 63 ± 5 | 4.1 | −43 | 71 |
| R1.2 | OA:IBOMA (85:15) | 229 | 61.5 ± 0.2 | 89 ± 0.3 | 6.2 | −28 | 71 |
| R1.3 | OA:IBOMA:CTA* (85:15) | 210 | 50.3 ± 0.2 | 111 ± 0.3 | 5.9 | −28 | 71 |
| R2.1 | OA:IBOMA (85:15) | 215 | 56.2 ± 0.2 | 104 ± 1.3 | 6.2 | −28 | 70 |
| R2.2 | OA:IBOMA:CTA* (85:15) | 210 | 51.3 ± 1 | 122 ± 19.6 | 8. | −28 | 70 |
| R2.3 | OA:IBOMA:ISOMA mono:CTA* (85:10:5) | 220 | 47 ± 2 | 1514.3 | 9.6 | −29 | 70 |

CTA*: 0.025 wt.-% of EHTG based on the monomer pre-emulsion

To determine the gel content (GC S), Soxhlet extractions of the dried latices are carried out Soxhlet extraction describes the process of the continuous extraction of soluble components from solids. THF (tetrahydrofuran) is used as a solvent for the determination of the gel content for water-borne polyacrylates. The in THF soluble part of the polyacrylate (the so called "sol") is extracted from the in THF insoluble part (the so called "gel").

To measure the gel content, glass fiber square pads (CEM) are used as backing. A few droplets of latex are placed on the filter (filter weight=$W_1$) and dried under vacuum overnight at room temperature. The filter together with the dried polymer is weighed ($W_2$) and then a continuous extraction with THF under reflux in the Soxhlet is carried out for 24 hours. The weight of the dry sample is taken ($W_3$) after the extraction is completed. The gel content is calculated as the ratio between the weight of the insoluble polymer fraction and that of the initial sample, as shown by the following equation:

$$\text{Gel content [\%]} = \frac{W_3 - W_1}{W_2 - W_1} \times 100$$

Figure 5A:
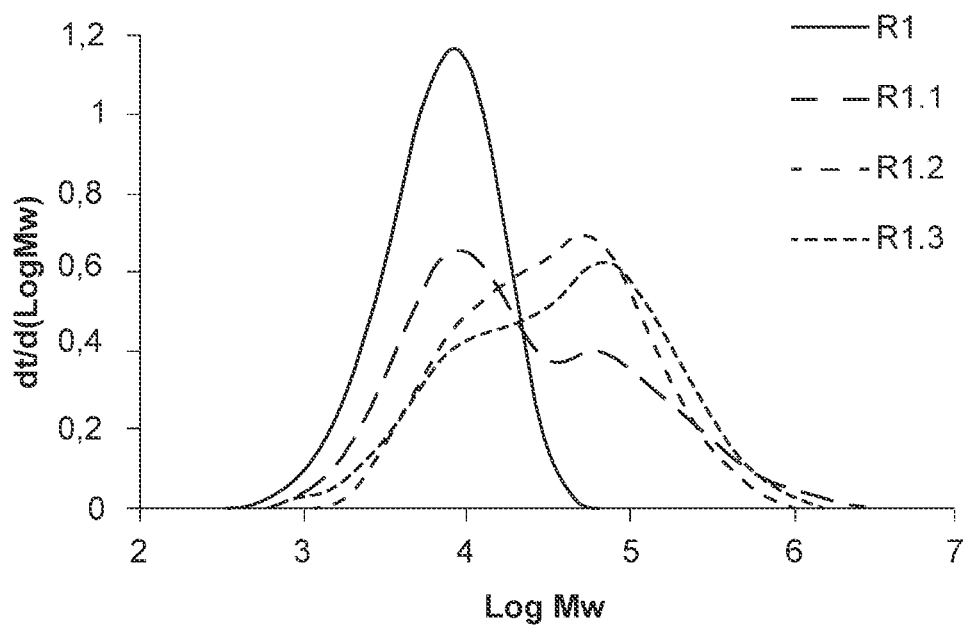
FIGS. 5A & 5B each show molecular mass distributions measured by SEC/RI of the fraction soluble in tetrahydrofuran of various graft copolymers (B) comprised by the inventive latices (i.e., polymeric compositions) according to yet another particular embodiment of the invention.
Figure 5B:
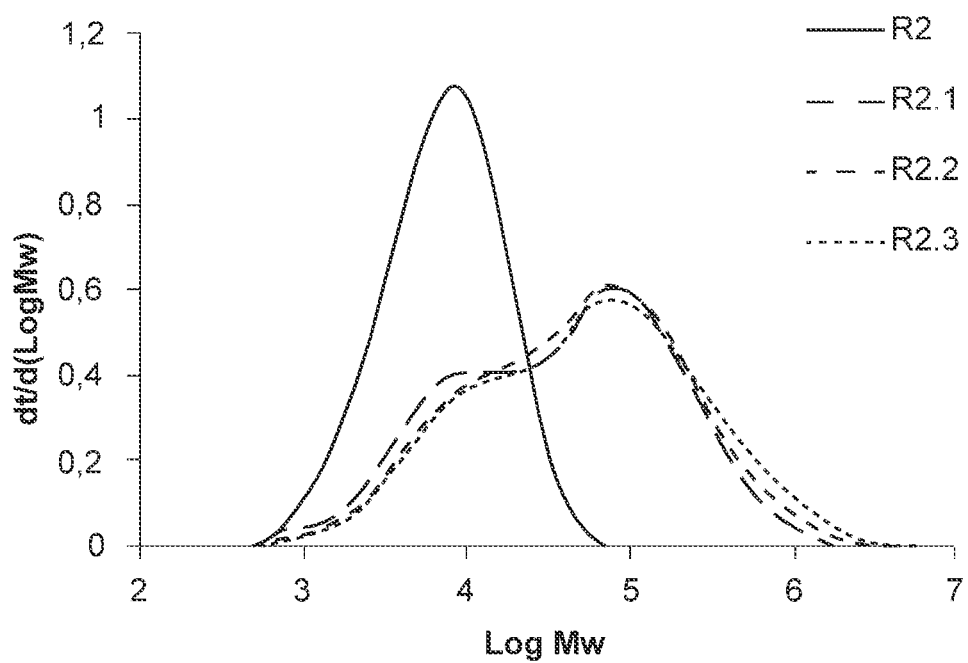
Figure 5C:
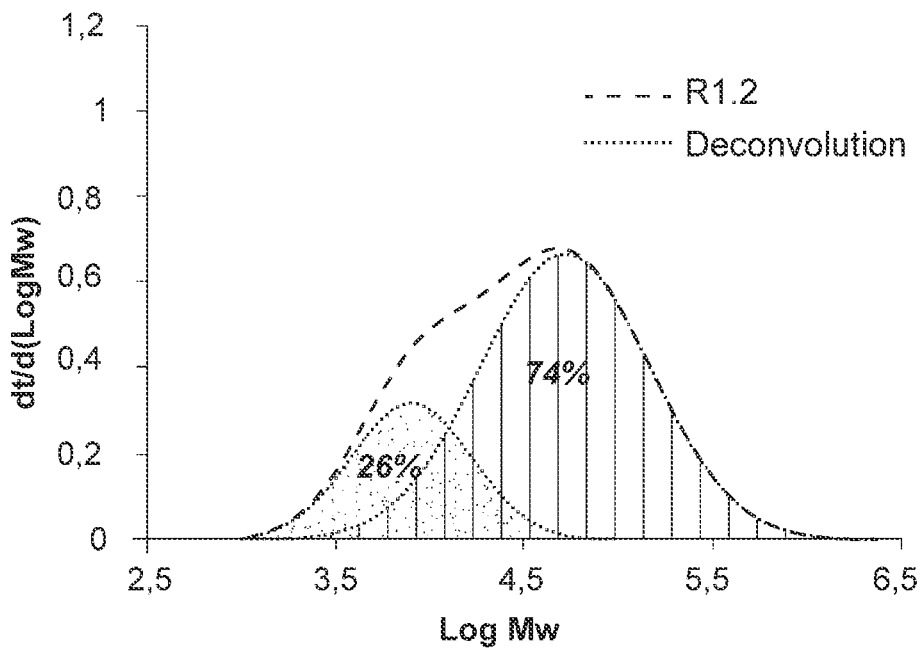
FIGS. 5C & 5D each show bimodal molecular mass distributions measured by SEC/RI of the fraction soluble in tetrahydrofuran of various graft copolymers (B) comprised by the inventive latices (i.e., polymeric compositions) according to yet another particular embodiment of the invention, including a respective deconvolution showing the two different modes (fractions) and their distribution maxima (peaks) as well as their respective proportions in percent (%)
Figure 5D:
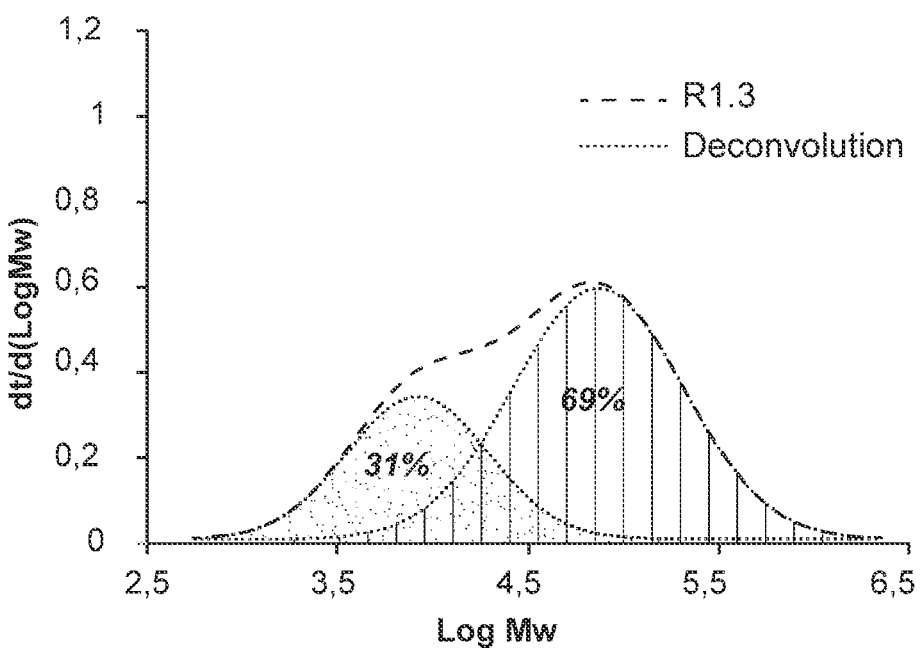
Figure 5E:
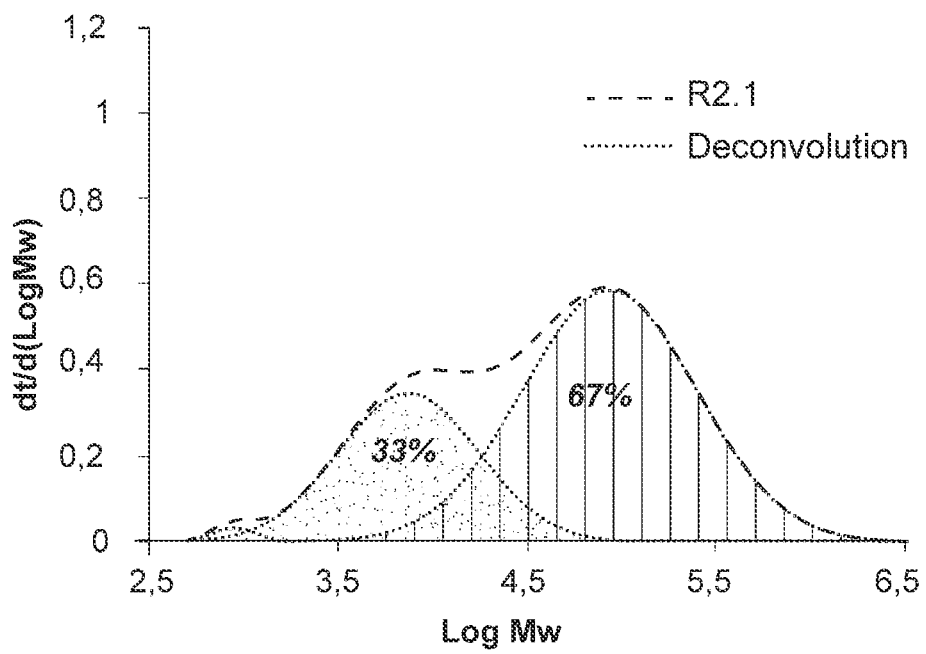
FIGS. 5E & 5F each show bimodal molecular mass distributions measured by SEC/RI of the fraction soluble in tetrahydrofuran of various graft copolymers (B) comprised by the inventive latices (i.e., polymeric compositions) according to yet another particular embodiment of the invention, including a respective deconvolution showing the two different modes (fractions) and their distribution maxima (peaks) as well as their respective proportions in percent (%)
Figure 5F:
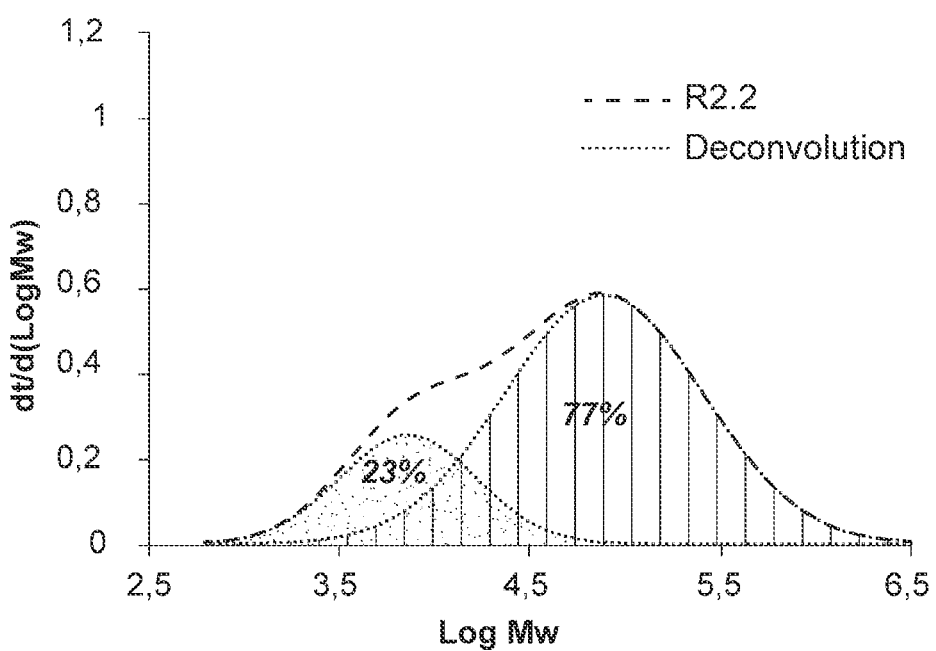

The in THF soluble molecular mass distributions of the synthesized latexes using ASR R1 and ASR R2 is shown in FIGS. 5A and 5B, wherein FIG. 5A shows the molecular mass distribution of the synthesized ASR R1 as well as of the PSAs R1.1, R1.2 and R1.3 each comprising R1 and FIG. 5B shows the molecular mass distribution of the synthesized ASR R2 and of the PSAs R2.1, R2.2. and R.23 each comprising R2. In this respect, FIGS. 5C, 5D, 5E and 5F each show bimodal molecular mass distributions measured by SEC/RI of the PSAs R1.2 (FIG. 5C), R1.3 (FIG. 5D), R2.1 (FIG. 5E) and R2.2 (FIG. 5F), including a respective deconvolution showing the two different modes (fractions) and their distribution maxima (peaks) as well as their respective proportions in percent (%).

The use of R1 leads to molecular mass distributions in which the ASR contributes to the soluble molecular mass significantly, concretely in the region ranging from 103 to 5-104 Da. This contribution is notable for the PSA R1.1 and it is reduced when 15 wt.-% IBOMA are also used (PSA R1.2). The incorporation of this methacrylate monomer leads to a decreasing of the gel content and, hence, to an increase of the soluble fraction of the polymer (see Table 6). This results in a lower contribution of the resin to the whole soluble molecular mass because a higher amount of longer soluble polymer chains with a molecular mass between $5*10^4$ and $10^6$ Da were present in the sol fraction. This contribution is even lower when a chain transfer agent is used (PSA R1.3) due to the lower gel content and, thus, the higher amount of soluble polymer chains.

Nevertheless, when the ASR R2 is employed, PSAs with similar width of the soluble molecular mass distributions and lower ASR contribution are obtained (see FIG. 5B). This is, without being bound to any theory, because of the presence of pendant double bonds, coming from the isosorbide dimethacrylate in ASR R2, which are able to promote grafting reactions between the ASR and the polymer chains produced in the second stage (b). The grafting with the ASR pendant double bonds results in a lower fraction of free ASR in the soluble polymer, that is, a smaller area under the curve in the corresponding region of the ASR molecular mass. It is worth pointing out that there is an increase of both the soluble molecular weight and the dispersity index for the PSAs containing RSA R2, which is, without being bound to any theory, likely because of this grafting process.

Rheological Properties

Linear rheological experiments are conducted on films produced from the polymeric composition resulting from the inventive method and shed light on the viscoelastic properties of these PSA films as well as the correlation of the viscoelastic properties and the chemical composition and the microstructure.

At this point it is important to remark that the PSAs comprising ASR R2, contain, aside from the methacrylic acid, free hydroxyl groups coming from ISOMA mono (from the monomethacrylic isosorbide). These free hydroxyl groups interact among themselves and/or with the free acid groups by hydrogen bonding.

Figure 10A:
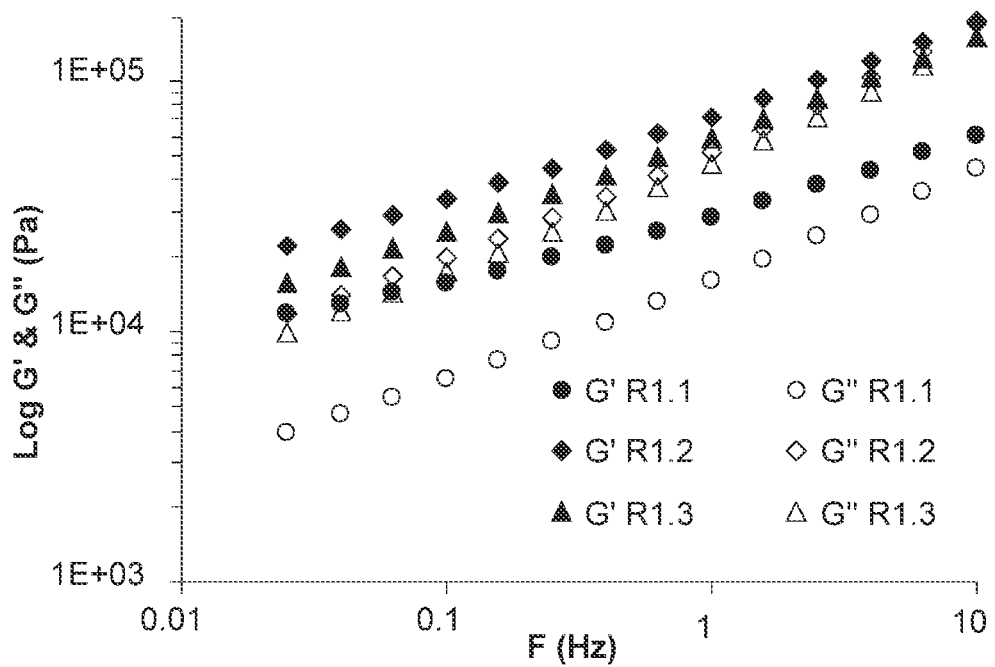
FIGS. 10A & 10B each show linear rheology curves (i.e., storage and loss moduli) measured at 23° C. of various latices (i.e., polymeric compositions) according to another particular embodiment of the invention.
Figure 10B:
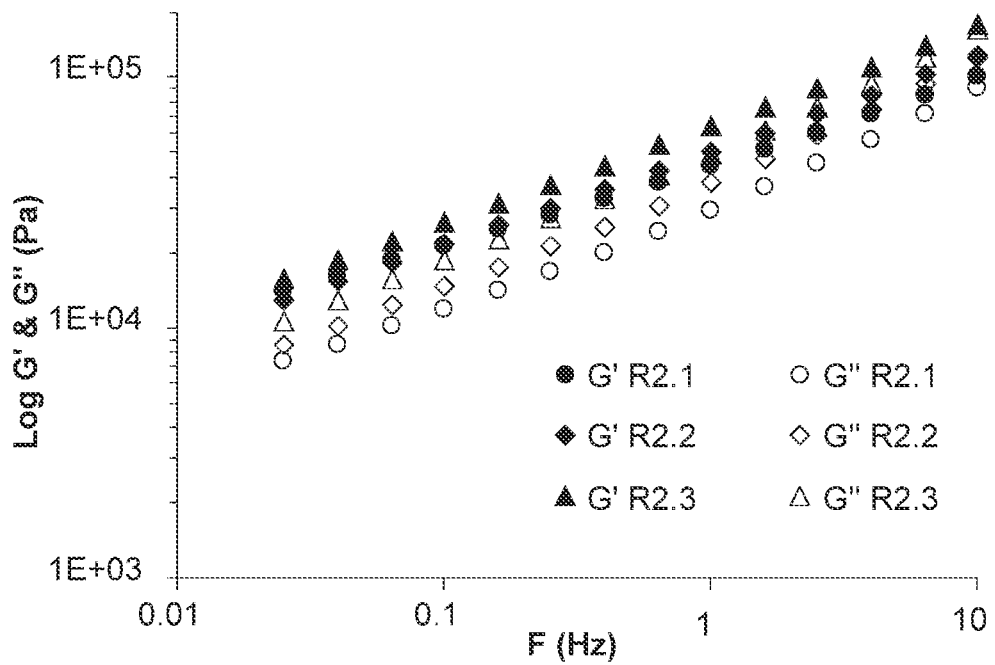

FIGS. 10A and 10B present the variation of storage modulus (G') and loss modulus (G") over a range of frequencies at 23° C. for the synthesized PSAs, respectively. For all PSA films, G' remains higher than G", which means a rheological response as a soft elastic solid before the transition regime (G'~G").

For the PSAs synthesized with ASR R1, PSA R1.2 has the highest storage modulus (G') since its microstructure (harder polymer with a substantial gel fraction) promotes the solid-like behavior and, thus, the enhancement of the energy storage. PSAs R1.1 and R1.3 have smaller G' and G" than PSA R1.2. PSA R1.3 only differs in the gel fraction (which is lower due to the CTA added the second stage (b)) and has lower G' and G" at low frequencies, but at high frequencies behaves very similarly to PSA R1.2 (i.e. R1.2 vs. R1.3). PSA R1.1 is defined by the softness of the OA polymeric structure and presents twice smaller G' and G" values than the other two PSAs R1.2 and R1.3 despite those having larger gel fractions.

For the PSA comprising ASR R2, differences in the G' and G" are not as pronounced as for the PSAs comprising ASR R1, likely because for all PSAs IBOMA is used as monomer (ii) in the second stage (b). Nevertheless, slightly higher values of G' (and more clearly higher values for G") are measured when ISOMA mono is used as monomer (ii) in the second stage (b) (R2.3). This can be linked to the formation of hydrogen bonding interactions, which reinforce the viscoelastic character of the polymer network improving elasticity, but also energy dissipation.

It is worth mentioning that the greater the hydrogen bonding density, the more the elastic nature prevails over the viscous nature. Complex viscosity (η*) is defined as a frequency-dependent viscosity, concretely as the difference between the dynamic viscosity and the imaginary out-of-phase viscosity. This rheological property represents the material's resistance to flow, which increases with the supramolecular interactions. In order to clarify whether supramolecular interactions affect the viscoelastic nature of the PSAs, complex viscosity is measured.

Figure 11A:
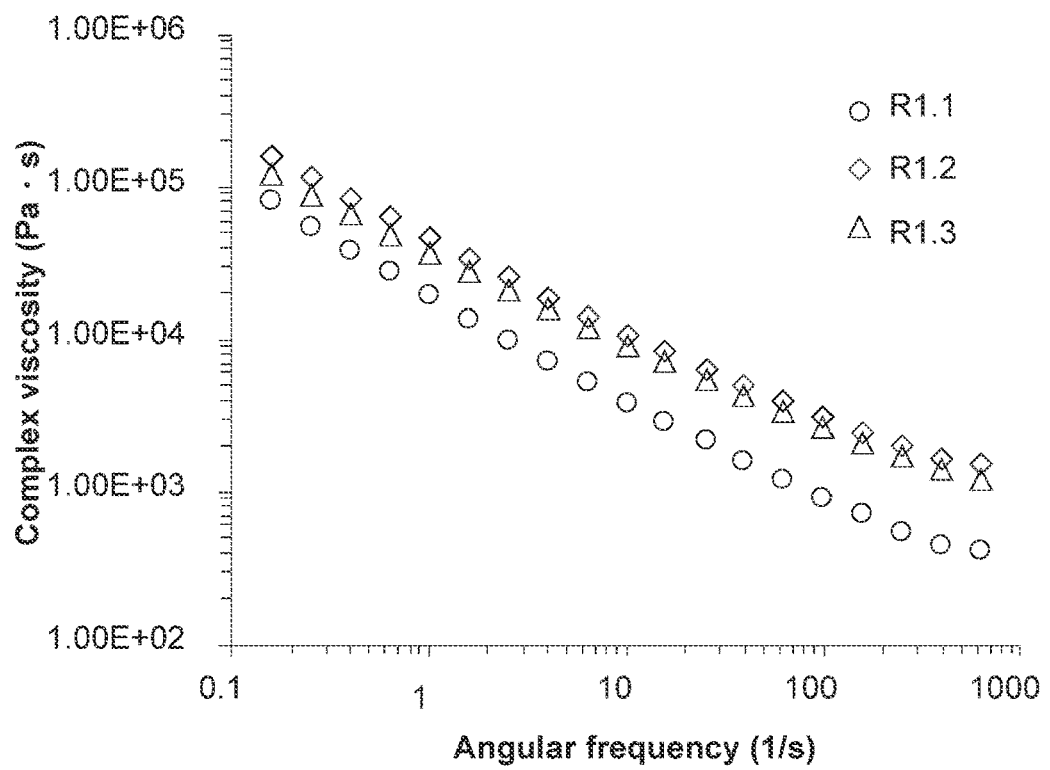
FIGS. 11A & 11B each show complex viscosity curves measured at 23° C. of various latices (i.e., polymeric compositions) according to a particular embodiment of the invention.
Figure 11B:
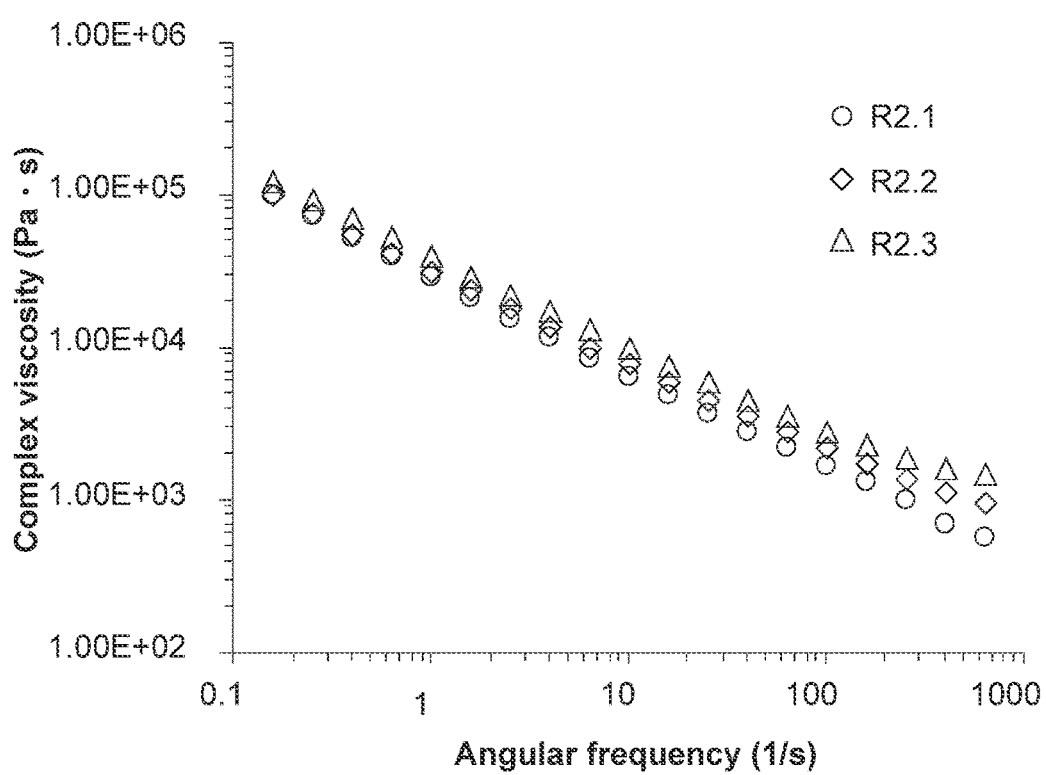

FIGS. 11A and 11B show the variation of the complex viscosity η* over a broader range of frequencies at 23° C. for both series of PSA formulations. An increase of η* from formulation R2.1 to formulation R2.2 is observed despite the gel content reduction in the latter (see FIG. 11B). In this respect, the increase in the chain mobility promotes the hydrogen bonding interaction and, thereby, the resistance of the material to flow. By using ISOMA mono in formulation R2.3 η* increases as a consequence of the higher hydrogen bonding density, thereby enhancing the elastic nature, while yielding similar gel contents as controlled by the CTA concentration. For PSAs comprising ASR R1 different characteristics are observed (see FIG. 11A), an increase of the complex viscosity is detected when IBOMA is used (R1.1 vs. R1.2). However, η* decreases when the gel content is reduced in formulation R1.3 because of the enhancement of the liquid-like behavior together with the lack of supramolecular interactions.

Figure 12A:
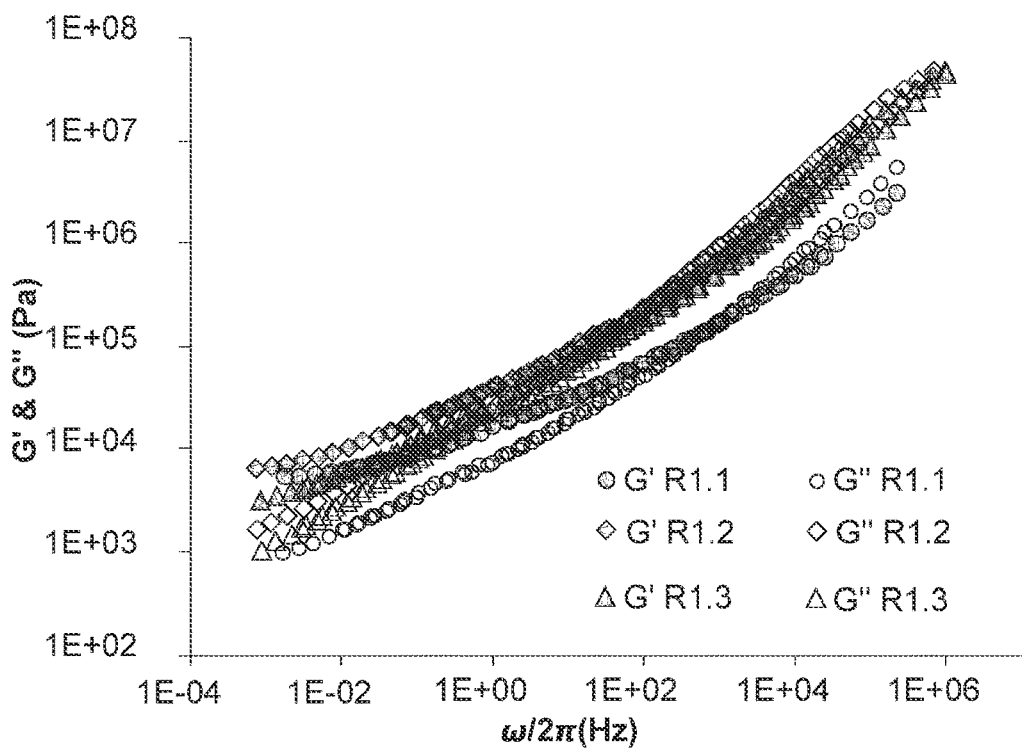
FIGS. 12A & 12B each show storage modulus G' and loss modulus G" curves (i.e., master curves) of various latices (i.e., polymeric compositions) according to another particular embodiment of the invention.
Figure 12B:
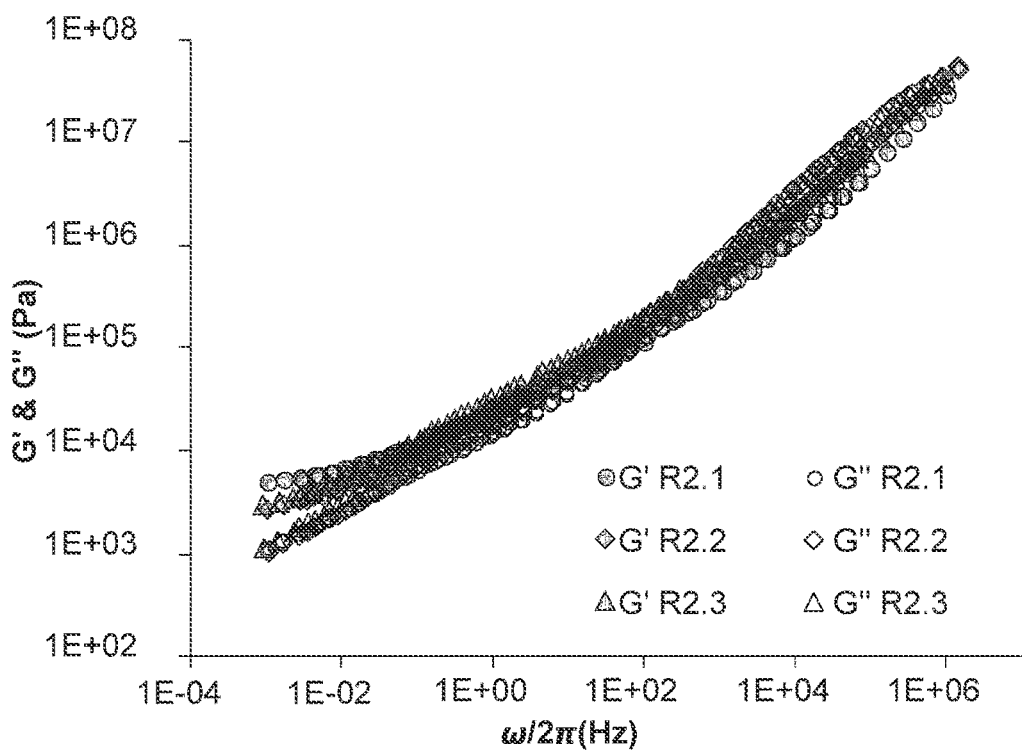

The formation of hydrogen bonds among polymer chains can also explain the lower differences found between G' and G" for PSA comprising ASR R2. Regarding this, intermolecular interactions provide a better stability for the polymer structure, namely, a better equilibrium between the solid-like and the liquid-like behavior of the PSA. Those differences are specially noticed at frequencies below the transition regime (G'~G"), becoming more pronounced in the solid regime (G'>>G") and having small differences along the dissipative regime (G'<G"). The construction of master curves using the time-temperature superposition (TTS) principle provides an effective vision of the PSA viscoelasticity over a wide range of frequencies. FIGS. 12A and 12B show the master curves for the PSAs at 23° C. as well as the value of the frequency at which the individual G' and G" graphs cross ($\omega_e$).

μm films. These adhesive films are prepared by casting the polymeric dispersion on a flame treated polyethylene terephthalate (PET) sheet (29 μm thick) using a stainless steel film applicator with a gap.

TABLE 7

Composition, peel, loop tack, work of adhesion (WA), shear and SAFT values of the synthesized PSAs

| PSA | composition of monomer pre-emulsion | peel [N/25 mm] | loop tack [N/25 mm] | WA [J/m$^2$] | shear [min] | SAFT [° C.] |
|---|---|---|---|---|---|---|
| R1.1 | OA (100) | 3.5 ± 0.8 | 3.1 ± 0.6 | 43 ± 6 | 393 ± 35 | 70 ± 1 |
| R1.2 | OA:IBOMA (85:15) | 6.6 ± 0.4 | 6.6 ± 0.1 | 132 ± 8 | 15047 ± 439 | 94 ± 1 |
| R1.3 | OA:IBOMA:CTA* (85:15) | 7.3 ± 0.8 | 6.2 ± 0.5 | 119 ± 15 | 1659 ± 73 | 82 ± 1 |
| R2.1 | OA:IBOMA (85:15) | 6 ± 0.5 | 5.1 ± 0.4 | 79 ± 2 | 5273 ± 40 | 100 ± 1 |
| R2.2 | OA:IBOMA:CTA* (85:15) | 6.9 ± 0.5 | 10 ± 1 | 179 ± 24 | 2137 ± 130 | 90 ± 1 |
| R2.3 | OA:IBOMA:ISOMA mono:CTA* (85:10:5) | 5.8 ± 0.4 | 5.4 ± 0.4 | 102 ± 5 | 4334 ± 180 | 85 ± 1 |

CTA*: 0.025 wt.-% of EHTG based on the monomer pre-emulsion

PSAs comprising ASR R1 lead to different master curves with a higher separation between G' and G" at the beginning of the solid regime. Those differences in the shape of TTS master curves are attributed to the change in the viscoelastic behavior when using IBOMA as monomer (ii) in the second stage (b). Nonetheless, superposed-like master curves having similar shape are obtained for PSAs comprising ASR R2. Moreover, slightly closer moduli values are observed when ISOMA mono is also used as monomer (ii) in the second stage (b) (R2.3).

The $\omega_e$ value sheds light on the correlation between the resin nature and the composition and its influence in the final viscoelasticity. The cross-over frequency occurs at lower frequencies (more elastic behavior) when IBOMA is used as monomer (ii) in the second stage (b) for the PSAs comprising ASR R1. The slight increase in the cross-point, $W_e$ (from 173 to 204 Hz) for R1.3 (as compared to R1.2) is likely because of the lower gel content that enhances polymer fluidity, which is in agreement with a more viscous-like material. Despite of the similarities in the TTS master curves of PSAs comprising ASR R2, a progressive reduction of $\omega_e$ is detected corroborating that supramolecular interactions influence the relaxation of molecular chains towards a more solid-like behavior. However, aside from this elastic component improvement, the dissipative properties of PSAs R2.2 and R2.3 are especially interesting for applications as high performance PSAs.

Figure 13A:
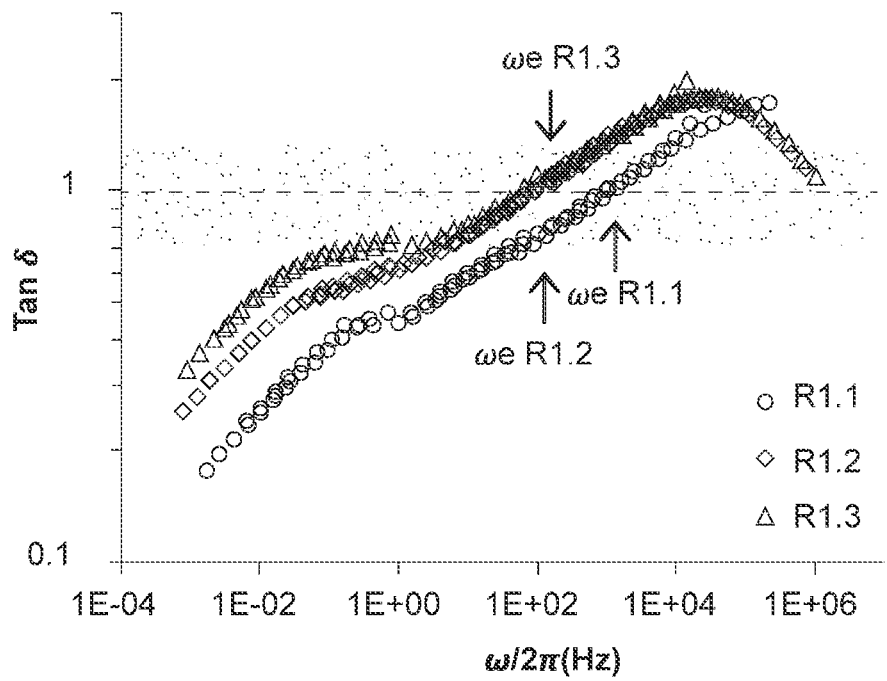
FIGS. 13A & 13B each show damping factor tan δ curves of various latices (i.e., polymeric compositions) according to a further particular embodiment of the invention.
Figure 13B:
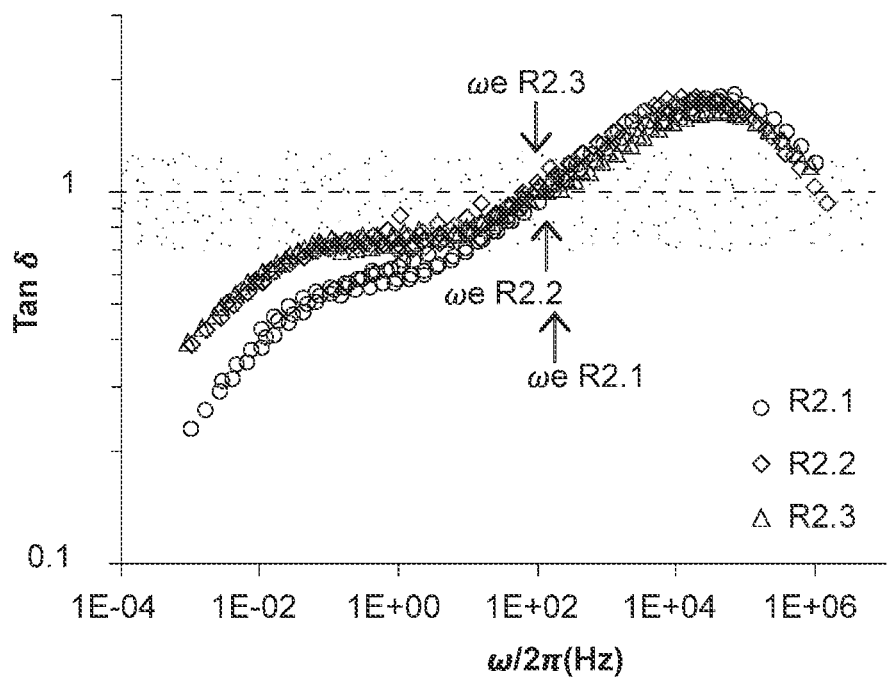

The damping factor (tan δ) of these PSAs (R2.2 and R2.3) is greater than 0.7 over four decades until it reaches the specific frequency $\omega_e$. This corroborates that hydrogen bonding interactions improves the adhesive dissipative behavior, but also extends the frequency range of these supramolecular interactions (see FIGS. 13A and 13B). Furthermore, tan S values nearly unite over broad frequency ranges indicating a good balance of the polymer network viscoelasticity.

Adhesive Properties

The adhesive properties of the synthesized PSAs are characterized using different methods. The peel, loop tack and probe tack tests are performed at 23±2° C. and 50±5% humidity. For all tests average values of four repeated measurements are shown in Table 7. 180° peel strength, loop tack, work of adhesion, shear and SAFT are measured with 15 μm films, whereas probe tack test are measured with 100

Figure 6:
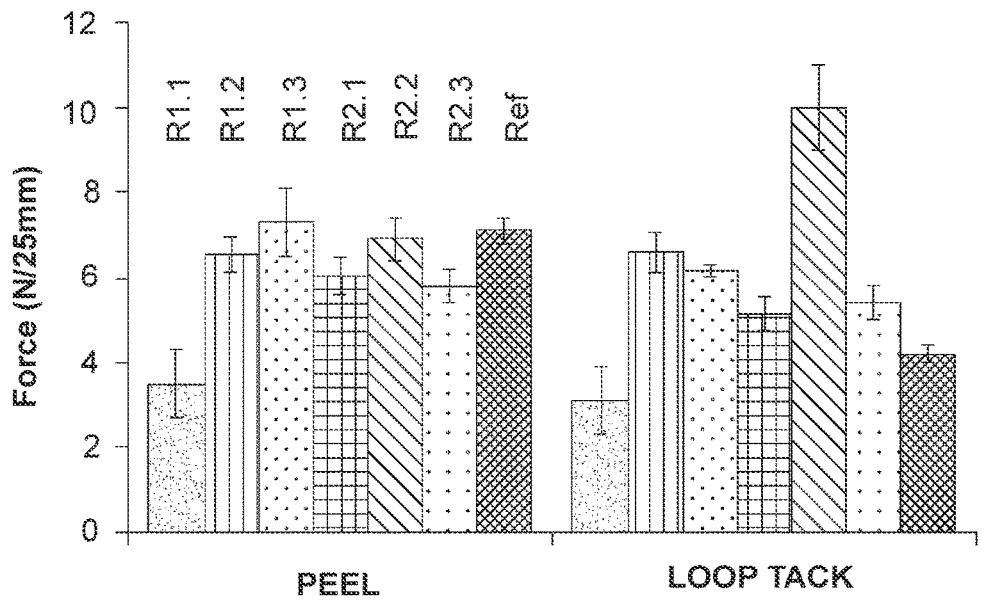
FIG. 6 shows peel and loop tack values (i.e., peel and loop tack forces) of various latices (i.e., polymeric compositions) according to yet another particular embodiment of the invention.

Loop tack tests are performed on a 25 mm wide stainless steel plate. 10 cm long PSA tape specimens with a width of 25 mm are attached in a loop to the upper grip of the equipment. The loop moves downward at a speed of 0.1 mm/sec until it is brought in full contact with the stainless steel plate (25 mm×25 mm). It is left in contact with the stainless steel plate for 0.1 sec before moving upward at a speed of 0.055 mm/sec. The force required to peel off the loop is measured. The relative work of adhesion (WA) is calculated through integration of the loop tack curves. The curves for loop tack and peel are illustrated in FIG. 6.

Figures 7, 8:
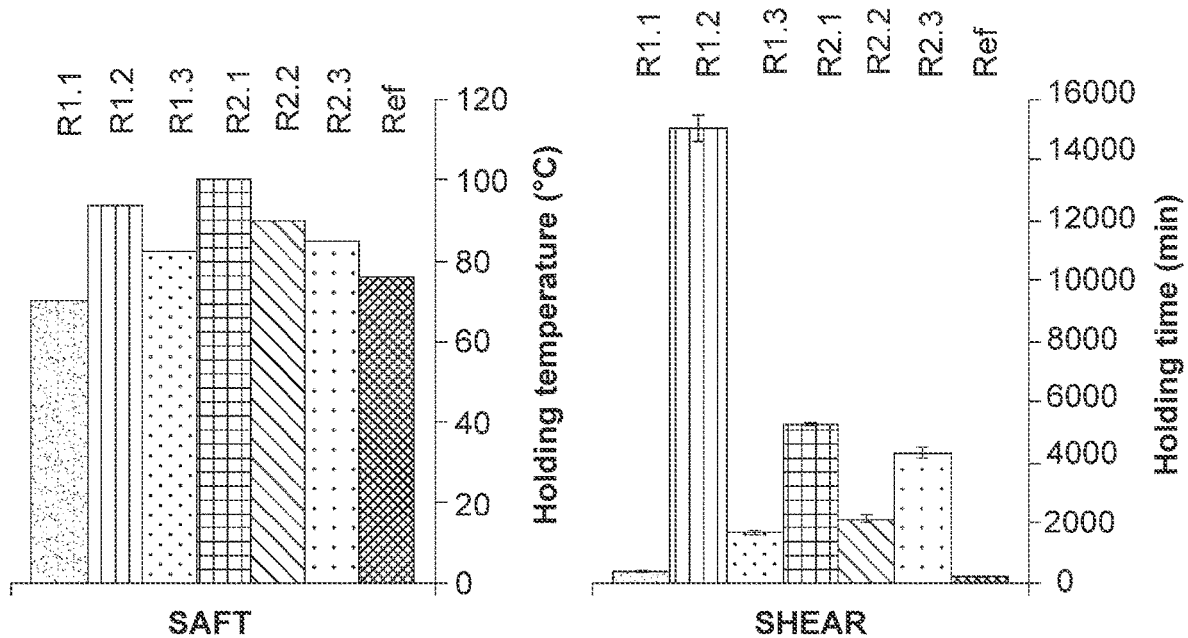
FIG. 7 shows SAFT values of various latices (i.e., polymeric compositions) according to another particular embodiment of the invention.
FIG. 8 shows shear values of various latices (i.e., polymeric compositions) according to a further particular embodiment of the invention.

Shear tests are performed on stainless steel panels using Shear/SAFT equipment (Cheminstruments, model SS-HT-8). The PSA tape specimens are applied to the panel with a contact area of 25 mm×25 mm and pressed four times with a 1 kg rubber-coated roller. The tapes applied are allowed to dwell for 10 min, the free ends of the tapes are attached to a mass of 1000 g. The test panel (with the applied tapes) is held by the test stand at an angle of about 1° relative to the vertical. The time to failure, i.e., the time from the attachment of the mass until the complete separation of the tape from the test panel, is recorded. The test is performed at a temperature of 23° C. SAFT tests are prepared similarly as shear tests, however, once the weights are placed, the temperature is increased from 23° C. to 200° C. at a rate of 1° C./min and the temperature of failure is reported. The respective curves of the SAFT values are illustrated in FIG. 7 and the curves of the shear values are illustrated in FIG. 8.

Independently of the type of ASR used, the use of IBOMA as a monomer in the second stage (b) is advantageous because it enhances the cohesiveness among the polymer chains during the (de)bonding process and ensures adhesive failure instead of cohesive failure. In comparison, the high liquid-like behavior of formulation R1.1 (Tg=−43° C.), which is mainly composed of OA, together with a very high gel content results in poor adhesive properties.

The composition of the ASR plays an important role in the polymer microstructure of the final PSA (i.e. graft copolymer (B)) and, thereby, in the material adhesion performance. In order to understand the role of the ASR, in the following, PSAs with the same monomer compositions used in the second stage (b), but having different ASRs are compared (i.e. R1.2 vs. R2.1 and R1.3 vs. R2.2).

Comparison of R1.2 and R2.1: Although formulation R1.2 triples the shear resistance values of formulation R2.1

(see FIG. 8) because of its higher gel content, it also shows greater adhesiveness, namely higher loop tack values and work of adhesion values (see FIG. 6). This can be explained by the higher amount of free ASR present in formulation R1.2 compared to R2.1 (see molecular mass distribution in FIG. 5A) which favors instantaneous adhesion.

Comparison of R1.3 and R2.2: The addition of CTA controls the formation of the gel polymer and, therefore, similar molecular masses (i.e. molecular masses of a fraction soluble in tetrahydrofuran) are obtained. Nonetheless, greater values of loop tack, work of adhesion, shear resistance and SAFT are detected for R2.2, which is, without being bound to any theory, due to the formation of OH···OH and C=O···HO hydrogen bonds among the polymer chains which have a better mobility and interact with each other because of the reduction of the crosslinking density. These supramolecular interactions form a reversible physical network which reinforces the polymer matrix but also allows molecular motion and, thus, improves the adhesion strength. The dynamic network enhances the initial adhesion and the energy release during the detachment process as well as the solid-like behavior of the material, which increases when the hydrogen bonds density is higher. This is the case for PSA R2.3, in which the incorporation of 5 wt.-% of ISOMA provides a twice greater shear resistance value than for PSA R2.2 because of the increase of the adhesive elasticity, which also reduces peel strength and loop tack.

The effectiveness of the hydrogen bond interactions in PSAs R2.1 and R2.2 is a result of the grafting capability of the ASR (i.e. ASR R2 contains free carbon-carbon double bonds). This covalent incorporation leads to longer polymer chains with pendant carboxylic and hydroxyl groups suitable for the adhesion and cohesion, being the last property more remarkable in formulation R2.3.

Figure 9A:
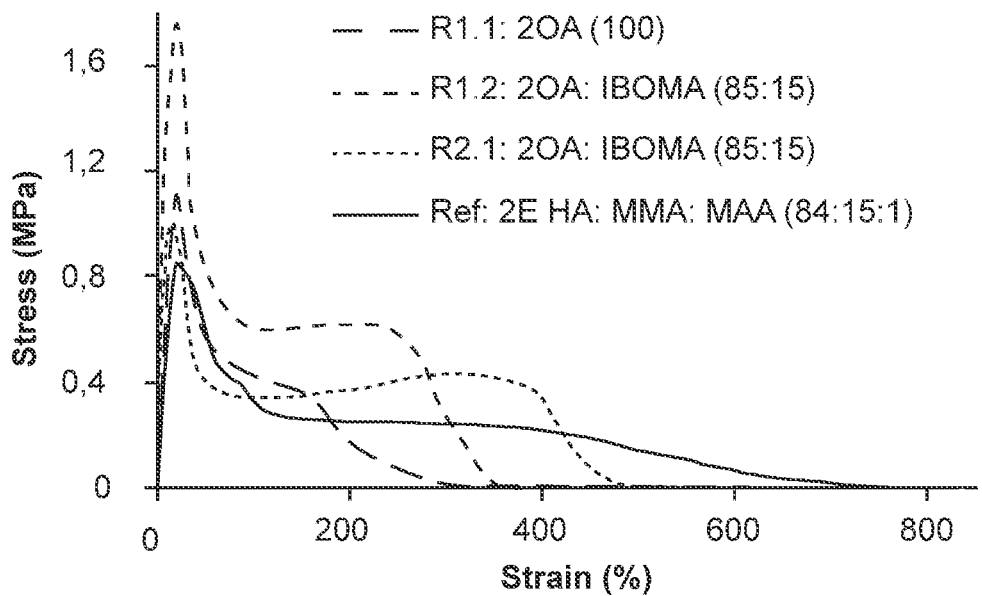
FIGS. 9A & 9B each show probe tack values of various latices (i.e., polymeric compositions) and the respective stress strain curves according to yet another particular embodiment of the invention.
Figure 9B:
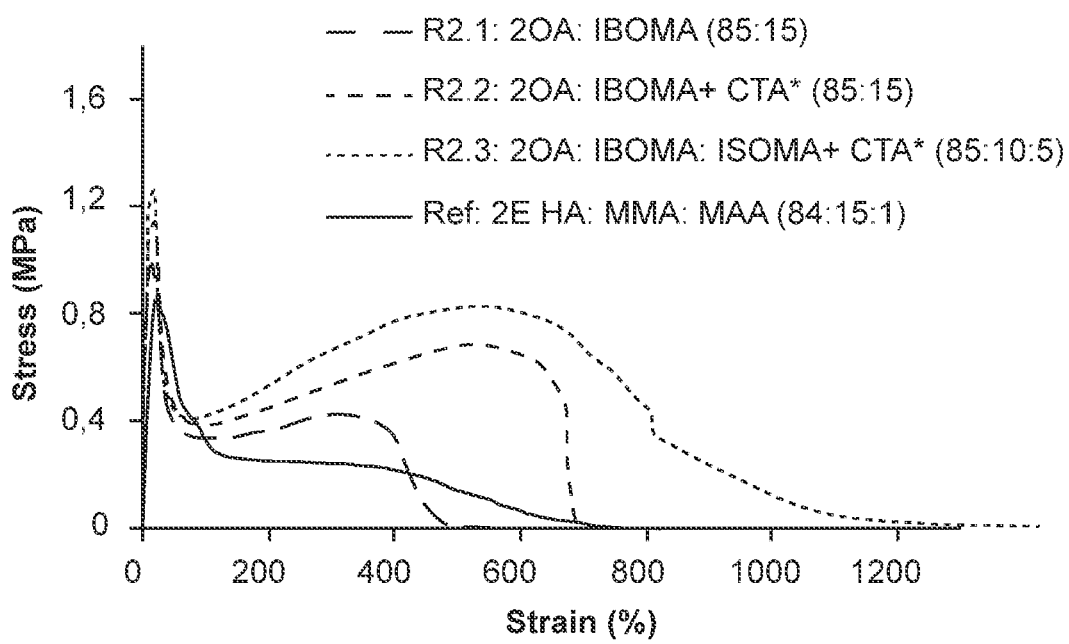

Probe tack tests are a useful tool to further understand how supramolecular interactions and viscoelastic nature of a PSA effect the final performance. FIGS. 9A and 9B show the stress-strain curves for the synthesized PSAs using ASR R1 (FIG. 9A) or ASR R2 (FIG. 9B). As mentioned hereinbefore, the use of IBOMA in the second stage (b) strengthens the cohesiveness of the PSA. This is also reflected during the detachment process of PSA R1.2, showing a broad stress peak above 1.7 MPa followed by a lower propagation rate of the cracks along the fibrillation process, which yields a higher elongation at break than PSA R1.1. For PSA R1.3, which has a lower gel content, longer but weaker adhesive fibrils are observed as consequence of the enhancement of the viscous component.

On the other hand, it is remarkable the shapes of the stress-strain curves obtained for PSAs comprising ASR R2: a constant increase of the stress during the fibrillation (after the relaxation process) up to large strain values are observed which can be considered as a reinforcement of the material fibers. This behavior is more prominent when the concentration of moieties derived from ISOMA increases in the PSA (especially PSA R2.3). Strain values also increases when the viscoelasticity of the adhesive increases while the same concentration of moieties derived from ISOMA (R2.2 vs. R2.1) is present. This kind of behavior is due to the interfacial contributions of supramolecular bonds among the molecular chains, concretely to those interactions within the cavity walls.

Finally, a sharp decrease of the nominal stress at the maximum strain value is observed for PSAs R2.1 and R2.2, indicating a total breakage of the adhesive fibrils and, hence, a fast energy release. Nevertheless, in PSA R2.3 the stress decreases progressively from 700% to 800% strain, dropping to 0.35 MPa and later reaching a larger strain value without leaving any noticeable adhesive residue on the probe. In this case no total breakage of the fibrils occurs, but those residual ones continue to stretch.

These results are in agreement with the rheological properties discussed hereinabove. The promotion of hydrogen bonding formation improves both storage and dissipative energy properties (enhancement of G' and G" and η*), also reflected in higher and longer shoulder-like shapes of the probe tack curves.

Hydrogen Bonding Properties

Fourier-transform infrared spectroscopy (VT-FTIR) is a useful technique to investigate the hydrogen bonding and debonding in a physical polymer network with varying temperatures. Variable temperature Fourier-transform infrared spectroscopy (VT-FTIR) is performed in a spectrometer Nicolet 6700 FTIR (transmission mode) using a heating cell Specac. For the sample preparation, few drops of latex were dried over a KBr tablet at room temperature.

It is important to mention that very low intensity O—H stretching band near 3500 $cm^{-1}$ is detected, while not observing any noticeable shift towards high frequencies as the temperature is increased. Moreover, the wavenumber of the C=O stretching vibration band remains constant at 1730 $cm^{-1}$ meaning that the most carbonyl groups do not suffer hydrogen bond association and, therefore, no shifting can be observed. However, the absorption band at 1082 $cm^{-1}$ corresponding to the C—O stretching of secondary alcohol shifts to 1090 $cm^{-1}$, showing the appearance of a shoulder above 120° C. due to the C—O bond reinforcement after the hydrogen debonding. This absorption band cannot be observed in FTIR absorbance spectra of composition R1.3 because of the absence of alcohol groups. Although slight differences can be found among the VT-FTIR spectra, moieties derived from isosorbide provide those secondary alcohols and, therefore, contribute for a greater extent to the hydrogen bonding formation. At this point, it could be hypothesized that those hydroxyl groups mainly interact with the carbonyl groups, which did not show any noticeable shift because of the high free number of this carbonyl species.

Removability Study

Figure 14A:
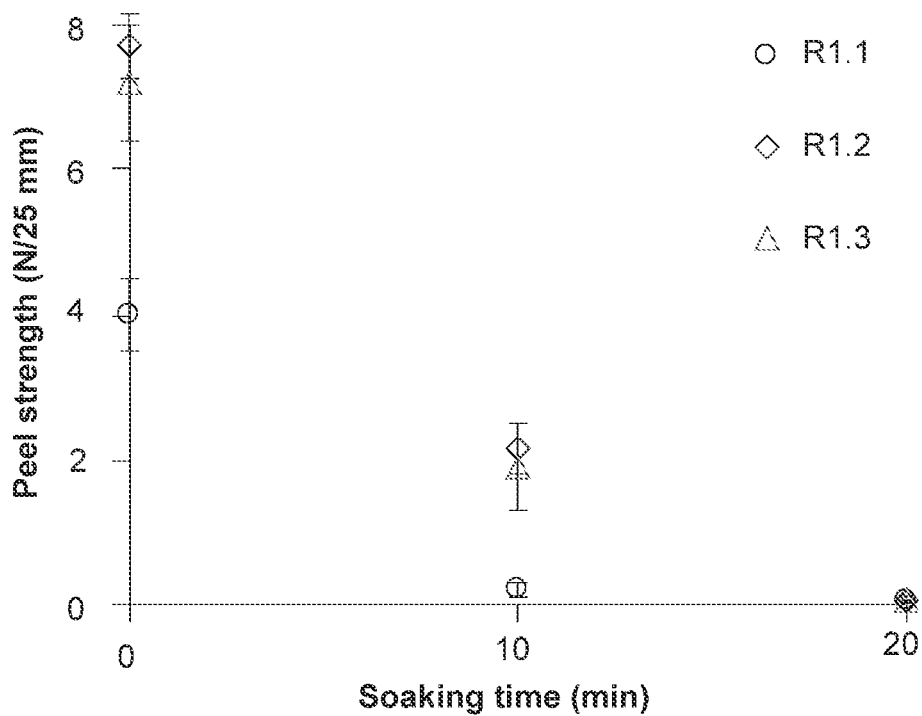
FIGS. 14A & 14B each show 180° peel values of various latices (i.e., polymeric compositions) upon exposure to water at different soaking times according to yet another particular embodiment of the invention.
Figure 14B:
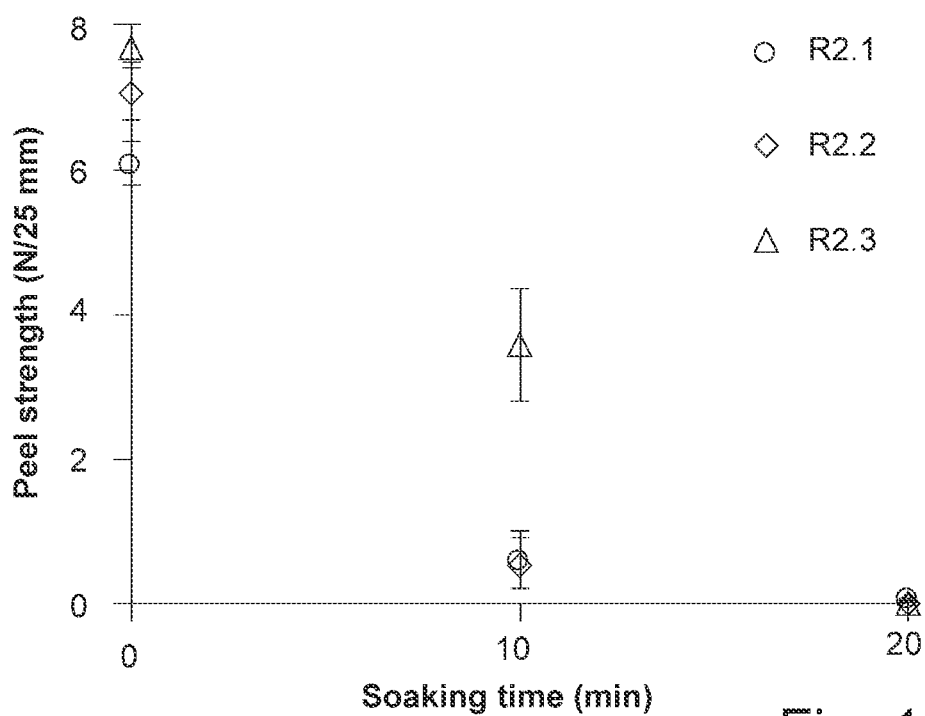

For the removability study, the films are immersed in an alkaline solution with a temperature of 23° C. 180° peel test are carried out using glass substrates, the respective results are illustrated in FIGS. 14A and 14B. Adhesive tapes with a width of 25 mm are attached to the substrate and pressed four times with a 2 kg rubber-coated roller and are then submerged into an aqueous alkaline medium, using an ammonium hydroxide solution with a pH of 10 using a static soaking procedure. The force needed to detach the adhesive tape with a crosshead speed of 5 mm/sec from the substrate is measured at different soaking times. For all tests average values for peeling 6 cm of the tape specimens of four repeated measurements are reported before and after submerging in water in the following. In FIGS. 14A and 14B the 180° peel values after being submerged in water for 10 min and 20 min are displayed.

Figure 17:
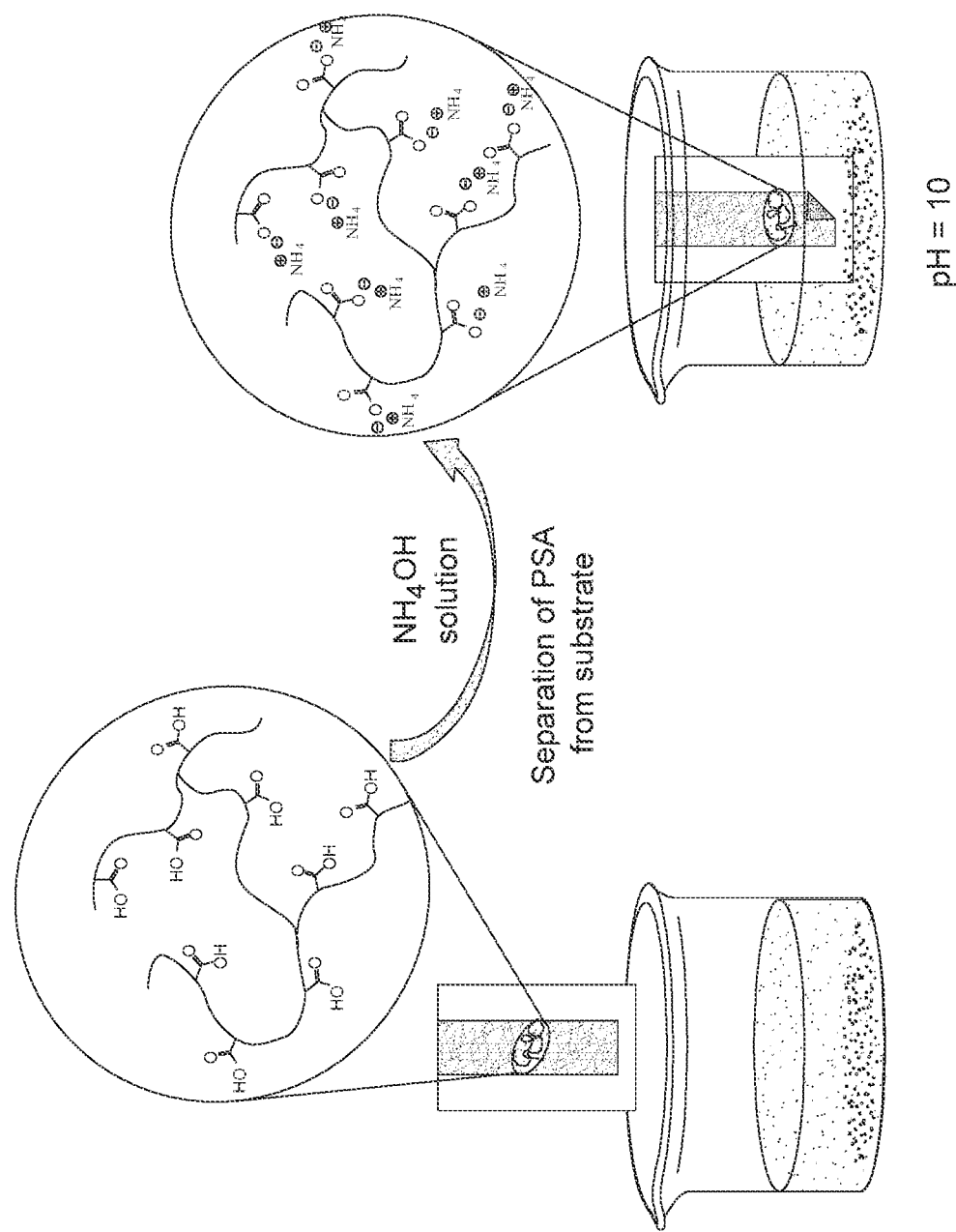
FIG. 17 shows a scheme of removing, from a substrate, an adhesive PSA film or tape comprising or formed by an inventive polymeric composition and/or by an inventive graft copolymer (B), respectively, via exposure to a $NH_4OH$ solution (e.g. by emersion into said solution), including a potential molecular mechanism of action, according to a further particular embodiment of the present invention.

The PSAs contain a large number of carboxylic acid groups (both ASR R1 and R2 contain acid groups) that allow their reaction with $NH_4^+$-ions in alkaline solution and form the corresponding salt. As result of this reaction the adhesion of the tape to the substrate is weakened and hence the adhesive tape can be easily detached (a scheme of the removal of an adhesive tape and the ionization of the free carboxylic acid groups during the process is illustrated in FIG. 17). All PSAs show a similar trend, getting a complete separation before 20 min of soaking not leaving any residue of adhesive on the glass surface. Surprisingly, PSA R2.3 has a higher peel strength value than the other PSAs at 10 min of soaking. This can be attributed to the greater quantity of ISOMA mono in the formulation, which provides a stronger interaction with the glass and, hence, reinforces the adhesive strength.

Adherence in High Humidity

In order to determine the influence of humidity on the final performance of the PSA, adhesives tapes are attached to glass panels and placed into a humidity chamber at 25° C. with 100% relative humidity for 24 h. Subsequently peel strength is measured. The humidity treatment does not influence the adhesiveness and, in addition, no whitening of the PSA tape is observed. Thus, the inventive PSAs are resistant to humidity; i.e. the adhesiveness is not influenced by environments with high humidity.

Summary

A novel approach to obtain waterborne removable PSAs and thus a possibility to face the major issue of removing labels, coatings, tapes etc. without leaving any residues is presented in this application and supported by the above described examples.

Bio-based alkali soluble resins (ASRs) and its use as a seed, a stabilizer and an emulsifier in emulsion polymerization aiming to obtain high performance and easily removable PSAs is presented. The influence of the ASR nature is evaluated and compared in terms of polymer microstructure and adhesive properties. The use of ISOMA mix in the ASR composition provides pendant double bonds to the structure and, thereby, allows grafting of the ASR to the copolymer produced the second stage (b) of the inventive method. This results in a remarkable effect in the molecular mass distribution of the final polymer (i.e. the distribution of the molecular mass of the fraction soluble in THF). In addition, supramolecular interactions associated with the moieties derived from isosorbide enhance the mechanical properties of the PSAs, which increase as the hydrogen bonding density does. This adhesive behavior is understood and supported by the rheological assessment of the PSAs and by VT-FTIR studies, which allow to link the hydrogen bonds formation with the viscoelastic behavior.

Furthermore, the grafting capability of the ASR comprising ISOMA mix together with the existence of a physical crosslinking (due to supramolecular interactions) provides a good relationship between adhesion and cohesion, namely, a good balance of the polymer network viscoelasticity. Finally, removability studies in alkaline solution of the PSA tapes show the complete detachment in less than 20 min in an aqueous solution with a pH of 10.

Consequently, high performance adhesive formulations ready to be industrially implemented in consumer goods and suitable for their subsequent recycling process are obtained.

Synthesis of Selected Inventive Starting Materials, Especially Monomer/Moiety (ii)

The synthesis—according to a preferred embodiment of the present invention—of a mixture comprising a monofunctional monomer and a difunctional monomer derived from isosorbide comprising at least one substituent comprising one ethylenically unsaturated bond (carbon-carbon double bond) is illustrated by the following scheme:

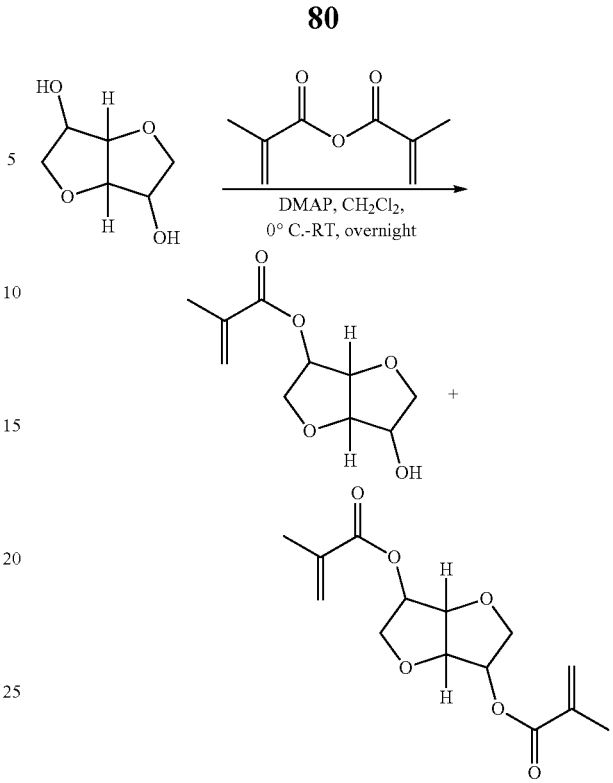

This mixture is synthesized by esterification using 4-dimethyl aminopyridine (DMAP) as a catalyst in dichloromethane (DCM or $CH_2Cl_2$) under nitrogen atmosphere.

The reaction is carried out in a 500 mL round bottom flask equipped with magnetic stirrer and dropping funnel. Isosorbide and methacrylic anhydride are employed in a stoichiometric ratio (isosorbide/methacrylic anhydride) between 1.8/1 and 1.3/1. Between 1% and 4%, preferably between 1.5% and 2.5%, depending on the stoichiometric ratio, of isosorbide and 4-dimethyl aminopyridine are partially dissolved in 250 mL of dichloromethane by stirring at room temperature for 10 to 40 min (preferably for 20 to 30 min) at a rate of 500 rpm. Then the reaction solution is cooled down to 0° C. and methacrylic anhydride is added dropwise for a time between 30 and 90 min (preferably between 50 and 70 min). Subsequently, the reaction solution is stirred overnight. The resulting yellowish solution is quenched with $NaHCO_3$ solution (1 M, 100 mL) and then extracted with $NaHCO_3$ solution (1 M, 2×50 mL), distilled water (3×50 mL) and washed with concentrated NaCl solution (3×50 mL). The combined organic layers are dried over $MgSO_4$, filtered and evaporated under reduced pressure yielding a yellowish oil (yield: 56%), which is the mixture of both monomethacrylic isosorbide and dimethacrylic isosorbide (ISOMA mix) in a molar ratio of monomethacrylic isosorbide:dimethacrylic isosorbide of between 9:1 and 7:3, more preferably of 8:2.

If desired the mixture can be separated by column chromatography ($SiO_2$) using e.g. a mixture of hexane and ethyl acetate (6:4) as eluent to obtain the monomethacrylic isosorbide and the dimethacrylic isosorbide as individual fractions. The purification allows to first separate the dimethacrylic isosorbide and then the monomethacrylic isosorbide (ISOMA mono), which is a colorless oil and is obtained with a final yield of 35%.

The structures are confirmed by the corresponding $^1$H-NMRs of the mixture, of the dimethacrylic isosorbide and of the monomethacrylic isosorbide, wherein the monomethacrylic isosorbide is mainly synthesized as the endo-isomer; without being bound to any theory, probably due to the use of 4-dimethyl aminopyridine as a catalyst which promotes the electrophilicity of the carbonyl group of the anhydride and thus the esterification of the endo-alcohol. The endo-isomer of the monomethacrylic isosorbide is represented by the following formula:

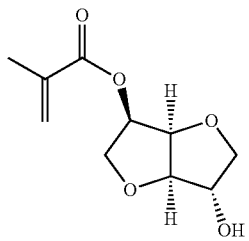

Small signals are detected around 5.7 ppm and 6.3 ppm in all $^1$H-NMRs, corresponding to the formation, in a small quantity, of the exo-isomer which is also formed, however in a very low proportion (<1%).

The above IBOMA is synthesized accordingly.

The invention claimed is:

1. A method for producing a polymeric composition,
wherein the method comprises a two-stage emulsion polymerization process,
wherein:
(a) in a first stage (a), a copolymerization of monomers (i), (ii) and (iii) is performed via emulsion polymerization, wherein
  (i) monomer (i) comprises at least one ethylenically unsaturated monomer, a homopolymer which has a glass transition temperature $Tg^{(i)}$ ranging from −100° C. to −10° C.,
  (ii) monomer (ii) comprises at least one mono- or difunctional bicyclic monomer comprising at least one substituent comprising one ethylenically unsaturated bond wherein the at least one mono- or difunctional bicyclic monomer is derived from isosorbide or from (iso) borneol,
  (iii) monomer (iii) comprises at least one ethylenically unsaturated carboxylic acid,
so as to produce a first copolymer (A) which comprises moieties (i), (ii) and (iii) each as defined hereinabove and contains free carboxylic groups —C(O)—OH, followed by a conversion of the free carboxylic groups into carboxylate groups —C(O)—O$^-$,
wherein, in the first stage (a), the monomers (moieties) (i), (ii) and (iii) are used in a (i)/(ii)/(iii)-weight ratio of (30-93)/(2-25)/(5-45),
wherein the first stage (a) is performed until a weight-average molecular mass $M_w$ of the first copolymer (A) in a range of from 2,000 to 50,000 Daltons has been reached, as determined by size exclusion chromatography in accordance with DIN EN ISO 16014-5:2019 and measured with a fraction soluble in tetrahydrofuran,
wherein the first stage (a) is performed such as to produce the first copolymer (A) which has an acid value AV as determined before the conversion of the free carboxylic groups into carboxylate groups in a range of from 75 to 140 mg KOH/g, as determined by titration in accordance with ASTM D664;
subsequently
(b) in a second stage (b), a copolymerization of monomers (i) and (ii) is performed via emulsion polymerization in the presence of the carboxylate groups containing first copolymer (A) obtained from stage (a),
wherein monomers (i) and (ii) correspond each to the above definitions, however, with the proviso that monomers (i) and (ii) used in the second stage (b) may be the same as or different from those used in the first stage (a),
so as to produce a graft copolymer (B) comprising a copolymeric structure of moieties (i) and (ii) obtained from the second stage (b) copolymerization and which is covalently bonded with the first copolymer (A) via grafting.

2. The method according to claim 1,
wherein the polymeric composition is in the form of a water-based dispersion.

3. The method according to claim 1,
wherein emulsion polymerization in the first stage (a) and in the second stage (b) is each performed as a radical emulsion polymerization.

4. The method according to claim 1,
wherein the first copolymer (A) is a random copolymer and wherein moieties (i), (ii) and (iii) in the first copolymer (A) are present in random distribution; and
wherein the graft copolymer (B) is a random graft copolymer and wherein, in graft copolymer (B), moieties (i), (ii) and (iii) are present in random distribution.

5. The method according to claim 1,
wherein, in the first stage (a), the monomers (i), (ii) and (iii) are used in a (i)/(ii)/(iii)-weight ratio of (40-91)/(3-20)/(6-40); and
wherein the first stage (a) is performed out until a weight-average molecular mass $M_w$ of the first copolymer (A) in a range of from 5,000 to 25,000 Da has been reached.

6. The method according to claim 1,
wherein the first stage (a) is performed until a particle diameter in a range of from 40 nm to 200 nm has been reached, as determined by light scattering in accordance with ISO 22412:2017; and
wherein the first stage (a) is performed until a solids content, based on a total weight of the first copolymer (A) resulting from stage (a), in a range of from 1 to 50% by weight has been reached.

7. The method according to claim 1,
wherein, in the second stage (b), the monomers (i) and (ii), on the one hand, and the carboxylate groups containing first copolymer (A), on the other hand, are used in a (A)/[(i)+(ii)]-weight ratio of (1-50)/(50-99).

8. The method according to claim 1,
wherein, in the second stage (b), the monomers (i) and (ii) as well as the carboxylate groups containing first copolymer (A) are used in a (i)/(ii)/(A)-weight ratio of (35-90)/(2-28)/(8-37).

9. The method according to claim 1,
wherein the second stage (b) is performed until a weight-average molecular mass $M_w$ of the graft copolymer (B) in a range of from 30,000 to 1,000,000 Da has been reached, as determined by size exclusion chromatography in accordance with DIN EN ISO 16014-5:2019 and measured with a fraction soluble in tetrahydrofuran.

10. The method according to claim 1,
the second stage (b) is performed until a particle diameter in a range of from 140 nm to 300 nm has been reached, as determined by light scattering in accordance with ISO 22412:2017; and
wherein the second stage (b) is performed until a solids content, based on a total weight of the graft copolymer (B) resulting from stage (b), in a range of from 20 to 75% by weight has been reached.

11. The method according to claim 1,
wherein monomer (ii) is selected from mono- or difunctional bicyclic monomers of formulae (1a), (1b) and (1c) as well as combinations thereof:

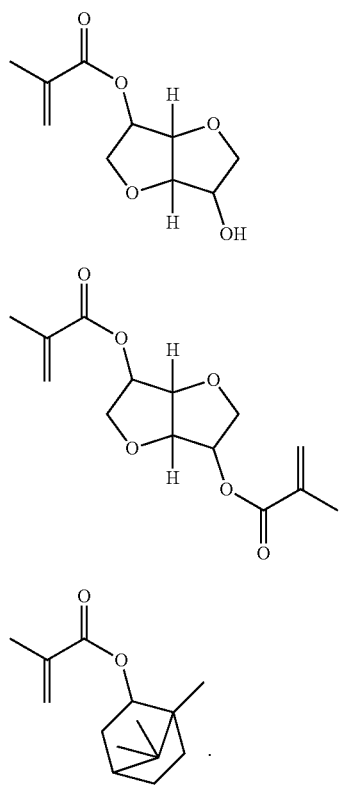

12. The method according to claim 11,
wherein monomer (ii) is selected with the proviso that monomer (ii) comprises at least one difunctional bicyclic monomer of formula (1b) and with the proviso that, as monomer (ii), at least one difunctional bicyclic monomer of formula (1b) is used only in one of stages (a) and (b).

13. The method according to claim 11,
wherein the at least one difunctional bicyclic monomer of formula (1b) is used in combination with at least one other monomer (ii) being different therefrom and being at least one monofunctional bicyclic monomer of formula (1a) or (1c).

14. The method according to claim 1,
wherein monomer (iii) is selected from monoethylenically unsaturated mono- and dicarboxylic acids having 3 to 6 carbon atoms and combinations thereof.

15. The method according to claim 1,
wherein monomer (iii) corresponds to the following general formula (2):

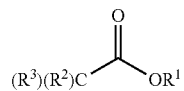

wherein in general formula (2)
$R^1$ represents hydrogen, an organic rest selected among a linear, branched or cyclic hydrocarbon rest, which may comprise at least one heteroatom, or a rest HO—C(O)—CH$_2$—CH$_3$—; and
$R^2$ represents hydrogen, an organic rest selected among a linear, branched or cyclic hydrocarbon rest, which may comprise at least one heteroatom, methyl, ethyl, propyl, or a rest HO—C(O)—CH$_2$—; and
$R^3$ represents an organic rest selected among a linear, branched or cyclic hydrocarbon rest, which may comprise at least one heteroatom, or a rest CH$_2$=, CH$_3$—CH=, or HO—C(O)—CH=.

16. The method according to claim 1,
wherein monomer (iii) is selected from the group consisting of monoethylenically unsaturated monocarboxylic acids, monoethylenically unsaturated dicarboxylic acids and combinations thereof.

17. The method according to claim 1,
wherein monomer (iii) is selected from the group consisting of acrylic acid, methacrylic acid, crotonic acid, 2-ethylpropenonic acid, 2-propylpropenonic acid, 2-acryloxyacetic acid, 2-methacryloxyacetic acid, itaconic acid, fumaric acid, maleic acid and combinations thereof.

18. The method according to claim 1,
wherein monomer (i) comprises er is one of 2-octylacrylate, n-butylacrylate, 2-ethylhexylacrylate and combinations thereof; and
wherein monomer (ii) is selected from mono- or difunctional bicyclic monomers derived from isosorbide or from (iso) borneol; and
wherein monomer (iii) is selected from the group consisting of monoethylenically unsaturated monocarboxylic acids, monoethylenically unsaturated dicarboxylic acids, acrylic acid, methacrylic acid, crotonic acid, 2-ethylpropenonic acid, 2-propylpropenonic acid, 2-acryloxyacetic acid, 2-methacryloxyacetic acid, itaconic acid, fumaric acid, maleic acid and combinations thereof.

19. The method according to claim 1,
wherein in at least one of stages (a) and (b) copolymerization is performed in the presence of an additional monomer (iv), which additional monomer (iv) is an ethylenically unsaturated monomer the homopolymer of which has a glass transition temperature $Tg^{(iv)}$ ranging from 30° C. to 200° C.

20. The method according to claim 1,
wherein in at least one of stages (a) and (b) copolymerization is performed in the presence of an additional monomer (iv), which additional monomer (iv) comprises one of benzylmethacrylate, benzylacrylate, tert-butylmethacrylate, tert-butylacrylate, cyclohexylmethacrylate, ethylmethacrylate, isobornylmethacrylate, isobornylacrylate, isobutylmethacrylate, isopropylmethacrylate, methylmethacrylate, phenylmethacrylate, piperonylmethacrylate, piperonylacrylate, 4-acetoxystyrene, 4-bromostyrene, 4-tert-butylstyrene, 2-chlorostyrene, 3-chlorostyrene, 4-chlorostyrene, 2,6-dichlorostyrene, 2,4-dimethylstyrene, 2,5-dimethylstyrene, 3,5-dimethylstyrene, 4-methoxystyrene, 4-ethoxystyrene, 3-methylstyrene, 4-methylstyrene, 2,4,6-trimethylstyrene, styrene, tert-butylvinylether, cyclohexylvinylether, phenylvinylketone, vinylbenzoate, 2-vinylpyridine, 4-vinylpyridine, especially methylmethacrylate, isobornylmethacrylate, isobornylacrylate, benzylmethacrylate, piperonylmethacrylate, styrene and combinations thereof.

21. The method according to claim 1,
wherein in at least one of stages (a) and (b) copolymerization is performed in the presence of an additional monomer (iv), which additional monomer (iv) is an ethylenically unsaturated monomer the homopolymer of which has a glass transition temperature $Tg^{(iv)}$ ranging from 30° C. to 200° C.,
wherein, in the overall two-stage polymerization process, the monomers (i), (ii), (iii) and (iv) are used in a (i)/(ii)/(iii)/(iv)-weight ratio of (60-97)/(3-28)/(0.25-12)/(0.1-10).

22. A polymeric composition which is obtained from a method comprising a two-stage emulsion polymerization process,
wherein:
(a) in a first stage (a), a copolymerization of monomers (i), (ii) and (iii) is performed via emulsion polymerization, wherein
(i) monomer (i) comprises at least one ethylenically unsaturated monomer, a homopolymer which has a glass transition temperature $Tg^{(i)}$ ranging from −100° C. to −10° C.,
(ii) monomer (ii) comprises at least one mono- or difunctional bicyclic monomer comprising at least one substituent comprising one ethylenically unsaturated bond wherein the at least one mono- or difunctional bicyclic monomer is derived from isosorbide or from (iso)borneol,
(iii) monomer (iii) comprises at least one ethylenically unsaturated carboxylic acid,
so as to produce a first copolymer (A) which comprises moieties (i), (ii) and (iii) each as defined hereinabove and contains free carboxylic groups —C(O)—OH, followed by a conversion of the free carboxylic groups into carboxylate groups —C(O)—O⁻,
wherein, in the first stage (a), the monomers (moieties) (i), (ii) and (iii) are used in a (i)/(ii)/(iii)-weight ratio of (30-93)/(2-25)/(5-45),
wherein the first stage (a) is performed until a weight-average molecular mass $M_w$ of the first copolymer (A) in a range of from 2,000 to 50,000 Daltons has been reached, as determined by size exclusion chromatography in accordance with DIN EN ISO 16014-5:2019 and measured with a fraction soluble in tetrahydrofuran,
wherein the first stage (a) is performed such as to produce the first copolymer (A) which has an acid value AV as determined before the conversion of the free carboxylic groups into carboxylate groups in a range of from 75 to 140 mg KOH/g, as determined by titration in accordance with ASTM D664;
subsequently
(b) in a second stage (b), a copolymerization of monomers (i) and (ii) is performed via emulsion polymerization in the presence of the carboxylate groups containing first copolymer (A) obtained from stage (a),
wherein monomers (i) and (ii) correspond each to the above definitions, however, with the proviso that monomers (i) and (ii) used in the second stage (b) may be the same as or different from those used in the first stage (a),
so as to produce a graft copolymer (B) comprising a copolymeric structure of moieties (i) and (ii) obtained from the second stage (b) copolymerization and which is covalently bonded with the first copolymer (A) via grafting.

23. The polymeric composition according to claim 22, wherein the graft copolymer (B) comprises at least two moieties (i) being different from each other.

24. The polymeric composition according to claim 22, wherein the graft copolymer (B) comprises at least two different moiety species of at least one moiety (i), (ii) and (iii).

25. The polymeric composition according to claim 22, wherein the graft copolymer (B) further comprises an additional moiety (iv) which additional moiety (iv) is an additional ethylenically unsaturated moiety the homopolymer of which has a glass transition temperature $Tg^{(iv)}$ ranging from 30° C. to 200° C.

26. The polymeric composition according to claim 22, wherein the polymeric composition has a solids content in a range of from 20 to 75% by weight in accordance with ISO 124:2014; and
wherein the graft copolymer (B) comprised by the polymeric composition has a polydispersity index in a range of from 1.5 to 13 in accordance with DIN EN ISO 16014-5:2019; and
wherein the graft copolymer (B) comprised by the polymeric composition has a glass transition temperature Tg in a range of from −5 to −100° C., as determined by differential scanning calorimetry in accordance with DIN EN ISO 11357-2:2014; and
wherein the graft copolymer (B) comprised by the polymeric composition has a particle diameter in a range of from 140 nm to 300 nm, as determined by light scattering in accordance with ISO 22412:2017; and
wherein the graft copolymer (B) comprised by the polymeric composition has a weight-average molecular mass $M_w$ in a range of from 30,000 to 1,000,000 Da, as determined by size exclusion chromatography in accordance with DIN EN ISO 16014-5:2019 and measured with a fraction soluble in tetrahydrofuran.

27. An adhesive comprising a polymeric composition as defined in claim 22.

28. The adhesive according to claim 27, wherein the adhesive is a pressure-sensitive adhesive.

* * * * *